US006985155B2

(12) United States Patent
Kondo et al.

(10) Patent No.: US 6,985,155 B2
(45) Date of Patent: Jan. 10, 2006

(54) MEMORY DEVICE AND IMAGE PROCESSING APPARATUS USING SAME

(75) Inventors: Tetsujiro Kondo, Tokyo (JP); Akihiro Okumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 10/242,031

(22) Filed: Sep. 12, 2002

(65) Prior Publication Data
US 2003/0071819 A1   Apr. 17, 2003

(30) Foreign Application Priority Data
Sep. 14, 2001   (JP)   ............................ 2001-279562

(51) Int. Cl.
*G09G 5/36*   (2006.01)
(52) U.S. Cl. ...................... 345/556; 345/537; 345/567; 345/571
(58) Field of Classification Search ................ 345/556, 345/537, 564–567, 571; 365/49; 711/117, 711/108
See application file for complete search history.

(56) References Cited

U.S. PATENT DOCUMENTS 5,339,268 A  *  8/1994  Machida ...................... 365/49
6,727,900 B1 *  4/2004  Nakamura .................. 345/422

* cited by examiner

*Primary Examiner*—Matthew C. Bella
*Assistant Examiner*—Hau Nguyen
(74) *Attorney, Agent, or Firm*—Frommer Lawrence & Haug LLP; William S. Frommer; Darren M. Simon

(57) ABSTRACT

A memory device and an image processing apparatus able to achieve an increase in speed of a region growing algorithm which conventionally involved a long processing time and thereby enabling real time operation, including a memory array comprised of a matrix of a plurality of memory units each having two memory cells adjacent to each other in the same row, one flag cell, and two transfer gates for transferring flag data of the flag cell to the flag cells of the memory units adjacent in a row direction and a column direction in accordance with the stored data of each memory cell and including a region growing circuit for writing correlation data as results of operation of correlation of adjacent pixels into all memory cells, starting the region growing processing from a designated position (address) to extract an object, and outputting the same to an image combining unit.

26 Claims, 27 Drawing Sheets

● EXTRACT PIXELS HAVING HIGH CORRELATION AROUND POINT

☐ CORRELATION SWITCH ON
■ CORRELATION SWITCH OFF

MEMORY DEVICE AND IMAGE PROCESSING APPARATUS USING SAME

BACKGROUND OF THE INVENTION

1. Field of the Invention

The present invention relates to a memory device able to be used for example for image signal processing using an algorithm called "region growing" and an image processing apparatus using the same.

2. Description of the Related Art

As one image signal processing technique, there is the known the algorithm called "region growing".

Region growing is a technique for sequentially performing processing for combining into a single region a small region in question and a small region adjacent to that when they have the same characteristics as each other in density values, color, etc. so as to gradually grow a region having equal characteristics and finally divide an overall image into regions.

This region growing algorithm is a technique generally used in the fields of image recognition and image processing and is used mainly for object extraction and edge detection.

FIG. 1 and FIG. 2 are views for explaining an example of the region growing algorithm using a computer, wherein FIG. 1 is a flowchart and FIG. 2 is a view of the pixel array.

This algorithm first initializes the flags to set them to 0 (ST1), then computes the correlation flags of adjacent pixels for the entire screen (ST2).

For example, as shown in FIG. 2, it extracts pixels having high correlation around points of black marks.

Next, it sets a flag "1" at a designated point (ST3).

When the flags of adjacent cells are "1" and "0" and the result of the operation of correlation of the adjacent pixels is "1", it changes the "0" to "1" (ST4).

Next, it counts the number of flags "1".

Then, it decides whether or not the previous count and the current count are equal (ST5).

When it decides at step ST5 that the previous count and the current count are not equal, it returns to the processing of step ST4. It repeats the processings of steps ST4 to ST6 until a result of a decision that they have become equal is obtained.

The white squares of FIG. 2 indicate that the correlation switch is on, while the black squares indicate that the correlation switch is off.

Summarizing the problem to be solved by the invention, in the signal processing method explained above, it was necessary to repeat the loop operation many times, so this was a big load on the processing capability of the CPU.

Namely, in region growing using a computer, since the load of the algorithm on the CPU was very heavy, it was difficult to perform the processing in real time.

SUMMARY OF THE INVENTION

An object of the present invention is to provide a memory device enabling a region growing algorithm to be realized by extremely simple hardware at a high speed and an image processing apparatus using the same.

To attain the above object, according to a first aspect of the present invention, there is provided a memory device for storing data comprising a memory unit, wherein the memory unit comprises at least one memory cell in which correlation data of adjacent data are written; a flag cell having a flag node, receiving a set signal or transferred flag data indicating that there is a correlation and able to hold the flag data in the flag node; and at least one data transferring means for forming a transfer path of the flag data for the flag node of the flag cell when correlation data indicating that there is a predetermined correlation relationship between adjacent data is stored in the memory cell.

Preferably, the memory device further comprises a means for resetting the flag node of the flag cell at a predetermined timing.

Alternatively, each data transferring means holds the transfer path of the flag data for the flag node of the flag cell in a cut off state when correlation data indicating that there is no predetermined correlation relationship with the adjacent data is stored in the memory cell.

Alternatively, data transferring means includes a transfer gate receiving stored data of the memory cell at its control terminal and controlled in conductive state in accordance with the stored data level.

Alternatively, each data transferring means includes a transistor having a first terminal connected to a power source potential side corresponding to the flag data level, having a second terminal connected to a transfer destination node side, receiving stored data of the memory cell at its control terminal, and controlled in conductive state between the first terminal and second terminal in accordance with the stored data level.

Alternatively, the flag cell includes an inverter for inverting the data level of the flag node, each data transferring means includes first and second transistors each controlled in conductive state between a first terminal and a second terminal in accordance with an input data level to a control terminal, the first and second transistors are connected in series between a power source potential corresponding to the flag data level and a transfer destination node, the first transistor receives stored data of the memory cell at its control terminal and is controlled in conductive state between the first terminal and second terminal in accordance with the stored data level, and the second transistor receives output data of the inverter and is controlled in conductive state between the first terminal and second terminal in accordance with the level of the data.

Alternatively, each data transferring means includes a transistor having a first terminal connected to a power source potential corresponding to the flag data level, having a second terminal connected to the flag node of the flag cell, receiving stored data of the memory cell at its control terminal, and controlled in conductive state between the first terminal and second terminal in accordance with the stored data level.

Alternatively, each data transferring means includes first and second transistors each controlled in conductive state between a first terminal and a second terminals in accordance with the input data level to its control terminal, the first and second transistors are connected in series between a power source potential corresponding to the flag data level and the flag node of the flag cell, the first transistor receives stored data of the memory cell at its control terminal and is controlled in conductive state between the first terminal and second terminal in accordance with the stored data level, and the second transistor is controlled in conductive state between the first terminal and second terminal when it receives data of an inverted level of the transferred flag data.

Alternatively, the flag cell includes an inverter for inverting the data level of the flag node, each data transferring means includes first, second, third, and fourth transistors each controlled in conductive state between a first terminal and a second terminal in accordance with the input data level to its control terminal, the first and second transistors are connected in series between a power source potential corresponding to the flag data level and a transfer destination node, the first transistor receives stored data of the memory cell at its control terminal and is controlled in conductive state between the first terminal and second terminal in accordance with the stored data level, the second transistor receives output data of the inverter and is controlled in conductive state between the first terminal and second terminal in accordance with the level of the data, the third and fourth transistors are connected in series between a power source potential corresponding to the flag data level and the flag node of the flag cell, the third transistor receives stored data of the memory cell at its control terminal and is controlled in conductive state between the first terminal and second terminal in accordance with the stored data level, and the fourth transistor is controlled in conductive state between the first terminal and second terminal when it receives data of an inverted level of the transferred flag data.

According to a second aspect of the present invention, there is provided a memory device for storing image data comprising a memory unit, the memory unit comprising at least one memory cell in which correlation data of adjacent data are written; a flag cell having a flag node, receiving a set signal or transferred flag data indicating that there is a correlation, able to hold the flag data in the flag node, and able to output the flag data to an external processing circuit; and at least one data transferring means for forming a transfer path of the flag data for the flag node of the flag cell when correlation data indicating that there is a predetermined correlation relationship between adjacent pixels is stored in the memory cell.

Preferably, the memory device further comprises a means for resetting the flag node of the flag cell at a predetermined timing.

Alternatively, the correlation data includes correlation data in a spatial direction of the image.

Alternatively, the correlation data includes correlation data in a time direction of the image, and the memory device further comprises a memory cell for storing the correlation data in the time direction of the image and a data transferring means for processing for forming a transfer path of the flag data in accordance with stored data of the memory cell.

Alternatively, the correlation data includes correlation data corresponding to a hierarchical structure of the image data.

Alternatively, each data transferring means holds the transfer path of the flag data for the flag node of the flag cell in a cut off state when correlation data indicating that there is no predetermined correlation relationship between adjacent data is stored in the memory cell.

Alternatively, each data transferring means includes a transfer gate receiving stored data of the memory cell at its control terminal and controlled in conductive state in accordance with the stored data level.

Alternatively, each data transferring means includes a transistor having a first terminal connected to a power source potential side corresponding to the flag data level, having a second terminal connected to a transfer destination node side, receiving stored data of a memory cell at its control terminal, and controlled in conductive state between the first terminal and second terminal in accordance with the stored data level.

Alternatively, the flag cell includes an inverter for inverting the data level of the flag node, each data transferring means includes first and second transistors each controlled in conductive state between a first terminal and a second terminal in accordance with the input data level to its control terminal, the first and second transistors are connected in series between a power source potential corresponding to the flag data level and a transfer destination node, the first transistor receives stored data of the memory cell at its control terminal and is controlled in conductive state between the first terminal and second terminal in accordance with the stored data level, and the second transistor receives output data of the inverter and is controlled in conductive state between the first terminal and second terminal in accordance with the level of the data.

Alternatively, each data transferring means includes a transistor having a first terminal connected to a power source potential corresponding to the flag data level, having a second terminal connected to the flag node of the flag cell, receiving stored data of the memory cell at its control terminal, and controlled in conductive state between the first terminal and second terminal in accordance with the stored data level.

Alternatively, each data transferring means includes first and second transistors each controlled in conductive state between a first terminal and a second terminal in accordance with the input data level to its control terminal, the first and second transistors are connected in series between a power source potential corresponding to the flag data level and the flag node of the flag cell, the first transistor receives stored data of the memory cell at its control terminal and is controlled in conductive state between the first terminal and second terminal in accordance with the stored data level, and the second transistor is controlled in conductive state between the first terminal and second terminal when it receives data of an inverted level of the transferred flag data.

Alternatively, the flag cell includes an inverter for inverting the data level of the flag node, each data transferring means includes first, second, third, and fourth transistors each controlled in conductive state between a first terminal and a second terminal in accordance with the input data level to its control terminal, the first and second transistors are connected in series between a power source potential corresponding to the flag data level and a transfer destination node, the first transistor receives stored data of the memory cell at its control terminal and is controlled in conductive state between the first terminal and second terminal in accordance with the stored data level, the second transistor receives output data of the inverter and is controlled in conductive state between the first terminal and second terminal in accordance with the level of the data, the third and fourth transistors are connected in series between a power source potential corresponding to the flag data level and the flag node of the flag cell, the third transistor receives stored data of the memory cell at its control terminal and is controlled in conductive state between the first terminal and second terminal in accordance with the stored data level, and the fourth transistor is controlled in conductive state between the first terminal and second terminal when it receives data of an inverted level of the transferred flag data.

According to a third aspect of the present invention, there is provided a memory device for storing image data comprising a plurality of memory units arranged in a matrix, each memory unit comprising at least one memory cell in which correlation data of adjacent data are written; a flag cell having a flag node, receiving a set signal or transferred flag data indicating that there is a correlation, able to hold the flag data in the flag node, and able to output the flag data to an external processing circuit; and at least one data transferring means for forming a transfer path of the flag data for the flag node of the flag cell when correlation data indicating that there is a predetermined correlation relationship between the adjacent pixels is stored in the memory cell; each data transferring means of one memory unit being arranged between the flag node in the flag cell of that one memory unit and the flag node in the flag cell of an adjacent memory cell unit.

Preferably, the memory device further comprises a controlling means for resetting the flag node of the flag cell at a predetermined timing.

Alternatively, the controlling means writes correlation data into memory cells of the memory units, resets the flag nodes in the flag cells of the memory units, and then supplies a set signal to the flag cell of a particular memory unit.

Alternatively, each memory unit includes a first data transferring means arranged between the flag node in the flag cell of that memory unit and the flag node in the flag cell of a memory unit adjacent in a row direction of the matrix and a second data transferring means arranged between the flag node in the flag cell of that memory unit and the flag node in the flag cell of a memory unit adjacent in a column direction of the matrix.

Alternatively, the correlation data includes correlation data in a spatial direction of the image.

Alternatively, at least one of the memory units includes a first data transferring means arranged between the flag node in the flag cell of that memory unit and the flag node in the flag cell of a memory unit adjacent in the row direction of the matrix, a second data transferring means arranged between the flag node in the flag cell of that memory unit and the flag node in the flag cell of a memory unit adjacent in the column direction of the matrix, and a third data transferring means arranged between the flag node in the flag cell of that memory unit and the flag node in the flag cell of a memory unit adjacent in an oblique direction of the matrix.

Alternatively, the correlation data includes correlation data in a time direction of the image, and the memory device includes a memory cell for storing the correlation data in the time direction of the image and a data transferring means for processing for forming a transfer path of the flag data in accordance with the stored data of that memory cell.

Alternatively, the correlation data includes correlation data corresponding to a hierarchical structure of the image data.

Alternatively, each data transferring means holds the transfer path of the flag data for the flag node of the flag cell in a cut off state when correlation data indicating that there is no predetermined correlation relationship between the adjacent data is stored in the memory cell.

Alternatively, each data transferring means includes a transfer gate receiving stored data of the memory cell at its control terminal and controlled in conductive state in accordance with the stored data level.

Alternatively, each data transferring means includes a transistor having a first terminal connected to a power source potential side corresponding to the flag data level, having a second terminal connected to the flag node side in the flag cell of an adjacent memory unit, receiving stored data of the memory cell at its control terminal, and controlled in conductive state between the first terminal and second terminal in accordance with the stored data level.

Alternatively, the flag cell of each memory unit includes an inverter for inverting the data level of the flag node, each data transferring means includes first and second transistors each controlled in conductive state between a first terminal and a second terminal in accordance with the input data level to its control terminal, the first and second transistors are connected in series between a power source potential corresponding to the flag data level and the flag node in the flag cell of an adjacent memory unit, the first transistor receives stored data of the memory cell at its control terminal and is controlled in conductive state between the first terminal and second terminal in accordance with the stored data level, and the second transistor receives output data of the inverter and is controlled in conductive state between the first terminal and second terminal in accordance with the level of the data.

Alternatively, each data transferring means includes a transistor having a first terminal connected to a power source potential corresponding to the flag data level, having a second terminal connected to the flag node of the flag cell, receiving stored data of the memory cell at its control terminal, and controlled in conductive state between the first terminal and second terminal in accordance with the stored data level.

Alternatively, each data transferring means includes first and second transistors each controlled in conductive state between a first terminal and a second terminal in accordance with the input data level to its control terminal, the first and second transistors are connected in series between a power source potential corresponding to the flag data level and the flag node of the flag cell, the first transistor receives stored data of a memory cell at its control terminal and is controlled in conductive state between the first terminal and second terminal in accordance with the stored data level, and the second transistor is controlled in the conductive state between the first terminal and second terminal when it receives a data of an inverted level of the transferred flag data.

Alternatively, the flag cell of each memory unit includes an inverter for inverting the data level of the flag node, each data transferring means includes first, second, third, and fourth transistors each controlled in conductive state between a first terminal and a second terminal in accordance with the input data level to its control terminal, the first and second transistors are connected in series between a power source potential corresponding to the flag data level and the flag node in the flag cell of an adjacent memory unit, the first transistor receives stored data of the memory cell at its control terminal and is controlled in conductive state between the first terminal and second terminal in accordance with the stored data level, the second transistor receives the output data of the inverter of the flag cell of the next stage and is controlled in the conductive state between the first terminal and second terminal in accordance with the level of the data, the third and fourth transistors are connected in series between a power source potential corresponding to the flag data level and the flag node of the flag cell, the third transistor receives stored data of the memory cell at its control terminal and is controlled in conductive state between the first terminal and second terminal in accordance with the stored data level, and the fourth transistor receives the output data of the inverter of the flag cell of the adjacent memory unit and is controlled in conductive state between the first terminal and second terminal in accordance with the level of the data.

According to a fourth aspect of the present invention, there is provided an image processing apparatus, for sequentially performing processing for combining into a single region a small region in question and a small region adjacent to that when they have the same characteristics as each other so as to gradually grow a region having equal characteristics and finally divide an overall image into regions, comprising a memory unit, wherein the memory unit comprises a correlation operational means for performing operation of correlation between adjacent pixels and outputting correlation data indicating whether or not there is a correlation relationship between the adjacent pixels; at least one memory cell in which correlation data of adjacent pixels output from the correlation computing means are written; a flag cell having a flag node, receiving a set signal or flag data indicating that there is a transferred correlation, able to hold the flag data in the flag node, and able to output the flag data to an external processing circuit; and at least one data transferring means for forming a transfer path of the flag data for the flag node of the flag cell when correlation data indicating that there is a predetermined correlation relationship between adjacent pixels is stored in the memory cell.

According to a fifth aspect of the present invention, there is provided an image processing apparatus, for sequentially performing processing for combining into a single region a small region in question and a small region adjacent to that when they have the same characteristics as each other so as to gradually grow a region having equal characteristics and finally divide an overall image into regions, comprising a plurality of memory units arranged in a matrix, wherein each memory unit comprises a correlation operational means for performing operation of correlation between adjacent pixels and outputting correlation data indicating whether or not there is a correlation relationship between the adjacent pixels; at least one memory cell in which correlation data of adjacent pixels output from the correlation operational means are written; a flag cell having a flag node, receiving a set signal or transferred flag data indicating that there is a correlation, able to hold the flag data in the flag node, and able to output the flag data to an external processing circuit; and at least one data transferring means for forming a transfer path of the flag data for the flag node of the flag cell when correlation data indicating that there is a predetermined correlation relationship between the adjacent pixels is stored in the memory cell; each data transferring means of one memory unit being arranged between the flag node in the flag cell of that one memory unit and the flag node in the flag cell of an adjacent memory cell unit.

In summary, according to the present invention, first, data of all pixels worth of the correlation values are written into the memory cells of the memory units.

Next, when the data of all pixels worth of the correlation values are written into the memory cells, the flag nodes of the flag cells of all memory units are reset.

Due to this, the data of flag nodes of flag cells of all memory units are reset to for example the logic "0", and, along with this, all flag outputs are reset to "0".

By this reset operation, the preparations for region growing processing are completed.

Thereafter, a set signal is supplied to for example the flag cell of a particular memory unit at a position (address) designated by a pointing device, and the flag data of for example the logic "1" is set in the flag node.

Then, the "1" level of the particular memory unit is successively transferred via data transferring means such as transfer gates connected to the memory cells around that particular memory unit. Each flag cell of each memory unit to which the "1" level was transferred outputs the data "1" to the processing circuit as the flag output.

Here, when the data transferring means such as a transfer gate connected to this memory cell is in an off state, this region growing processing stops there and the processing is ended.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1:
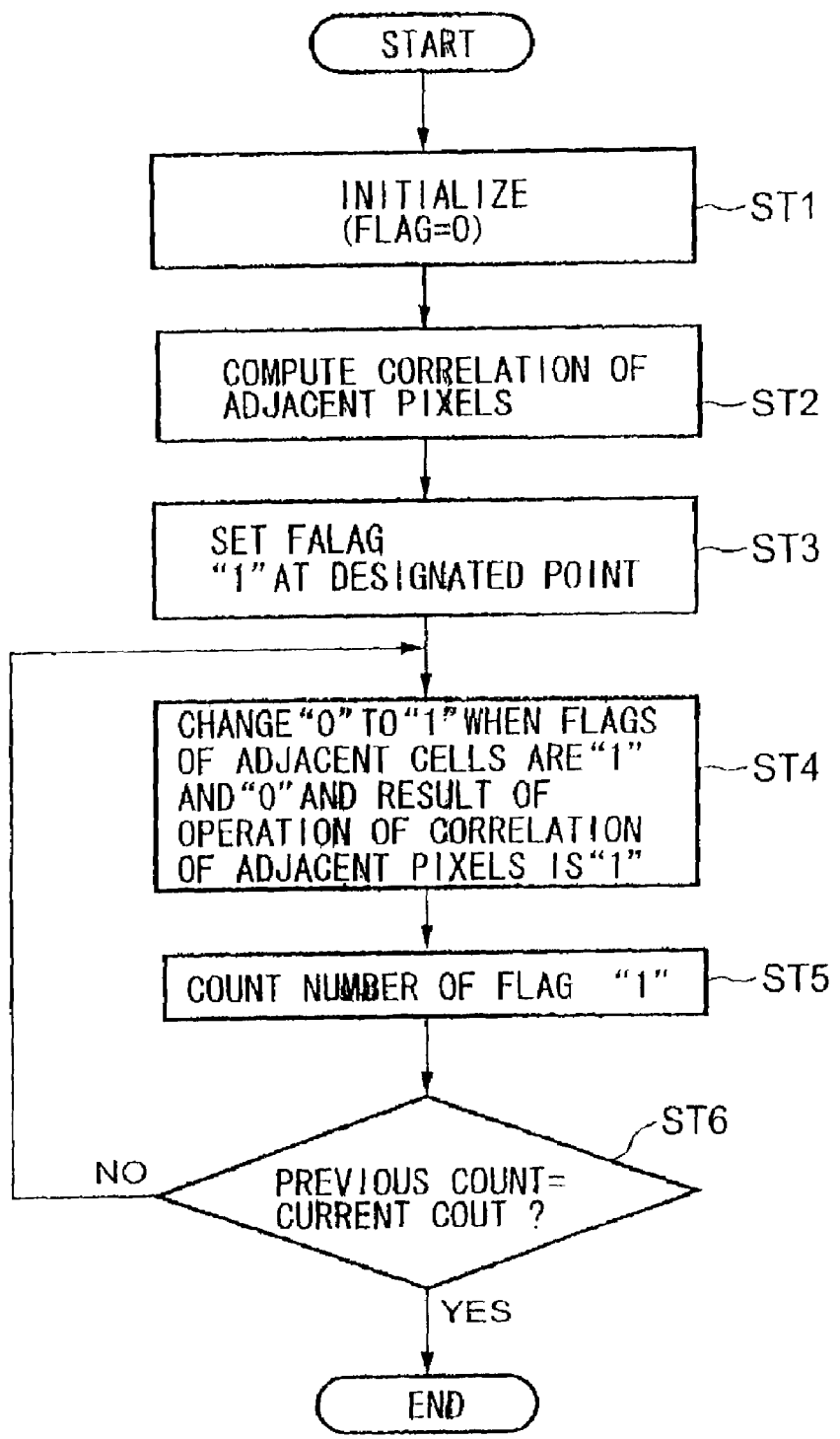
FIG. 1 is a flowchart for explaining an example of a region growing algorithm using a computer.
Figure 2:
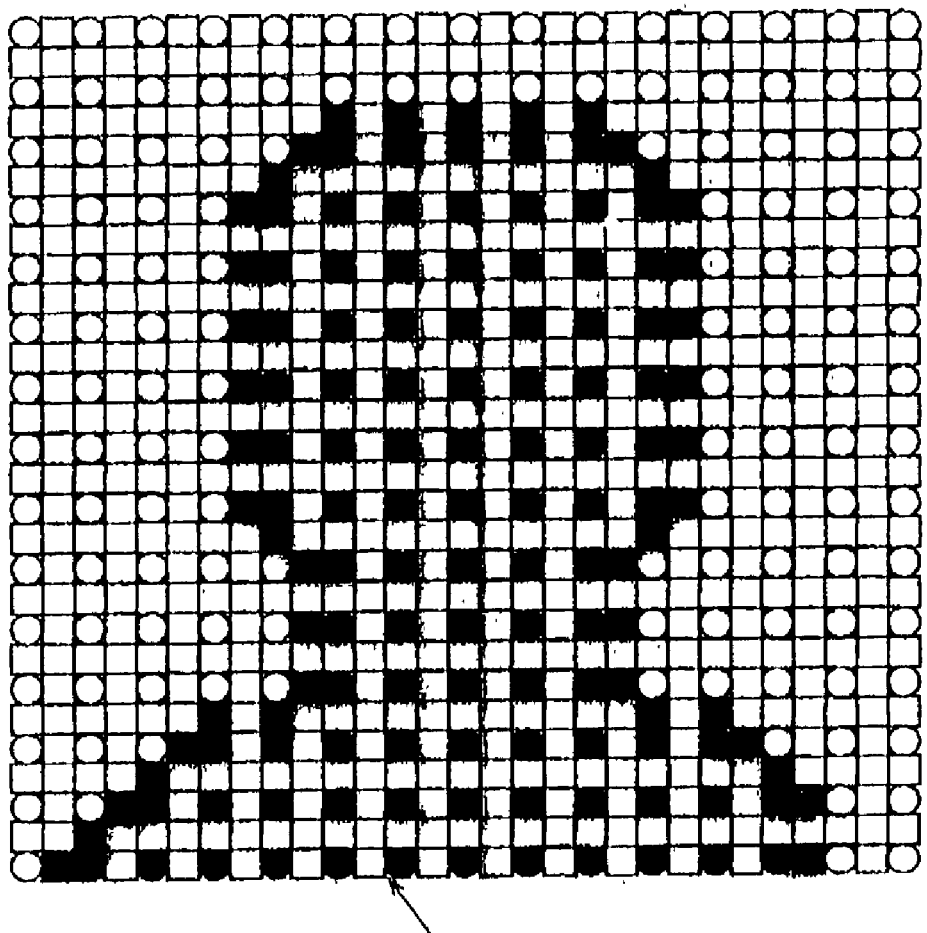
FIG. 2 is a view showing a pixel array for explaining an example of a region growing algorithm using a computer.
Figure 3:
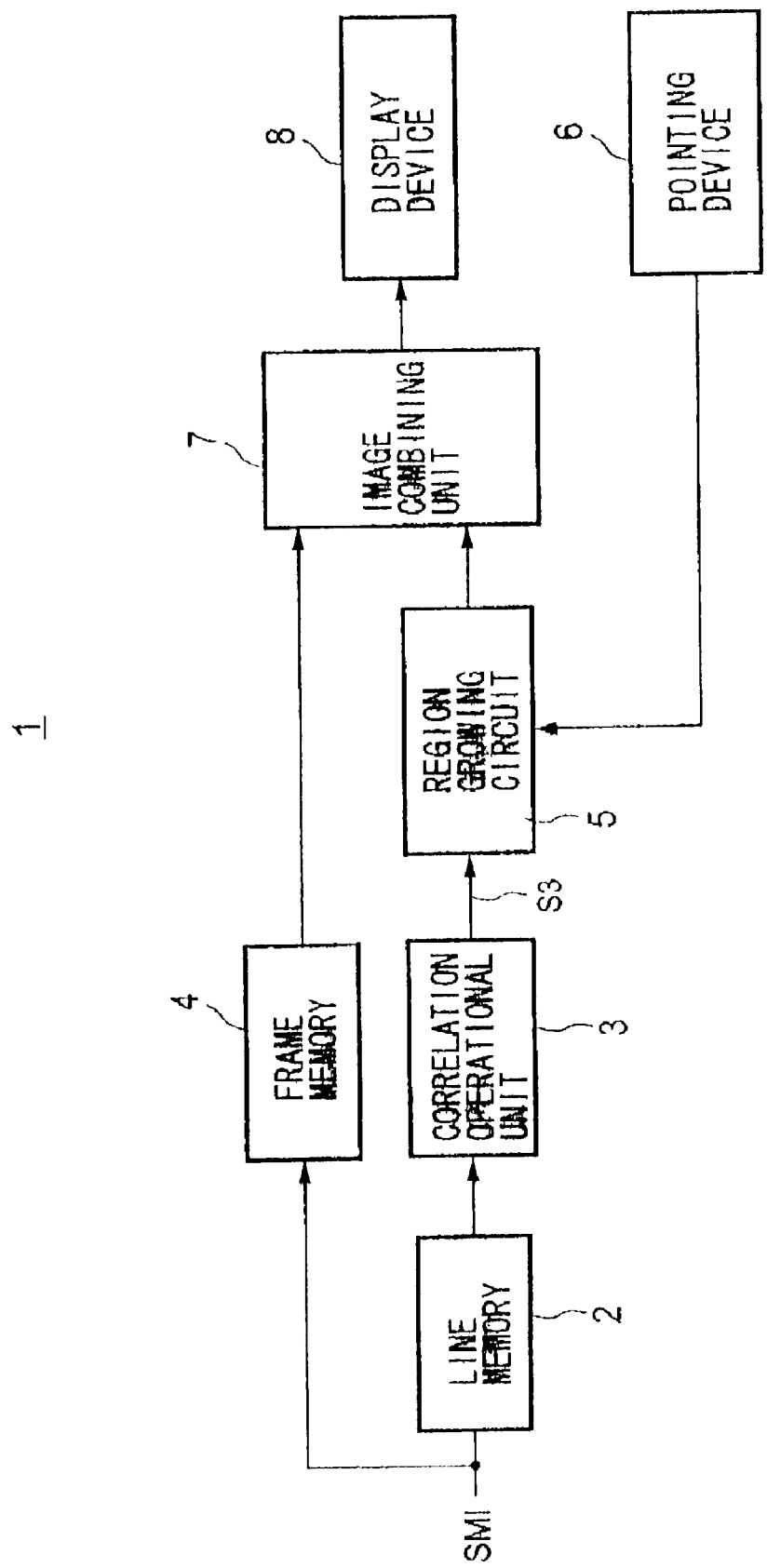
FIG. 3 is a block diagram of an embodiment of an image processing apparatus to which a memory device according to the present invention is applied.

FIG. 3 is a block diagram of an embodiment of an image processing apparatus to which the memory device according to the present invention is applied.

The present image processing apparatus is an apparatus for displaying moving pictures, extracting an object of a point input by a pointing device by using a region growing algorithm, and changing the color of the extracted object.

The present image processing apparatus 1 has, as shown in FIG. 3, a line memory 2, correlation operational unit 3, frame memory 4, region growing circuit 5, pointing device 6, image combining unit 7, and display device 8.

The line memory 2 is arranged at the input stage of the correlation operational unit 3 in order to extract the adjacent image data from a moving picture signal SM1 input to enable the operation of correlation at the correlation operational unit 3 of the next stage.

For example, in order to extract the data above and below an image from the image data input in a raster scan order, at least 2 lines worth of line memories are needed.

The correlation operational unit 3 computes the correlation between pixels of adjacent image data held in the line memory 2 and outputs the result as a signal S3 to the region growing circuit 5.

The operation of correlation of an image may take the form of judgement that an adjacent pixel difference is below a certain threshold value, threshold processing of the value obtained by finding the difference using data of the three primary colors of the color, that is, R (red), G (green), and B (blue), or simple coincidence judgment of the adjacent pixels.

Here, an explanation will be given of a concrete example of processing of the operation of image correlation of the correlation processor unit 3 in relation to FIG. 4.

Figure 4:
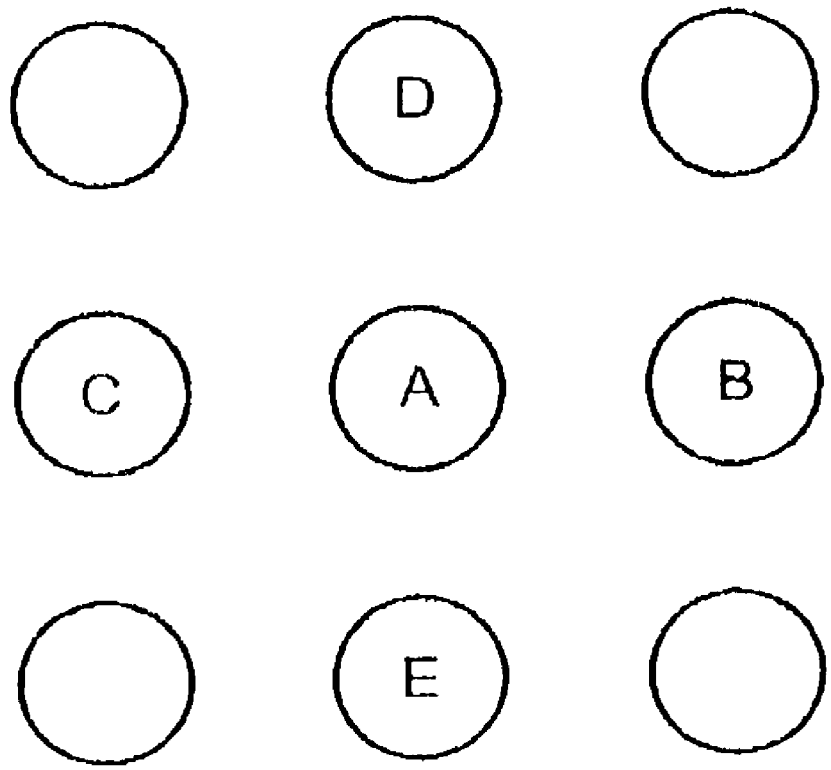
FIG. 4 is a view for explaining operation of correlation and showing position relationships of image data.

FIG. 4 is a view for explaining the operation of correlation and shows the position relationship of the image data.

Here, the operation of correlation between a pixel A and a pixel B in FIG. 4 will be explained.

As a simple example of the operation of correlation, the absolute value of the difference between a pixel A and a pixel B is found. If the found absolute value of the difference is more than the predetermined threshold value X, the result of the operation is given the logic "1", while if less than the threshold value X, the result of the operation is given the logic "0".

This may be expressed by the equation as follows:

$$|AB|>X$$

Also, as a further simple example, there also exists a method of examining coincidence of the pixel A and the pixel B, that is, a method of simply judging coincidence of the adjacent pixels.

In this case, a result of operation of the logic "1" is obtained when the adjacent pixels coincide, while a result of operation of the logic "0" is obtained when they do not coincide.

When this is to be realized by hardware, it can be easily realized by an exclusive OR (EOR) circuit.

Further, as a high level algorithm, the method of finding the absolute value of the difference after normalization, the method of Sobel, etc. can be applied.

Hitherto, the method of operation of the correlation between a particular pixel A and the pixel B adjacent to the right was explained, but it is necessary to similarly compute correlation for a left pixel C and upper and lower pixels D and E.

The line memory 2 becomes necessary in order to compute the upper and lower correlations. As explained above, for example, in order to extract the upper and lower data of an image from image data input in a raster scan order, at least 2 lines worth of line memories are necessary.

The frame memory 4 delays the input moving picture signal SMI by the amount of one frame for adjusting the time of the display device 8, adjusts the time, then inputs it to the image combining unit 7 since the region growing circuit 5 actually can perform the region growing processing after the operation of correlation for one frame ends.

The region growing circuit 5 has a memory of a predetermined capacity and writes "1" or "0" data as the result of the operation of correlation of adjacent pixels by the correlation operational unit 3 at a predetermined address of the memory. For example, it writes 1 frames worth of the correlation data, then starts the region growing processing from the position (address) input by the pointing device 6, extracts the object, and outputs the same to the image combining unit 7.

The extracted object is combined with the image data delayed by one frame at the image combining unit 7 and output to the display device 8 for display.

Below, a detailed explanation will be given of a concrete example of the configuration of the region growing circuit 5 in relation to the drawings.

Figure 5:
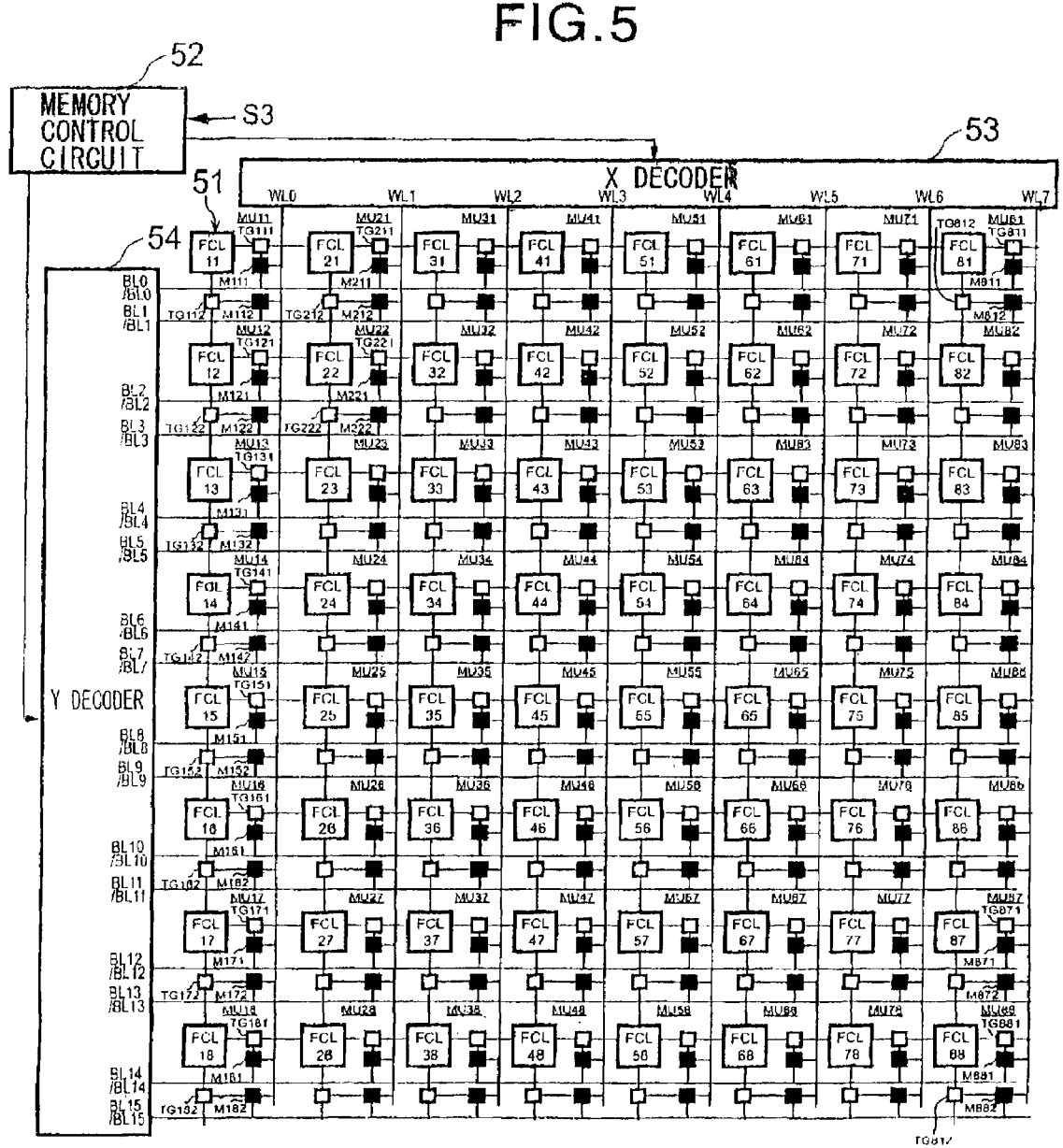
FIG. 5 is a block diagram of a basic region growing circuit according to the present invention, that is, a region growing circuit able to grow a region in a left-right and up-bottom direction.

FIG. 5 is a block diagram of the configuration of a basic region growing circuit according to the present invention and shows a region growing circuit able to grow a region in the left-right and up-bottom directions.

The region growing circuit 5 has, as shown in FIG. 5, a memory array 51, memory control circuit 52, X decoder 53, and Y decoder 54.

In the memory array 51, memory cells M configured by for example static random access memories (SRAMs) are arranged in an m×n (8×16 in the example of FIG. 5) matrix. Memory units MU each including two memory cells M adjacent to each other in the same column are arranged in an m×m (8×8 in the example of FIG. 5) matrix. The number of arrangement M×N is desirably set for the size of the image data to be input.

The 16 memory cells M arranged in the same row are connected to the same word lines WL0 to WL7 driven by the X decoder 53. Similarly, the eight memory cells M arranged in the same column are connected to bit line pairs BL0, /BL0 to BL15, /BL15 driven by the Y decoder 54.

Concretely, the word line WL0 has connected to it memory cells M111, M112, M121, M122, M131, M132, M141, M142, M151, M152, M161, M162, M171, M172, M181, and M182 arranged in the first row.

The word line WL1 has connected to it memory cells M211, M212, M221, M222, M231, M232, M241, M242, M251, M252, M261, M262, M271, M272, M281, and M282 arranged in the second row.

The word line WL2 has connected to it memory cells M311, M312, M321, M322, M331, M332, M341, M342, M351, M352, M361, M362, M371, M372, M381, and M382 arranged in the third row.

The word line WL3 has connected to it memory cells M411, M412, M421, M422, M431, M432, M441, M442, M451, M452, M461, M462, M471, M472, M481, and M482 arranged in the fourth row.

The word line WL4 has connected to it memory cells M511, M512, M521, M522, M531, M532, M541, M542, M551, M552, M561, M562, M571, M572, M581, and M582 arranged in the fifth row.

The word line WL5 has connected to it memory cells M611, M612, M621, M622, M631, M632, M641, M642, M651, M652, M661, M662, M671, M672, M681, and M682 arranged in the sixth row.

The word line WL6 has connected to it memory cells M711, M712, M721, M722, M731, M732, M741, M742, M751, M752, M761, M762, M771, M772, M781, and M782 arranged in the seventh row.

The word line WL7 has connected to it memory cells M811, M812, M821, M822, M831, M832, M841, M842, M851, M852, M861, M862, M871, M872, M881, and M882 arranged in the eighth row.

The bit line pair BL0 and /BL0 has connected to it memory cells M111, M211, M311, M411, M511, M611, M711, and M811 arranged in the first column.

The bit line pair BL1 and /BL1 has connected to it memory cells M112, M212, M312, M412, M512, M612, M712, and M812 arranged in the second column.

The bit line pair BL2 and /BL2 has connected to it memory cells M121, M221, M321, M421, M521, M621, M721, and M821 arranged in the third column.

The bit line pair BL3 and /BL3 has connected to it memory cells M122, M222, M322, M422, M522, M622, M722, and M822 arranged in the fourth column.

The bit line pair BL4 and /BL4 has connected to it memory cells M131, M231, M331, M431, M531, M631, M731, and M831 arranged in the fifth column.

The bit line pair BL5 and /BL5 has connected to it memory cells M132, M232, M332, M432, M532, M632, M732, and M832 arranged in the sixth column.

The bit line pair BL6 and /BL6 has connected to it memory cells M141, M241, M341, M441, M541, M641, M741, and M841 arranged in the seventh column.

The bit line pair BL7 and /BL7 has connected to it memory cells M142, M242, M342, M442, M542, M642, M742, and M842 arranged in the eighth column.

The bit line pair BL8 and /BL8 has connected to it memory cells M151, M251, M351, M451, M551, M651, M751, and M851 arranged in the ninth column.

The bit line pair BL9 and /BL9 has connected to it memory cells M152, M252, M352, M452, M552, M652, M752, and M852 arranged in the tenth column.

The bit line pair BL10 and /BL10 has connected to it memory cells M161, M261, M361, M461, M561, M661, M761, and M861 arranged in the eleventh column.

The bit line pair BL11 and /BL11 has connected to it memory cells M162, M262, M362, M462, M562, M662, M762, and M862 arranged in the twelfth column.

The bit line pair BL12 and /BL12 has connected to it memory cells M171, M271, M371, M471, M571, M671, M771, and M871 arranged in the thirteenth column.

The bit line pair BL13 and /BL13 has connected to it memory cells M172, M272, M372, M472, M572, M672, M772, and M872 arranged in the fourteenth column.

The bit line pair BL14 and /BL14 has connected to it memory cells M181, M281, M381, M481, M581, M681, M781, and M881 arranged in the fifteenth column.

The bit line pair BL15 and /BL15 has connected to it memory cells M182, M282, M382, M482, M582, M682, M782, and M882 arranged in the sixteenth column.

Each memory unit MU is configured by two memory cells M adjacent to each other in the same row, one flag cell FCL, and two transfer gates TG as the data transferring means for transferring the flag data of the flag cell FCL to the flag cells FCL of the memory units MU adjacent in the row direction and the column direction in accordance with the stored data of each memory cell M.

Concretely, the memory unit MU11 arranged in the first row is configured by memory cells M111 and M112, a flag cell FCL11, and transfer gates TG111 and TG112.

The memory unit MU12 is configured by memory cells M121 and M122, a flag cell FCL12, and transfer gates TG121 and TG122.

The memory unit MU13 is configured by memory cells M131 and M132, a flag cell FCL13, and transfer gates TG131 and TG132.

The memory unit MU14 is configured by memory cells M141 and M142, a flag cell FCL14, and transfer gates TG141 and TG142.

The memory unit MU15 is configured by memory cells M151 and M152, a flag cell FCL15, and transfer gates TG151 and TG152.

The memory unit MU16 is configured by memory cells M161 and M162, a flag cell FCL16, and transfer gates TG161 and TG162.

The memory unit MU17 is configured by memory cells M171 and M172, a flag cell FCL17, and transfer gates TG171 and TG172.

The memory unit MU18 is configured by memory cells M181 and M182, a flag cell FCL18, and transfer gates TG181 and TG182.

The memory unit MU21 arranged in the second row is configured by memory cells M211 and M212, a flag cell FCL21, and transfer gates TG211 and TG212.

The memory unit MU22 is configured by memory cells M221 and M222, a flag cell FCL22, and transfer gates TG221 and TG222.

The memory unit MU23 is configured by memory cells M231 and M232, a flag cell FCL23, and transfer gates TG231 and TG232.

The memory unit MU24 is configured by memory cells M241 and M242, a flag cell FCL24, and transfer gates TG241 and TG242.

The memory unit MU25 is configured by memory cells M251 and M252, a flag cell FCL25, and transfer gates TG251 and TG252.

The memory unit MU26 is configured by memory cells M261 and M262, a flag cell FCL26, and transfer gates TG261 and TG262.

The memory unit MU17 is configured by memory cells M271 and M272, a flag cell FCL27, and transfer gates TG271 and TG272.

The memory unit MU28 is configured by memory cells M281 and M282, a flag cell FCL28, and transfer gates TG281 and TG282.

Below, similarly, the memory unit MU81 arranged in the eighth row is configured by memory cells M811 and M812, a flag cell FCL81, and transfer gates TGB11 and TG812.

The memory unit MU82 is configured by memory cells M821 and M822, a flag cell FCL82, and transfer gates TG821 and TG822.

The memory unit MU83 is configured by memory cells M831 and M832, a flag cell FCL83, and transfer gates TG831 and TG832.

The memory unit MU84 is configured by memory cells M841 and M842, a flag cell FCL84, and transfer gates TG841 and TG842.

The memory unit MU85 is configured by memory cells M851 and M852, a flag cell FCL85, and transfer gates TG851 and TG852.

The memory unit MU86 is configured by memory cells M861 and M862, a flag cell FCL86, and transfer gates TG861 and TG862.

The memory unit MU87 is configured by memory cells M871 and M872, a flag cell FCL87, and transfer gates TG871 and TG872.

The memory unit MU88 is configured by memory cells M881 and M882, a flag cell FCL88, and transfer gates TG881 and TG882.

Figure 6:
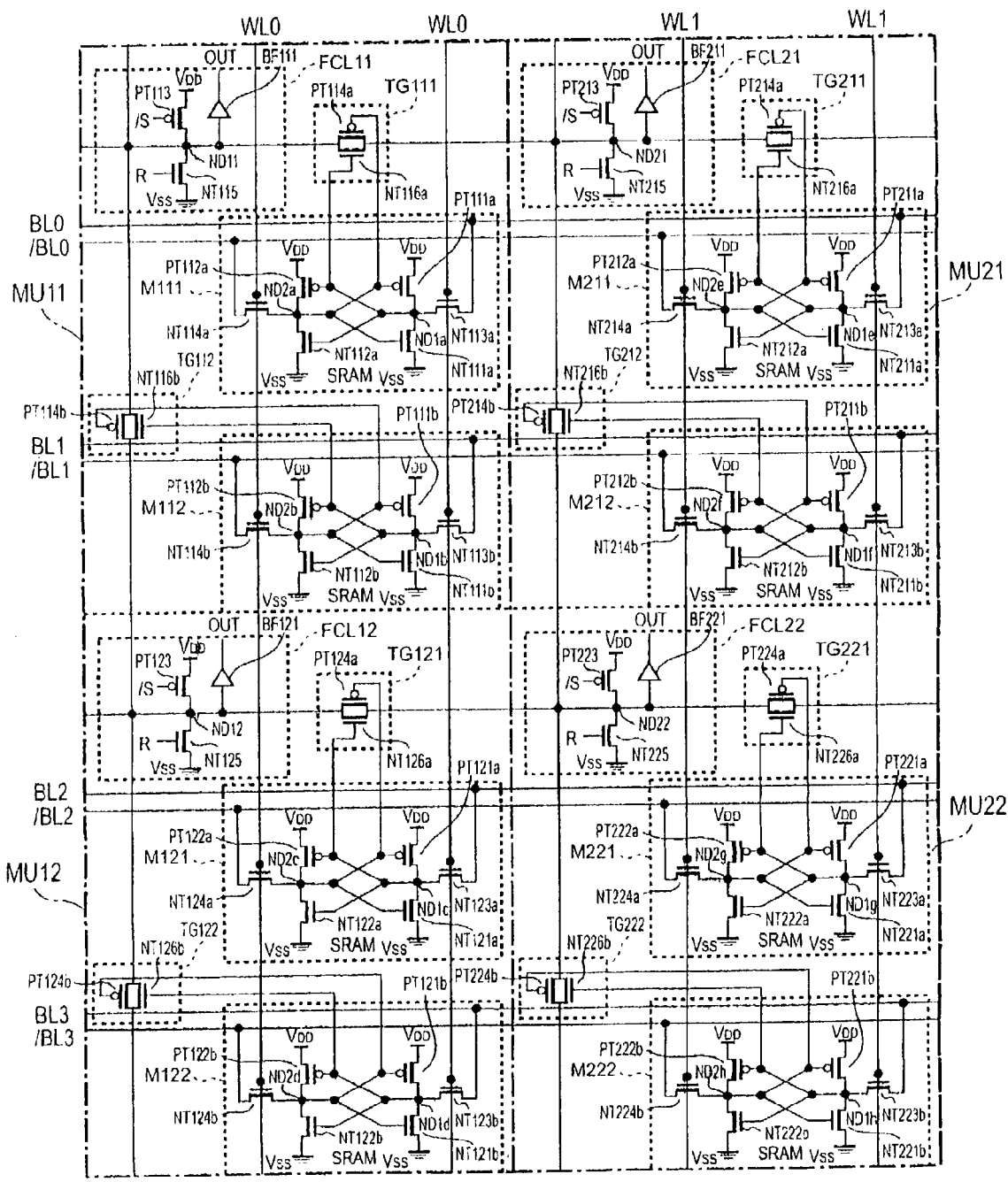
FIG. 6 is a circuit diagram of a concrete example of the configuration of a memory unit of a memory array in the region growing circuit according to the present invention.

FIG. 6 is a circuit diagram of a concrete example of the configuration of the memory unit of the memory array in the region growing circuit according to the present invention.

Note that in the example of FIG. 6, in the memory matrix of FIG. 5, for simplification, only 2×2 memory units MU11, MU12, MU21, and MU22 ate shown. Below, an explanation will be given of the concrete circuit configurations of only these memory units MU11, MU12, MU21, and MU22.

The memory unit MU11 is configured by memory cells M111 and M112 comprised of SRAMs, a flag cell FCL11, and transfer gates TG111 and TG112.

The memory cell M111 has p-channel MOS (PMOS) transistors PT111a and PT112a and n-channel MOS (NMOS) transistors NT111a to NT114a.

The PMOS transistor PT111a serving as a load and the NMOS transistor NT111a are connected in series between the supply line of the power source voltage VDD and the supply line of the reference voltage (0V) VSS. Similarly, the PMOS transistor PT112a serving as the load and the NMOS transistor NT112a are connected in series between the supply line of the power source voltage VDD and the supply line of the reference voltage (0V) VSS.

A first memory node ND1a is configured by a connection point of drains of the PMOS transistor PT111a and the NMOS transistor NT111a. The first memory node ND1a is connected to a gate of the PMOS transistor PT112a, a gate of the NMOS transistor NT112a, the transfer gate TG111, and the bit line BL0 via the NMOS transistor NT113a serving as an access transistor. Note that a gate of the NMOS transistor NT113a serving the access transistor is connected to the word line WL0.

A second memory node ND2a is configured by a connection point of drains of the PMOS transistor PT112a and the NMOS transistor NT112a. The second memory node ND2a is connected to a gate of the PMOS transistor PT111a, a gate of the NMOS transistor NT111a, the transfer gate TG111, and the inverted bit line /BL0 via the NMOS transistor NT114a serving as the access transistor. Note that a gate of the NMOS transistor NT114a serving as the access transistor is connected to the word line WL0.

The memory cell M112 has PMOS transistors PT111b and PT112b and NMOS transistors NT111b to NT114b.

The PMOS transistor PT111b serving as the load and the NMOS transistor NT111b are connected in series between the supply line of the power source voltage VDD and supply line of the reference voltage (0V) VSS. Similarly, the PMOS transistor PT112b serving as the load and the NMOS transistor NT112b are connected in series between the supply line of the power source voltage VDD and supply line of the reference voltage (0V) VSS.

A first memory node ND1b is configured by the connection point of drains of the PMOS transistor PT111b and the NMOS transistor NT111b. The first memory node ND1b is connected to a gate of the PMOS transistor PT112b, a gate of the NMOS transistor NT112b, the transfer gate TG112, and the bit line BL1 via the NMOS transistor NT113b serving as the access transistor. Note that a gate of the NMOS transistor NT113b serving as the access transistor is connected to the word line WL0.

A second memory node ND2b is configured by the connection point of drains of the PMOS transistor PT112b and the NMOS transistor NT112b. The second memory node ND2b is connected to a gate of the PMOS transistor PT111b, a gate of the NMOS transistor NT111b, the transfer gate TG112, and the inverted bit line /BL1 via the NMOS transistor NT114b serving as the access transistor. Note that a gate of the NMOS transistor NT114b serving as the access transistor is connected to the word line WL0.

The flag cell FCL11 of the memory unit MU11 is configured by a PMOS transistor PT113, an NMOS transistor NT115, and a buffer BF111.

The PMOS transistor PT113 and the NMOS transistor NT115 are connected in series between the supply line of the power source voltage VDD and the supply line of the reference voltage (0V) VSS. A gate of the PMOS transistor PT113 is connected to the supply line of a set signal /S, and a gate of the NMOS transistor NT115 is connected to the supply line of a reset signal R.

The flag node ND11 is configured by the connection point of the drains of the PMOS transistor PT113 and the NMOS transistor NT115. The flag node ND11 is connected to the transfer gates TG111 and TG112. Also, the signal set in the flag node ND11 is output via the buffer BF111 to the image combining unit 7 as the output OUT.

The transfer gate TG111 is configured by connecting sources and drains of a PMOS transistor PT114a and an NMOS transistor NT116a. One input/output terminal is connected to the flag node ND11 of the flag cell FCL11, and the other input/output terminal is connected to the flag cell of the adjacent memory unit MU21.

A gate of the PMOS transistor PT114a is connected to the second memory node ND2a of the memory cell M111, and a gate of the NMOS transistor NT116a is connected to the first memory node ND1a of the memory cell M111.

Namely, when the correlation result data of the logic "1" is stored in the memory cell M111, the transfer gate TG111 transfers the flag data of the flag node ND11 of the flag cell FCL11 to the flag cell of the memory unit MU21 of the next row or transfers the flag data of the flag node of the flag cell of the memory unit MU21 of the next row to the flag node ND11 of the flag cell FCL11.

The transfer gate TG112 is configured by connecting sources and drains of a PMOS transistor PT114b and an NMOS transistor NT116b. One input/output terminal is connected to the flag node ND11 of the flag cell FCL11, and the other input/output terminal is connected to the flag cell of the adjacent memory unit MU12.

A gate of the PMOS transistor PT114b is connected to the second memory node ND2b of the memory cell M112, and a gate of the NMOS transistor NT116b is connected to the first memory node ND1b of the memory cell M112.

Namely, when the correlation result data of the logic "1" is stored in the memory cell M112, the transfer gate TG112 transfers the flag data of the flag node ND11 of the flag cell FCL11 to the flag cell of the memory unit MU12 of the next column or transfers the flag data of the flag node of the flag cell of the memory unit MU12 of the next column to the flag node ND11 of the flag cell FCL11.

The memory unit MU12 is configured by the memory cells M121 and M122 comprised of SRAMs, a flag cell FCL21, and transfer gates TG121 and TG122.

The memory cell M121 has PMOS transistors PT121a and PT122a and NMOS transistors NT121a to NT124a.

The PMOS transistor PT121a serving as the load and the NMOS transistor NT121a are connected in series between the supply line of the power source voltage VDD and the supply line of the reference voltage (0V) VSS. Similarly, the PMOS transistor PT122a serving as the load and the NMOS transistor NT122a are connected in series between the supply line of the power source voltage VDD and the supply line of the reference voltage (0V) VSS.

A first memory node ND1c is configured by a connection point of drains of the PMOS transistor PT121a and the NMOS transistor NT121a. The first memory node ND1a is connected to a gate of the PMOS transistor PT122a, a gate of the NMOS transistor NT122a, the transfer gate TG121, and the bit line BL2 via the NMOS transistor NT123a serving as the access transistor. Note that a gate of the NMOS transistor NT123a serving as the access transistor is connected to the word line WL0.

A second memory node ND2c is configured by the connection point of drains of the PMOS transistor PT122a and the NMOS transistor NT122a. The second memory node ND2c is connected to a gate of the PMOS transistor PT121a, a gate of the NMOS transistor NT121a, the transfer gate TG121, and the inverted bit line /BL2 via the NMOS transistor NT124a serving as the access transistor. Note that a gate of the NMOS transistor NT124a serving as the access transistor is connected to the word line WL0.

The memory cell M122 has PMOS transistors PT121b and PT122b and NMOS transistors NT121b to NT124b.

The PMOS transistor PT121b serving as the load and the NMOS transistor NT121b are connected in series between the supply line of the power source voltage VDD and the supply line of the reference voltage (0V) VSS. Similarly, the PMOS transistor PT122b serving as the load and the NMOS transistor NT122b are connected in series between the supply line of the power source voltage VDD and the supply line of the reference voltage (0V) VSS.

A first memory node ND1d is configured by the connection point of drains of the PMOS transistor PT121b and the NMOS transistor NT121b. The first memory node ND1d is connected to a gate of the PMOS transistor PT122b, a gate of the NMOS transistor NT122b, the transfer gate TG122, and the bit line BL3 via the NMOS transistor NT123b serving as the access transistor. Note that a gate of the NMOS transistor NT123b serving as the access transistor is connected to the word line WL0.

A second memory node ND2d is configured by the connection point of drains of the PMOS transistor PT122b and the NMOS transistor NT122b. The second memory node ND2d is connected to a gate of the PMOS transistor PT121b, a gate of the NMOS transistor NT121b, the transfer gate TG122, and the inverted bit line /BL3 via the NMOS transistor NT124b serving as the access transistor. Note that a gate of the NMOS transistor NT124b serving as the access transistor is connected to the word line WL0.

The flag cell FCL12 of the memory unit MU12 is configured by a PMOS transistor PT123, an NMOS transistor NT125, and a buffer BF121.

The PMOS transistor PT123 and the NMOS transistor NT125 are connected in series between the supply line of the power source voltage VDD and the supply line of the reference voltage (0V) VSS. A gate of the PMOS transistor PT123 is connected to the supply line of the set signal /S, and a gate of the NMOS transistor NT125 is connected to the supply line of the reset signal R.

The flag node ND12 is configured by the connection point of the drains of the PMOS transistor PT123 and the NMOS transistor NT125. The flag node ND12 is connected to the transfer gates TG121 and TG122. Also, the signal set in the flag node ND12 is output via the buffer BF121 to the image combining unit 7 as the output OUT.

The transfer gate TG121 is configured by connecting sources and drains of a PMOS transistor PT124a and an NMOS transistor NT126a. One input/output terminal is connected to the flag node ND12 of the flag cell FCL12, and the other input/output terminal is connected to the flag cell of the adjacent memory unit MU22.

A gate of the PMOS transistor PT124a is connected to the second memory node ND2c of the memory cell M121, and a gate of the NMOS transistor NT126a is connected to the first memory node ND1a of the memory cell M121.

Namely, when the correlation result data of the logic "1" is stored in the memory cell M121, the transfer gate TG121 transfers the flag data of the flag node ND12 of the flag cell FCL12 to the flag cell of the memory unit MU22 of the next row or transfers the flag data of the flag node of the flag cell of the memory unit MU22 of the next row to the flag node ND12 of the flag cell FCL12.

The transfer gate TG122 is configured by connecting sources and drains of a PMOS transistor PT124b and an NMOS transistor NT126b. One input/output terminal is connected to the flag node ND12 of the flag cell FCL12, and the other input/output terminal is connected to the flag cell of the adjacent memory unit MU13.

A gate of the PMOS transistor PT124b is connected to the second memory node ND2d of the memory cell M122, and a gate of the NMOS transistor NT126b is connected to the first memory node ND1d of the memory cell M122.

Namely, when the correlation result data of the logic "1" is stored in the memory cell M122, the transfer gate TG122 transfers the flag data of the flag node ND12 of the flag cell FCL12 to the flag cell of the memory unit MU13 of the next column or transfers the flag data of the flag node of the flag cell of the memory unit MU13 of the next column to the flag node ND12 of the flag cell FCL12.

The memory unit MU21 is configured by the memory cells M211 and M212 comprised of SRAMs, a flag cell FCL21, and transfer gates TG211 and TG212.

The memory cell M211 has PMOS transistors PT211a and PT212a and NMOS transistors NT211a to NT214a.

The PMOS transistor PT211a serving as the load and the NMOS transistor NT211a are connected in series between the supply line of the power source voltage VDD and the supply line of the reference voltage (0V) VSS. Similarly, the PMOS transistor PT212a serving as the load and the NMOS transistor NT212a are connected in series between the supply line of the power source voltage VDD and the supply line of the reference voltage (0V) VSS.

A first memory node ND1e is configured by a connection point of drains of the PMOS transistor PT211a and the NMOS transistor NT211a. The first memory node ND1e is connected to a gate of the PMOS transistor PT212a, a gate of the NMOS transistor NT212a, the transfer gate TG211, and the bit line BL0 via the NMOS transistor NT213a serving as the access transistor. Note that a gate of the NMOS transistor NT213a serving as the access transistor is connected to the word line WL1.

A second memory node ND2e is configured by the connection point of drains of the PMOS transistor PT212a and the NMOS transistor NT212a. The second memory node ND2e is connected to a gate of the PMOS transistor PT211a, a gate of the NMOS transistor NT211a, the transfer gate TG211, and the inverted bit line /BL0 via the NMOS transistor NT214a serving as the access transistor. Note that a gate of the NMOS transistor NT214a serving as the access transistor is connected to the word line WL1.

The memory cell M212 has PMOS transistors PT211b and PT212b and NMOS transistors NT211b to NT214b.

The PMOS transistor PT211b serving as the load and the NMOS transistor NT211b are connected in series between the supply line of the power source voltage VDD and the supply line of the reference voltage (0V) VSS. Similarly, the PMOS transistor PT212b serving as the load and the NMOS transistor NT212b are connected in series between the supply line of the power source voltage VDD and the supply line of the reference voltage (0V) VSS.

A first memory node ND1f is configured by the connection point of drains of the PMOS transistor PT211b and the NMOS transistor NT211b. The first memory node ND1f is connected to a gate of the PMOS transistor PT212b, a gate of the NMOS transistor NT212b, the transfer gate TG212, and the bit line BL1 via the NMOS transistor NT213b serving as the access transistor. Note that a gate of the NMOS transistor NT213b serving as the access transistor is connected to the word line WL1.

A second memory node ND2f is configured by the connection point of drains of the PMOS transistor PT212b and the NMOS transistor NT212b. The second memory node ND2f is connected to a gate of the PMOS transistor PT211b, a gate of the NMOS transistor NT211b, the transfer gate TG212, and the inverted bit line /BL1 via the NMOS transistor NT214b serving as the access transistor. Note that a gate of the NMOS transistor NT214b serving as the access transistor is connected to the word line WL1.

The flag cell FCL21 of the memory unit MU21 is configured by a PMOS transistor PT213, an NMOS transistor NT215, and a buffer BF211.

The PMOS transistor PT213 and the NMOS transistor NT215 are connected in series between the supply line of the power source voltage VDD and the supply line of the reference voltage (0V) VSS. A gate of the PMOS transistor PT213 is connected to the supply line of the set signal /S, and a gate of the NMOS transistor NT215 is connected to the supply line of the reset signal R.

The flag node ND21 is configured by the connection point of the drains of the PMOS transistor PT213 and the NMOS transistor N215, and the node ND21 is connected to the transfer gates TG211 and TG212. Also, the signal set in the node ND21 is output via the buffer BF211 to the image combining unit 7 as the output OUT.

The transfer gate TG211 is configured by connecting sources and drains of a PMOS transistor PT214a and an NMOS transistor NT216a. One input/output terminal is connected to the flag node ND21 of the flag cell FCL21, and the other input/output terminal is connected to the flag cell of the adjacent memory unit MU31.

A gate of the PMOS transistor PT214a is connected to the second memory node ND2e of the memory cell M211, and a gate of the NMOS transistor NT216a is connected to the first memory node ND1f of the memory cell M211.

Namely, when the correlation result data of the logic "1" is stored in the memory cell M211, the transfer gate TG211 transfers the data of the flag node ND21 of the flag cell FCL21 to the flag cell of the memory unit MU31 of the next row or transfers the data of the flag node of the flag cell of the memory unit MU31 of the next row to the flag node ND21 of the flag cell FCL21.

The transfer gate TG212 is configured by connecting sources and drains of a PMOS transistor PT214b and an NMOS transistor NT216b. One input/output terminal is connected to the flag node ND21 of the flag cell FCL21, and the other input/output terminal is connected to the flag cell of the adjacent memory unit MU22.

A gate of the PMOS transistor PT214b is connected to the second memory node ND2f of the memory cell M212, and a gate of the NMOS transistor NT216b is connected to the first memory node ND1f of the memory cell M212.

Namely, when the correlation result data of the logic "1" is stored in the memory cell M212, the transfer gate TG212 transfers the data of the flag node ND21 of the flag cell FCL21 to the flag cell of the memory unit MU22 of the next column or transfers the data of the flag node of the flag cell of the memory unit MU22 of the next column to the flag node ND21 of the flag cell FCL21.

The memory unit MU22 is configured by the memory cells M221 and M222 comprised of SRAMs, a flag cell FCL22, and transfer gates TG221 and TG222.

The memory cell M221 has PMOS transistors PT221a and PT222a and NMOS transistors NT221a to NT224a.

The PMOS transistor PT221a serving as the load and the NMOS transistor NT221a are connected in series between the supply line of the power source voltage VDD and the supply line of the reference voltage (0V) VSS. Similarly, the PMOS transistor PT222a serving as the load and the NMOS transistor NT222a are connected in series between the supply line of the power source voltage VDD and the supply line of the reference voltage (0V) VSS.

A first memory node ND1g is configured by a connection point of drains of the PMOS transistor PT221a and the NMOS transistor NT221a. The first memory node ND1g is connected to a gate of the PMOS transistor PT222a, a gate of the NMOS transistor NT222a, the transfer gate TG221, and the bit line BL2 via the NMOS transistor NT223a serving as the access transistor. Note that a gate of the NMOS transistor NT223a serving as the access transistor is connected to the word line WL1.

A second memory node ND2g is configured by the connection point of drains of the PMOS transistor PT222a and the NMOS transistor NT222a. The second memory node ND2g is connected to a gate of the PMOS transistor PT221a, a gate of the NMOS transistor NT221a, the transfer gate TG221, and the inverted bit line /BL2 via the NMOS transistor NT224a serving as the access transistor. Note that a gate of the NMOS transistor NT224a serving as the access transistor is connected to the word line WL1.

The memory cell M222 has PMOS transistors PT221b and PT222b and NMOS transistors NT221b to NT224b.

The PMOS transistor PT221b serving as the load and the NMOS transistor NT221b are connected in series between the supply line of the power source voltage VDD and the supply line of the reference voltage (0V) VSS. Similarly, the PMOS transistor PT222b serving as the load and the NMOS transistor NT222b are connected in series between the supply line of the power source voltage VDD and the supply line of the reference voltage (0V) VSS.

A first memory node ND1h is configured by the connection point of drains of the PMOS transistor PT221b and the NMOS transistor NT221b. The first memory node ND1h is connected to a gate of the PMOS transistor PT222b, a gate of the NMOS transistor NT222b, the transfer gate TG222, and the bit line BL3 via the NMOS transistor NT223b serving as the access transistor. Note that a gate of the NMOS transistor NT223b serving as the access transistor is connected to the word line WL1.

A second memory node ND2h is configured by the connection point of drains of the PMOS transistor PT222b and the NMOS transistor NT222b. The second memory node ND2h is connected to a gate of the PMOS transistor PT221b, a gate of the NMOS transistor NT221b, the transfer gate TG222, and the inverted bit line /BL3 via the NMOS transistor NT224b serving as the access transistor. Note that a gate of the NMOS transistor NT224b serving as the access transistor is connected to the word line WL1.

The flag cell FCL22 of the memory unit MU22 is configured by a PMOS transistor PT223, an NMOS transistor NT225, and a buffer BF221.

The PMOS transistor PT223 and the NMOS transistor NT225 are connected in series between the supply line of the power source voltage VDD and the supply line of the reference voltage (0V) VSS. A gate of the PMOS transistor PT223 is connected to the supply line of the set signal /S, and a gate of the NMOS transistor NT225 is connected to the supply line of the reset signal R.

The flag node ND22 is configured by the connection point of the drains of the PMOS transistor PT223 and the NMOS transistor NT225. The flag node ND12 is connected to the transfer gates TG221 and TG222. Also, the signal set in the flag node ND22 is output via the buffer BF221 to the image combining unit 7 as the output OUT.

The transfer gate TG221 is configured by connecting sources and drains of a PMOS transistor PT224a and an NMOS transistor NT226a. One input/output terminal is connected to the flag node ND22 of the flag cell FCL22, and the other input/output terminal is connected to the flag cell of the adjacent memory unit MU32.

A gate of the PMOS transistor PT224a is connected to the second memory node ND2g of the memory cell M221, and a gate of the NMOS transistor NT226a is connected to the first memory node ND1g of the memory cell M221.

Namely, when the correlation result data of the logic "1" is stored in the memory cell M221, the transfer gate TG221 transfers the data of the flag node ND22 of the flag cell FCL22 to the flag cell of the memory unit MU32 of the next row or transfers the data of the flag node of the flag cell of the memory unit MU32 of the next row to the flag node ND22 of the flag cell FCL22.

The transfer gate TG222 is configured by connecting sources and drains of a PMOS transistor PT224b and an NMOS transistor NT226b. One input/output terminal is connected to the flag node ND22 of the flag cell FCL22, and the other input/output terminal is connected to the flag cell of the adjacent memory unit MU23.

A gate of the PMOS transistor PT224b is connected to the second memory node ND2h of the memory cell M222, and a gate of the NMOS transistor NT226b is connected to the first memory node ND1h of the memory cell M222.

Namely, when the correlation result data of the logic "1" is stored in the memory cell M222, the transfer gate TG222 transfers the flag data of the flag node ND22 of the flag cell FCL22 to the flag cell of the memory unit MU23 of the next column or transfers the flag data of the flag cell of the memory unit MU23 of the next column to the flag node ND22 of the flag cell FCL22.

Figure 7:
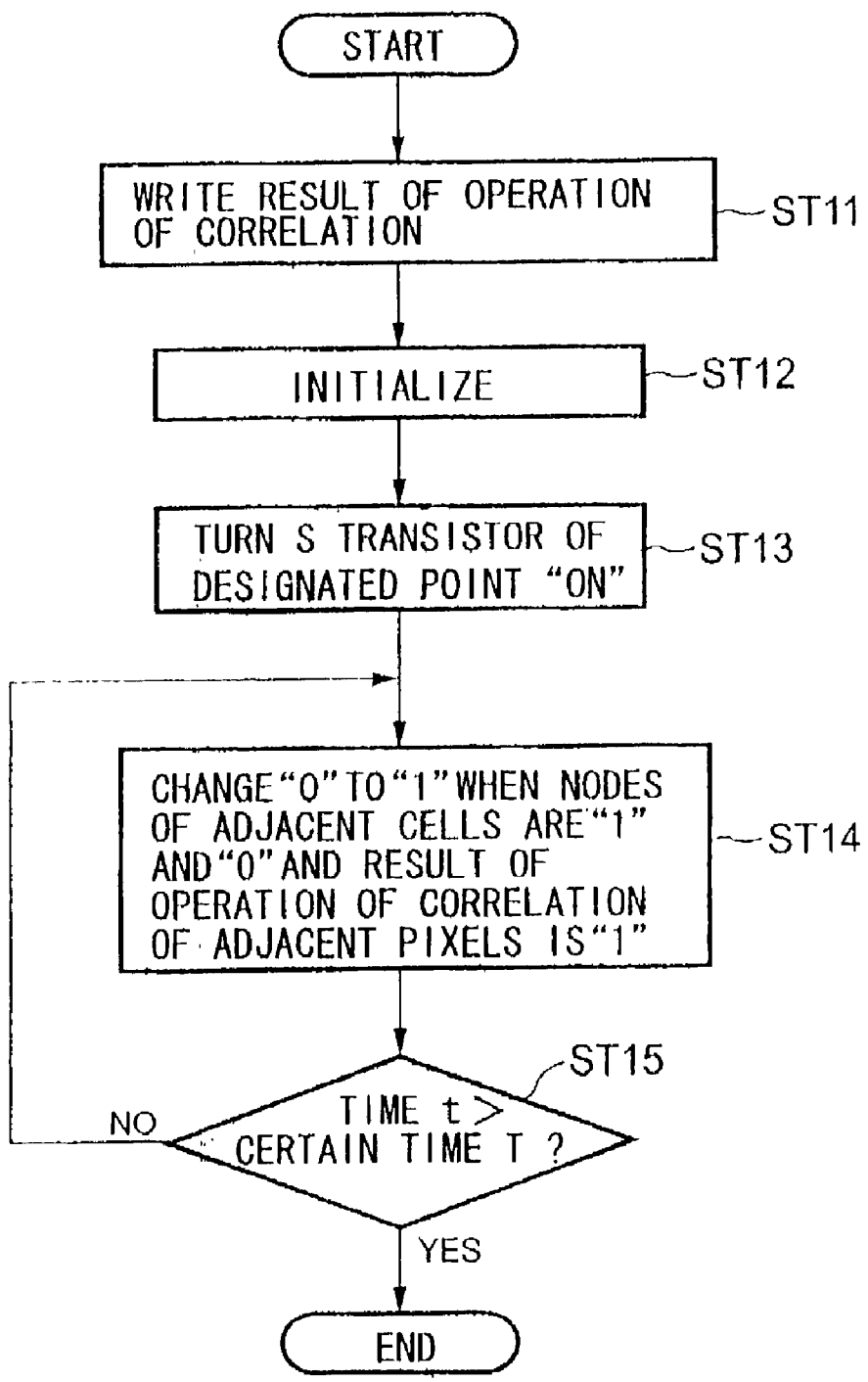
FIG. 7 is a flowchart for explaining the operation of the region growing circuit according to the present invention.

Next, the region growing operation will be explained in relation to the flowchart of FIG. 7.

First, the results of the operation of correlation of the adjacent pixels obtained at the correlation operational unit 3, that is, the results of operation of the logic "1" or "0", are written into the M×N memory cells (ST11).

At this time, the results of operation of correlation are supplied as the signal S3 to the memory control circuit 52. Data is written in a memory cell, in the same way as the usual SRAM, by selecting the address of the memory cell using the memory control circuit 52, X decoder 53, and Y decoder 54 and writing the data into the selected memory cell M.

For example, when writing the data "1" into the memory cell M111 of the memory unit MU11, the voltage of the word line WL0 is set from 0V to the power source voltage VDD+α (α is the threshold voltage of the NMOS transistor serving as the access transistor or more) for a constant time by the X decoder 53.

Due to this, the NMOS transistors NT113a and NT114a serving as the access transistors of the memory cell M111 of the memory unit MU11 become the conductive state. The first memory node ND1a is connected to the bit line BL0, and the second node ND2a is connected to the inverted bit line /BL0. Note that in actuality, also the access transistors of the other memory units arranged in the same row as the memory unit MU11 and connected to the same word line WL0 become the conductive state.

Also, by the Y decoder 54, after precharging to for example the predetermined potential, the bit line BL0 is set at the power source voltage VDD level, and the inverted bit line /BL0 is set at the ground level 0V.

As a result, the charge of the bit line BL0 is supplied to the first memory node ND1a, and the charge of the second memory node ND2a is discharged.

Accordingly, the potential of the first memory node ND1a rises to the power source voltage VDD level, and the level of the second memory node ND2a becomes the ground level. Along with the rise of the potential of the first memory node ND1a to the power source voltage VDD level, the PMOS transistor PT112 cuts off, the NMOS transistor NT112a becomes the conductive state, and the potential of the second memory node ND2a is stably held at the ground level.

Also, along with the potential of the second memory node ND2a becoming the ground level, the PMOS transistor PT111a becomes the conductive state, the NMOS transistor NT111a cuts off, and the potential of the first memory node ND1a is stably held at the power source voltage VDD level.

Due to this, the voltage of the word line WL0 is set at 0V. Even after the NMOS transistors NT113a and NT114a cut off, the data "1" is latched in the first memory node ND1a.

The data "1" of the power source voltage VDD level is latched to the first memory node ND1a, and the second memory node ND2a is held at the ground level, therefore, the PMOS transistor PT114a and the NMOS transistor NT116a of the transfer gate TG111 of the memory unit MU11 become the conductive state and the transfer gate TG111 transfers the data of the flag node ND11 of the flag cell FCL11 to the flag cell of the memory unit MU21 of the next row or transfers the data of the flag node of the flag cell FCL21 of the memory unit MU21 of the next row to the flag node ND11 of the flag cell FCL11.

Also, for example, when writing the data "0" into the memory cell M222 of the memory unit MU22, the voltage of the word line WL1 is set from 0V to the power source voltage VDD+α (α is the threshold voltage of the NMOS transistor serving as the access transistor or more) for a constant time by the X decoder 53.

Due to this, the NMOS transistors NT223b and NT224b serving as the access transistors of the memory cell M222 of the memory unit MU22 become the conductive state. The first memory node ND1h is connected to the bit line BL3, and the second node ND2h is connected to the inverted bit line /BL3. Note that in actuality, also the access transistors of the other memory units arranged in the same row as the memory unit MU22 and connected to the same word line WL1 become the conductive state.

Also, by the Y decoder 54, after precharging to for example the predetermined potential, the bit line BL3 is set at the ground level 0V, and the inverted bit line /BL3 is set at the power source voltage VDD level.

As a result, the charge of the first memory node ND1h is discharged, and the charge of the inverted bit line /BL is supplied to the second memory node ND2h.

Accordingly, the level of the first memory node ND1h becomes the ground level, and the potential of the second memory node ND2h rises to the power source voltage VDD level.

Along with the potential of the first memory node ND1h becoming the ground level, the PMOS transistor PT222b becomes the conductive state, the NMOS transistor NT222b cuts off, and the potential of the second memory node ND2h is stably held at the power source voltage VDD level.

Also, along with the potential of the second memory node ND1h rising to the power source voltage VDD level, the PMOS transistor PT221b cuts off, the NMOS transistor NT221b becomes the conductive state, and the potential of the first memory node ND1h is stably held at the ground level.

Due to this, the voltage of the word line WL1 is set at 0V. Even after the NMOS transistors NT223b and NT224b cut off, the data "0" is latched in the first memory node ND1h.

The data "0" of the ground level is latched to the first memory node ND1h, and the second memory node ND2a is held at the power source voltage VDD level, therefore the PMOS transistor PT224b and the NMOS transistor NT226b of the transfer gate TG222 of the memory unit MU22 cut off and the transfer gate TG222 is held in a state unable to transfer the data of the flag node ND22 of the flag cell FCL22 to the flag cell of the memory unit MU23 of the next column or unable to transfer the data of the flag node of the flag cell of the memory unit MU23 of the next column to the flag node ND22 of the flag cell FCL22.

Figure 8:
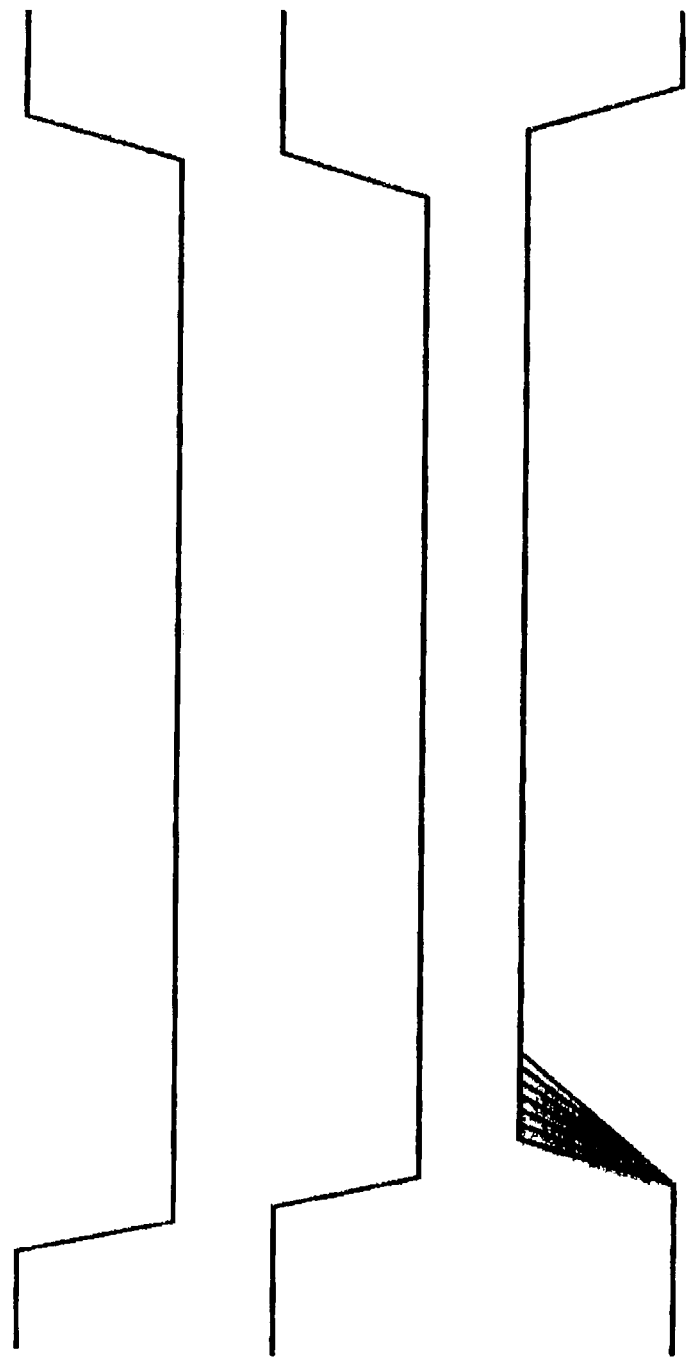
FIGS. 8A to 8C are timing charts for explaining the operation of the region growing circuit according to the present invention.

Next, when the data of all pixels worth of the correlation values are written into the memory cells, as shown in FIG. 8A, a high level active reset signal R is supplied to the gates of the NMOS transistors configuring the flag cells FCL11 to FCL88 of all memory units MU11 to MU88.

Due to this, the data of the flag nodes ND11 to ND88 of the flag cells FCL11 to FCL88 of all memory units MU11 to MU88 are reset to "0", and, along with this, as shown in FIG. 8C, all flag outputs OUT are reset to "0" (ST12).

By this reset operation, the preparations for the region growing are completed.

Next, the gates of the PMOS transistors PT configuring the flag cell FCL of a particular memory unit MU at a position (address) designated by the pointing device 6 are, as shown in FIG. 8B, supplied with a low level active set signal /S.

Due to this, only the flag node of the flag cell of that particular memory unit cell rises to the power source voltage VDD level and becomes able to output the data "1" (ST13).

Then, the "1" level of that particular memory unit is transferred successively via the transfer gate TG connected to the memory cell around that particular memory unit. The data "1" is output as the flag output OUT from the flag cell of each memory unit to which the "1" level was transferred to the image combining unit 7 (ST14, ST15).

Here, if the transfer gate connected to a memory cell is in the off state, the region growing processing stops there and the processing is ended.

The operation after the reset will be concretely explained next in relation to the circuit of FIG. 6.

Here, for simplification, it is assumed that that particular memory unit is MU11, the data "1" is written in the memory cells M111 and M112 of the memory unit MU11, the memory cell M121 of the memory unit MU12, and the memory cell M212 of the memory unit MU21, and the data "0" is written in the memory cell M122 of the memory unit MU12, the memory cell M211 of the memory unit MU21, and the memory cells M221 and M222 of the memory unit MU22.

When MU11 is designated as that particular memory unit by the pointing device 6, the low level active set signal /S is supplied to the gate of the PMOS transistor PT113 configuring the flag cell FCL11 of the memory unit MU11. Due to this, the PMOS transistor PT113 is held in the conductive state, the potential of the flag node ND11 of the flag cell FCL11 rises to the power source voltage VDD level, and the data in the flag node ND11 is set at "1" of the power source voltage VDD level. The flag data "1" of the flag node ND11 is output as the flag output OUT to the image combining unit 7 via the buffer BF111.

Then, since the data "1" of the power source voltage VDD level has been latched in the memory cells M111 and M112 of the memory unit MU11, the transfer gates TG111 and TG112 are held in the conductive state.

Accordingly, the flag data "1" of the flag node ND11 of the flag cell FCL11 is transferred through the transfer gate TG111 to the flag node ND21 of the flag cell FCL21 of the memory unit MU21 of the next row. Due to this, the flag data "1" of the flag node ND21 of the flag cell FCL21 of the memory unit MU21 is output as the flag output OUT to the image combining unit 7 via the buffer BF211.

Similarly, the flag data "1" of the flag node ND11 of the flag cell FCL11 is transferred through the transfer gate TG112 to the flag node ND12 of the flag cell FCL12 of the memory unit MU12 of the next column. Due to this, the flag data "1" of the flag node ND12 of the flag cell FCL12 of the memory unit MU12 is output as the flag output OUT to the image combining unit 7 via the buffer BF121.

Here, since the data "1" has been latched in the memory cell M121 of the memory unit MU12 and the data "0" has been latched in the memory cell M122 of the memory unit MU12, the transfer gate TG121 is held in the conductive state, and the transfer gate TG122 is held in the cut off state.

Accordingly, the flag data "1" of the flag node ND12 of the flag cell FCL12 is transferred through the transfer gate TG121 to the flag node ND22 of the flag cell FCL22 of the memory unit MU22 of the next row.

Contrary to this, the transfer gate TG122 is held in the cut off state, so the flag data "1" is not transferred to the memory unit MU13 of the next column.

Also, since the data "0" has been latched in the memory cell M211 of the memory unit MU21 and the data "1" has been latched in the memory cell M212 of the memory unit MU21, the transfer gate TG211 is held in the cut off state, and the transfer gate TG212 is held in the conductive state.

Accordingly, the flag data "1" of the flag node ND21 of the flag cell FCL21 is not transferred through the transfer gate TG211 to the memory unit MU31 of the next row.

Contrary to this, the data "1" of the flag node ND21 of the flag cell FCL21 is transferred through the transfer gate TG212 to the flag node ND22 of the flag cell FCL22 of the memory unit MU22 of the next column.

Due to this, the data "1" of the flag node ND22 of the flag cell FCL22 of the memory unit MU22 is output via the buffer BF221 to the image combining unit 7 as the flag output OUT.

Also, since the data "0" has been latched in the memory cell M221 of the memory unit MU22 and the data "0" has been latched also in the memory cell M222 of the memory unit MU22, the transfer gates TG221 and TG222 are held in the cut off state.

Accordingly, the data "1" of the flag node ND22 of the flag cell FCL22 is not transferred to the memory unit MU32 of the next row through the transfer gate TG221.

Similarly, the data "1" of the flag node ND22 of the flag cell FCL22 is not transferred to the memory unit MU23 of the next column through the transfer gate TG222.

That is, the region growing processing stops there and the processing is ended.

Figure 9:
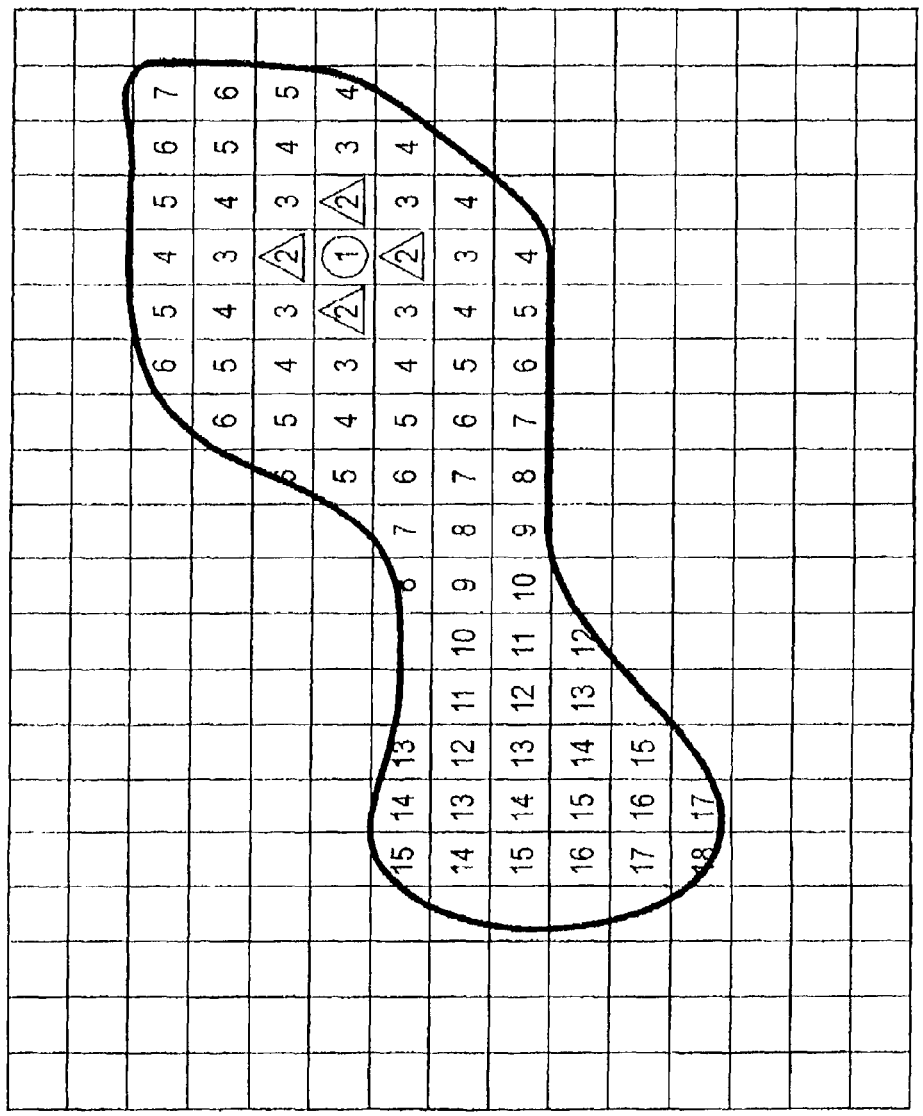
FIG. 9 is a view for explaining the region growing operation according to the present invention.

The above description was that of the concrete region growing operation in 2×2 memory units, but in actuality, as shown in FIG. 9, the region growing operationis carried out for a further broader region. The numbers in FIG. 9 indicate the numbers of steps of the processing.

In the example of FIG. 9, the memory unit assigned the number 1 is designated by the pointing device 6, and the region is grown up-bottom and left-right around that particular memory unit. Next, the region is grown up-bottom and left-right around the memory units assigned the number 2, then the region is grown up-bottom and left-right around the memory units assigned the number 3, i.e., for so-called radial region growing.

As explained above, according to the present embodiment, there is provided a region growing circuit 5 having a memory array 51 comprised of a matrix of memory units MU11 to MU88 each having two memory cells M adjacent to each other in the same row, one flag cell FCL, and two transfer gates TG serving as data transferring means for transferring the flag data of the flag cell FCL to the flag cells FCL of the memory units MU adjacent in the row direction and the column direction in accordance with the stored data of each memory cell M, wherein the flag cells FCL11 to FCL88 set data of a predetermined level, for example, the data "1" of the power source voltage VDD level, when the level of the flag nodes ND11 to ND88 of the data is designated by the pointing device 6, and output the same as the flag output OUT to the combining unit 7 and writing "1" or "0" data of the results of operation of correlation of adjacent pixels by the correlation operational unit 3 at a predetermined address of the memory, for example, writing 1 frames worth of the correlation data, and then starting the region growing processing from a position (address) input by the pointing device 6 to extract an object and output the same to the image combining unit 7, therefore there are the advantages that a striking increase in the speed of the region growing algorithm, which conventionally has been told to take a long processing time, can be achieved and real time operation becomes possible.

Also, the present circuit configuration is comprised of asynchronous circuits, therefore no clock is needed and a lower power consumption can be achieved.

Note that needless to say the concrete configuration of the region growing circuit 5 is not limited to the configuration of FIG. 6. Various modifications are possible. Also, in the above embodiment, the explanation was given of a circuit able to grow a region in the left-right and up-bottom directions, but of course the present invention can employ a circuit configuration able to grow a region also in the oblique direction, a circuit configuration able to grow a region in the time direction, and a circuit configuration able to grow a region also in a hierarchical direction.

Below, an explanation will be given of other examples of the configuration of the region growing circuit and the configurations and functions of the main parts of an example of a circuit able to grow a region also in the oblique direction, an example of a circuit able to grow a region also in the time direction, and an example of a circuit able to grow a region also in the hierarchical direction in order in relation to the drawings.

Figure 10:
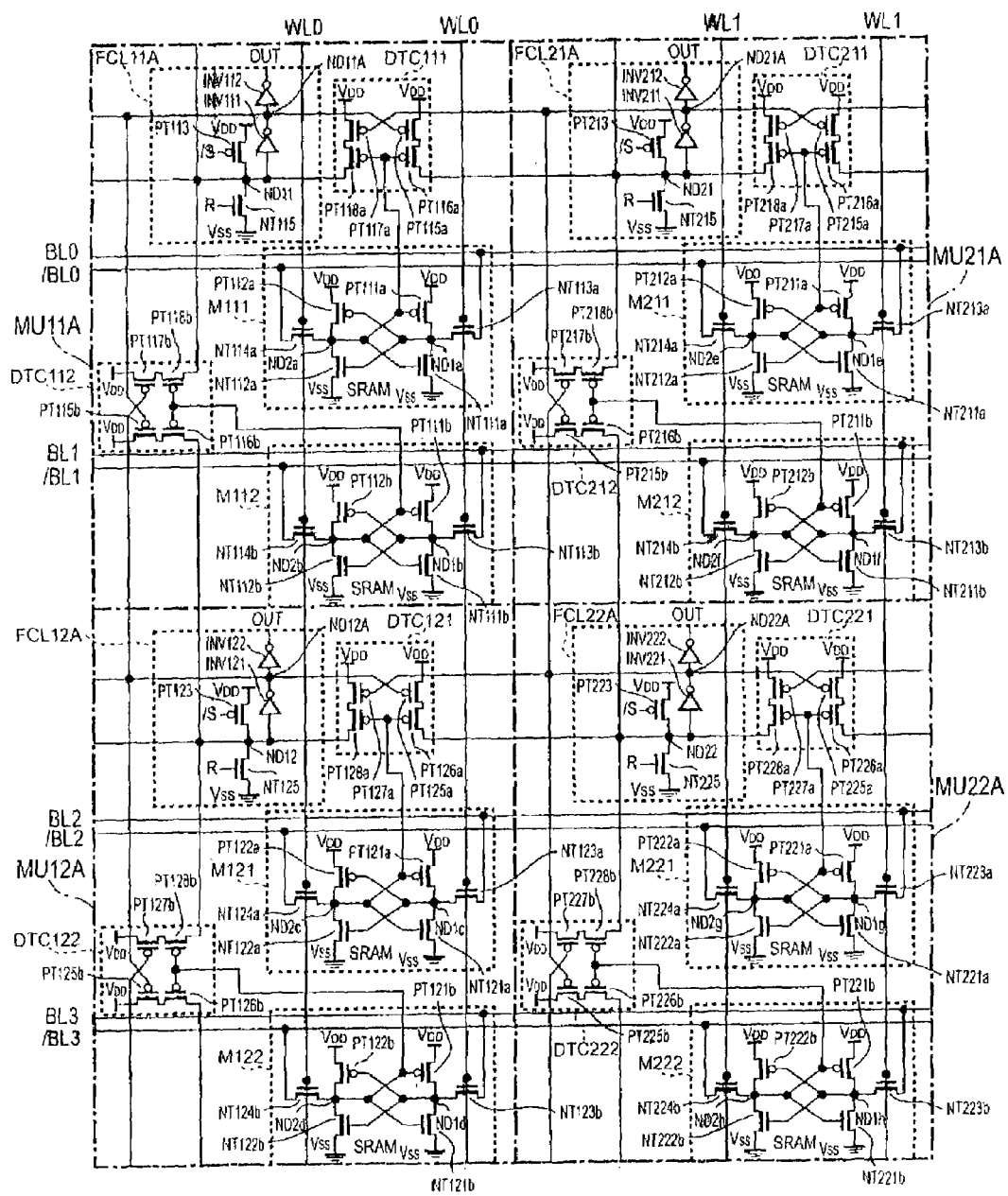
FIG. 10 is a circuit diagram of a second example of the configuration of a memory unit of a memory array in a region growing circuit able to grow a region in the left-right and up-bottom directions according to the present invention.

FIG. 10 is a circuit diagram of a second example of the configuration of the memory unit of the memory array in a region growing circuit able to grow a region in the left-right and up-bottom directions according to the present invention.

The difference of the circuit 51A of FIG. 10 from the circuit 51 of FIG. 6 resides in that the data transferring means of each memory unit is configured by the data transfer circuit DTC for receiving the latch data of the second memory node of the memory cell at its gate and supplying the signal of the power source voltage VDD level to the flag cell of the memory unit of the next row or the next column in place of the transfer gate and in that, for the control of this data transfer circuit DTC, the buffer of each flag cell FCL is configured by serially connected two inverters INV.

Note that in FIG. 10, the same components as those of FIG. 6 are assigned the same reference notations.

The memory unit MU11A is configured by the memory cells M111 and M112, data transfer circuits DTC111, DTC112, and a flag cell FCL11A.

Among these components, the configurations of the memory cells M111 and M112 are similar to those of the circuit of FIG. 6, so the explanation will be omitted here.

The flag cell FCL11A of the memory unit MU11A is configured by the PMOS transistor PT113, NMOS transistor NT115, and two serially connected inverters INV111 and INV112.

The PMOS transistor PT113 and the NMOS transistor NT115 are connected in series between the supply line of the power source voltage VDD and the supply line of the reference voltage (0V) VSS. The gate of the PMOS transistor PT113 is connected to the supply line of the set signal /S, and the gate of the NMOS transistor NT115 is connected to the supply line of the reset signal R.

The flag node ND11 is configured by the connection point of the drains of the PMOS transistor PT113 and the NMOS transistor NT115. The flag node ND11 is connected to an input terminal of the inverter INV111 and the data transfer circuits DTC111 and DTC112. Also, the inverted node ND11A is configured by the connection point of an output terminal of the inverter INV111 and the inverter INV112, and this inverted node ND11A is connected to the data transfer circuits DTC111 and DTC112.

Then, the signal set at the node ND11 is output via the inverters INV111 and INV112 to the image combining unit 7 as the output OUT.

The data transfer circuit DTC111 is configured by PMOS transistors PT115$a$ to PT118$a$.

The PMOS transistors PT115$a$ and PT116$a$ are connected in series between the supply line of the power source voltage VDD (power source potential corresponding to the level of the flag data) and the flag node ND21 of the flag cell FCL21A of the memory unit MU21A of the next row.

Also, the PMOS transistors PT117$a$ and PT118$a$ are connected in series between the supply line of the power source voltage VDD and the flag node ND11 of the flag cell FCL11A of the memory unit MU11A.

Gates of the PMOS transistors PT116$a$ and PT118$a$ are connected to the second memory node ND2$a$ of the memory cell M111, a gate of the PMOS transistor PT115$a$ is connected to the inverted node ND11A of the flag cell FCL11A, and a gate of the PMOS transistor PT117$a$ is connected to the inverted node ND21A of the flag cell FCL21A of the memory unit MU21A of the next row.

In the data transfer circuit DTC111 having such a configuration, in the case where the correlation result data of the logic "1" is stored in the memory cell M111, the data "0" has been latched in the second memory node ND2$a$, and the memory unit MU11A is designated as the particular memory unit of the region growing, the flag data "1" of the power source voltage VDD level is set in the flag node ND11, so the inverted node ND11A becomes the 0V of the ground level. As a result, the PMOS transistors PT115$a$ and PT116$a$ become the conductive state and supply charges to the flag node ND21 of the flag cell FCL21A of the memory unit MU21A of the next row. Namely, the flag data "1" is transferred to the flag node ND21 of the flag cell FCL21A of the memory unit MU21A.

On the other hand, in the data transfer circuit DTC111, in the case where the correlation result data of the logic "1" is stored in the memory cell M111, the data "0" has been latched in the second memory node ND2$a$, and the memory unit MU21A is designated as the particular memory unit of the region growing, the flag data "1" of the power source voltage VDD level is set in the flag node ND21, so the inverted node ND21A becomes the 0V of the ground level. As a result, the PMOS transistors PT117$a$ and PT118$a$ become the conductive state and supply charges to the flag node ND11 of the flag cell FCL11A of their own memory unit MU11A. Namely, the flag data "1" of the flag node ND21 of the flag cell FCL21A of the memory unit MU21A is transferred to the flag node ND11.

In this way, the data transfer circuit DTC111 has the function of transferring the data to both directions in the left-right direction of FIG. 10.

The data transfer circuit DTC112 is configured by PMOS transistors PT115$b$ to PT118$b$.

The PMOS transistors PT115$b$ and PT116$b$ are connected in series between the supply line of the power source voltage VDD and the flag node ND12 of the flag cell FCL12A of the memory unit MU12A of the next column.

Also, the PMOS transistors PT117$b$ and PT118$b$ are connected in series between the supply line of the power source voltage VDD and the flag node ND11 of the flag cell FCL11A of the memory unit MU11A.

Gates of the PMOS transistors PT116$b$ and PT118$b$ are connected to the second memory node ND2$b$ of the memory cell M112, a gate of the PMOS transistor PT115$b$ is connected to the inverted node ND11A of the flag cell FCL11A, and a gate of the PMOS transistor PT117$b$ is connected to the inverted node ND12A of the flag cell FCL12A of the memory unit MU12A of the next column.

In the data transfer circuit DTC112 having such a configuration, in the case where the correlation result data of the logic "1" is stored in the memory cell M112, the data "0" has been latched in the second memory node ND2$b$, and the memory unit MU11A is designated as the particular memory unit of the region growing, the flag data "1" of the power source voltage VDD level is set in the flag node ND11, so the inverted node ND11A becomes the 0V of the ground level. As a result, the PMOS transistors PT115$b$ and PT116$b$ become the conductive state and supply charges to the flag node ND12 of the flag cell FCL12A of the memory unit MU12A of the next column. Namely, the flag data "1" is transferred to the flag node ND12 of the flag cell FCL12A of the memory unit MU12A.

On the other hand, in the data transfer circuit DTC112, in the case where the correlation result data of the logic "1" is stored in the memory cell M112, the data "0" has been latched in the second memory node ND2$b$, and the memory unit MU12A is designated as the particular memory unit of the region growing, the flag data "1" of the power source voltage VDD level is set in the flag node ND12, so the inverted node ND12A becomes the 0V of the ground level. As a result, the PMOS transistors PT117$b$ and PT118$b$ become the conductive state and supply charges to the flag node ND11 of the flag cell FCL11A of their own memory unit MU11A. Namely, the flag data "1" of the flag node ND12 of the flag cell FCL12A of the memory unit MU12A is transferred to the flag node ND11.

In this way, the data transfer circuit DTC112 has the function of transferring the data to both directions in the up-bottom direction of FIG. 10.

The memory unit MU12A is configured by the memory cells M121 and M122, data transfer circuits DTC121 and DTC122, and the flag cell FCL12A.

Among these components, the configurations of the memory cells M121 and M122 are similar to those of the circuit of FIG. 6, so the explanation will be omitted here.

The flag cell FCL12A of the memory unit MU12A is configured by the PMOS transistor PT123, NMOS transistor NT125, and two serially connected inverters INV121 and INV122.

The PMOS transistor PT123 and the NMOS transistor NT125 are connected in series between the supply line of the power source voltage VDD and the supply line of the reference voltage (0V) VSS. The gate of the PMOS transistor PT123 is connected to the supply line of the set signal /S, and the gate of the NMOS transistor NT125 is connected to the supply line of the reset signal R.

The flag node ND12 is configured by the connection point of the drains of the PMOS transistor PT123 and the NMOS transistor NT125. The flag node ND12 is connected to an input terminal of the inverter INV121 and the data transfer circuits DTC121 and DTC122. Also, the inverted node ND12A is configured by the connection point of an output terminal of the inverter INV121 and the inverter INV122. This inverted node ND12A is connected to the data transfer circuits DTC121 and DTC122.

The signal set in the node ND12 is output via the inverters INV121 and INV122 to the image combining unit 7 as the output OUT.

The data transfer circuit DTC121 is configured by PMOS transistors PT125a to PT128a.

The PMOS transistors PT125a and PT126a are connected in series between the supply line of the power source voltage VDD and the flag node ND22 of the flag cell FCL22A of the memory unit MU22A of the next row.

Also, the PMOS transistors PT127a and PT128a are connected in series between the supply line of the power source voltage VDD and the flag node ND12 of the flag cell FCL12A of the memory unit MU12A.

Gates of the PMOS transistors PT126a and PT128a are connected to the second memory node ND2c of the memory cell M121, a gate of the PMOS transistor PT125a is connected to the inverted node ND12A of the flag cell FCL12A, and a gate of the PMOS transistor PT127a is connected to the inverted node ND22A of the flag cell FCL22A of the memory unit MU22A of the next row.

In the data transfer circuit DTC121 having such a configuration, in the case where the correlation result data of the logic "1" is stored in the memory cell M121, the data "0" has been latched in the second memory node ND2c, and the memory unit MU12A is designated as the particular memory unit of the region growing, the flag data "1" of the power source voltage VDD level is set in the flag node ND12, therefore the inverted node ND12A becomes the 0V of the ground level. As a result, the PMOS transistors PT125a and PT126a become the conductive state and supply charges to the flag node ND22 of the flag cell FCL22A of the memory unit MU22A of the next row. Namely, the flag data "1" is transferred to the flag node ND22 of the flag cell FCL22A of the memory unit MU22A.

On the other hand, in the data transfer circuit DTC121, in the case where the correlation result data of the logic "1" is stored in the memory cell M121, the data "0" has been latched in the second memory node ND2c, and the memory unit MU22A of the next row is designated as the particular memory unit of the region growing, the flag data "1" of the power source voltage VDD level is set in the flag node ND22, therefore the inverted node ND22A becomes the 0V of the ground level. As a result, the PMOS transistors PT127a and PT128a become the conductive state and supply charges to the flag node ND12 of the flag cell FCL12A of their own memory unit MU12A. Namely, the flag data "1" of the flag node ND22 of the flag cell FCL22A of the memory unit MU22A is transferred to the flag node ND12.

In this way, the data transfer circuit DTC121 has the function of transferring the data to both directions in the left-right direction of FIG. 10.

The data transfer circuit DTC122 is configured by PMOS transistors PT125b to PT128b.

The PMOS transistors PT125b and PT126b are connected in series between the supply line of the power source voltage VDD and the flag node ND13 of the flag cell FCL13A of the memory unit MU13A of the not illustrated next column.

Also, the PMOS transistors PT127b and PT128b are connected in series between the supply line of the power source voltage VDD and the flag node ND12 of the flag cell FCL12A of the memory unit MU12A.

Gates of the PMOS transistors PT126b and PT128b are connected to the second memory node ND2d of the memory cell M122, a gate of the PMOS transistor PT125b is connected to the inverted node ND12A of the flag cell FCL12A, and a gate of the PMOS transistor PT127b is connected to the inverted node ND13A of the flag cell FCL13A of the memory unit MU13A of the not illustrated next column.

In the data transfer circuit DTC122 having such a configuration, in the case where the correlation result data of the logic "1" is stored in the memory cell M122, the data "0" has been latched in the second memory node ND2d, and the memory unit MU12A is designated as the particular memory unit of the region growing, the flag data "1" of the power source voltage VDD level is set in the flag node ND12, therefore the inverted node ND12A becomes the 0V of the ground level. As a result, the PMOS transistors PT125b and PT126b become the conductive state and supply charges to the flag node ND13 of the flag cell FCL13A of the memory unit MU13A of the not illustrated next column. Namely, the flag data "1" is transferred to the flag node ND13 of the flag cell FCL13A of the memory unit MU13A.

On the other hand, in the data transfer circuit DTC122, in the case where the correlation result data of the logic "1" is stored in the memory cell M122, the data "0" has been latched in the second memory node ND2d, and the memory unit MU13A of the not illustrated next column is designated as the particular memory unit of the region growing, the flag data "1" of the power source voltage VDD level is set in the flag node ND13, therefore the inverted node ND13A becomes the 0V of the ground level. As a result, the PMOS transistors PT127b and PT128b become the conductive state and supply charges to the flag node ND12 of the flag cell FCL12A of their own memory unit MU12A. Namely, the flag data "1" of the flag node ND13 of the flag cell FCL13A of the memory unit MU13A is transferred to the flag node ND12.

In this way, the data transfer circuit DTC122 has the function of transferring the data to both directions in the up-bottom direction of FIG. 10.

The memory unit MU21A is configured by the memory cells M211 and M212, data transfer circuits DTC211 and DTC212, and the flag cell FCL21A.

Among these components, the configurations of the memory cells M211 and M212 are similar to those of the circuit of FIG. 6, so the explanation will be omitted here.

The flag cell FCL21A of the memory unit MU21A is configured by the PMOS transistor PT213, NMOS transistor NT215, and two serially connected inverters INV211 and INV212.

The PMOS transistor PT213 and the NMOS transistor NT215 are connected in series between the supply line of the power source voltage VDD and the supply line of the reference voltage (0V) VSS. The gate of the PMOS transistor PT213 is connected to the supply line of the set signal /S, and the gate of the NMOS transistor NT215 is connected to the supply line of the reset signal R.

The flag node ND21 is configured by the connection point of the drains of the PMOS transistor PT213 and the NMOS transistor NT215. The flag node ND21 is connected to an input terminal of the inverter INV211 and the data transfer circuits DTC211 and DTC212. Also, the inverted node ND21A is configured by the connection point of an output terminal of the inverter INV211 and the inverter INV212. This inverted node ND21A is connected to the data transfer circuits DTC211 and DTC212.

Then, the signal set in the node ND21 is output via the inverters INV211 and INV212 to the image combining unit 7 as the output OUT.

The data transfer circuit DTC211 is configured by PMOS transistors PT215a to PT218a.

The PMOS transistors PT215a and PT216a are connected in series between the supply line of the power source voltage VDD and the flag node ND31 of the flag cell FCL31A of the memory unit MU31A of the not illustrated next row.

Also, the PMOS transistors PT217a and PT218a are connected in series between the supply line of the power source voltage VDD and the flag node ND21 of the flag cell FCL21A of the memory unit MU21A.

Gates of the PMOS transistors PT216a and PT218a are connected to the second memory node ND2e of the memory cell M211, a gate of the PMOS transistor PT215a is connected to the inverted node ND21A of the flag cell FCL21A, and a gate of the PMOS transistor PT217a is connected to the inverted node ND31A of the flag cell FCL31A of the memory unit MU31A of the not illustrated next row.

In the data transfer circuit DTC211 having such a configuration, in the case where the correlation result data of the logic "1" is stored in the memory cell M211, the data "0" has been latched in the second memory node ND2e, and the memory unit MU21A is designated as the particular memory unit of the region growing, the flag data "1" of the power source voltage VDD level is set in the flag node ND21, therefore the inverted node ND21A becomes the 0V of the ground level. As a result, the PMOS transistors PT215a and PT216a become the conductive state and supply charges to the flag node ND31 of the flag cell FCL31A of the memory unit MU31A of the not illustrated next row. Namely, the flag data "1" is transferred to the flag node ND31 of the flag cell FCL31A of the memory unit MU31A.

On the other hand, in the data transfer circuit DTC211, in the case where the correlation result data of the logic "1" is stored in the memory cell M211, the data "0" has been latched in the second memory node ND2e, and the memory unit MU31A of the not illustrated next row is designated as the particular memory unit of the region growing, the flag data "1" of the power source voltage VDD level is set in the flag node ND31, therefore the inverted node ND31A becomes the 0V of the ground level. As a result, the PMOS transistors PT217a and PT218a become the conductive state and supply charges to the flag node ND21 of the flag cell FCL21A of their own memory unit MU21A. Namely, the flag data "1" of the flag node ND31 of the flag cell FCL31A of the memory unit MU31A is transferred to the flag node ND21.

In this way, the data transfer circuit DTC211 has the function of transferring the data to both directions in the left-right direction of FIG. 10.

The data transfer circuit DTC212 is configured by PMOS transistors PT215b to PT218b.

The PMOS transistors PT215b and PT216b are connected in series between the supply line of the power source voltage VDD and the flag node ND22 of the flag cell FCL22A of the memory unit MU22A of the next column.

Also, the PMOS transistors PT217b and PT218b are connected in series between the supply line of the power source voltage VDD and the flag node ND21 of the flag cell FCL21A of the memory unit MU21A.

Gates of the PMOS transistors PT216b and PT218b are connected to the second memory node ND2f of the memory cell M212, a gate of the PMOS transistor PT215b is connected to the inverted node ND21A of the flag cell FCL21A, and a gate of the PMOS transistor PT217b is connected to the inverted node ND22A of the flag cell FCL22A of the memory unit MU22A of the next column.

In the data transfer circuit DTC212 having such a configuration, in the case where the correlation result data of the logic "1" is stored in the memory cell M212, the data "0" has been latched in the second memory node ND2f, and the memory unit MU21A is designated as the particular memory unit of the region growing, the flag data "1" of the power source voltage VDD level is set in the flag node ND21, therefore the inverted node ND21A becomes the 0V of the ground level. As a result, the PMOS transistors PT215b and PT216b become the conductive state and supply charges to the flag node ND22 of the flag cell FCL22A of the memory unit MU22A of the next column. Namely, the flag data "1" is transferred to the flag node ND22 of the flag cell FCL22A of the memory unit MU22A.

On the other hand, in the data transfer circuit DTC212, in the case where the correlation result data of the logic "1" is stored in the memory cell M212, the data "0" has been latched in the second memory node ND2f, and the memory unit MU22A of the next column is designated as the particular memory unit of the region growing, the flag data "1" of the power source voltage VDD level is set in the flag node ND22, therefore the inverted node ND22A becomes the 0V of the ground level. As a result, the PMOS transistors PT217b and PT218b become the conductive state and supply charges to the flag node ND21 of the flag cell FCL21A of their own memory unit MU21A. Namely, the flag data "1" of the flag node ND22 of the flag cell FCL22A of the memory unit MU22A is transferred to the flag node ND21.

In this way, the data transfer circuit DTC212 has the function of transferring the data to both directions in the up-bottom direction of FIG. 10.

The memory unit MU22A is configured by the memory cells M221 and M222, data transfer circuits DTC221 and DTC222, and the flag cell FCL22A.

Among these components, the configurations of the memory cells M221 and M222 are similar to those of the circuit of FIG. 6, so the explanation will be omitted here.

The flag cell FCL22A of the memory unit MU22A is configured by the PMOS transistor PT223, NMOS transistor NT225, and two serially connected inverters INV221 and INV222.

The PMOS transistor PT223 and the NMOS transistor NT225 are connected in series between the supply line of the power source voltage VDD and the supply line of the reference voltage (0V) VSS. The gate of the PMOS transistor PT223 is connected to the supply line of the set signal /S, and the gate of the NMOS transistor NT225 is connected to the supply line of the reset signal R.

The flag node ND22 is configured by the connection point of the drains of the PMOS transistor PT223 and the NMOS transistor NT225. The flag node ND22 is connected to an input terminal of the inverter INV221 and the data transfer circuits DTC221 and DTC222. Also, the inverted node ND22A is configured by the connection point of an output terminal of the inverter INV221 and the inverter INV222. This inverted node ND22A is connected to the data transfer circuits DTC221 and DTC222.

The signal set in the node ND22 is output via the inverters INV221 and INV222 to the image combining unit 7 as the output OUT.

The data transfer circuit DTC221 is configured by PMOS transistors PT225a to PT228a.

The PMOS transistors PT225a and PT226a are connected in series between the supply line of the power source voltage VDD and the flag node ND32 of the flag cell FCL32A of the memory unit MU32A of the not illustrated next row.

Also, the PMOS transistors PT227a and PT228a are connected in series between the supply line of the power source voltage VDD and the flag node ND22 of the flag cell FCL22A of the memory unit MU22A.

Gates of the PMOS transistors PT226a and PT228a are connected to the second memory node ND2g of the memory cell M221, a gate of the PMOS transistor PT225a is connected to the inverted node ND22A of the flag cell FCL22A, and a gate of the PMOS transistor PT227a is connected to the inverted node ND32A of the flag cell FCL32A of the not illustrated memory unit MU32A.

In the data transfer circuit DTC221 having such a configuration, in the case where the correlation result data of the logic "1" is stored in the memory cell M221, the data "0" has been latched in the second memory node ND2g, and the memory unit MU22A is designated as the particular memory unit of the region growing, the flag data "1" of the power source voltage VDD level is set in the flag node ND22, therefore the inverted node ND22A becomes the 0V of the ground level. As a result, the PMOS transistors PT225a and PT226a become the conductive state and supply charges to the flag node ND32 of the flag cell FCL32A of the memory unit MU32A of the not illustrated next row. Namely, the flag data "1" is transferred to the flag node ND32 of the flag cell FCL32A of the memory unit MU32A.

On the other hand, in the data transfer circuit DTC221, in the case where the correlation result data of the logic "1", is stored in the memory cell M221, the data "0" has been latched in the second memory node ND2g, and the memory unit MU32A of the not illustrated next row is designated as the particular memory unit of the region growing, the flag data "1" of the power source voltage VDD level is set in the flag node ND32, therefore the inverted node ND32A becomes the 0V of the ground level. As a result, the PMOS transistors PT227a and PT228a become the conductive state and supply charges to the flag node ND22 of the flag cell FCL22A of their own memory unit MU22A. Namely, the flag data "1" of the flag node ND32 of the flag cell FCL32A of the memory unit MU32A is transferred to the flag node ND22.

In this way, the data transfer circuit DTC221 has the function of transferring the data to both directions in the left-right direction of FIG. 10.

The data transfer circuit DTC222 is configured by PMOS transistors PT225b to PT228b.

The PMOS transistors PT225b and PT226b are connected in series between the supply line of the power source voltage VDD and the flag node ND23 of the flag cell FCL23A of the memory,unit MU23A of the not illustrated next column.

Also, the PMOS transistors PT227b and PT228b are connected in series between the supply line of the power source voltage VDD and the flag node ND22 of the flag cell FCL22A of the memory unit MU22A.

Gates of the PMOS transistors PT226b and PT228b are connected to the second memory node ND2h of the memory cell M222, a gate of the PMOS transistor PT225b is connected to the inverted node ND22A of the flag cell FCL22A, and a gate of the PMOS transistor PT227b is connected to the inverted node ND23A of the flag cell FCL23A of the memory unit MU23A of the not illustrated next column.

In the data transfer circuit DTC222 having such a configuration, in the case where the correlation result data of the logic "1" is stored in the memory cell M222, the data "0" has been latched in the second memory node ND2h, and the memory unit MU22A is designated as the particular memory unit of the region growing, the flag data "1" of the power source voltage VDD level is set in the flag node ND22, therefore the inverted node ND22A becomes the 0V of the ground level. As a result, the PMOS transistors PT225b and PT226b become the conductive state and supply charges to the flag node ND23 of the flag cell FCL23A of the memory unit MU23A of the not illustrated next column. Namely, the flag data "1" is transferred to the flag node ND23 of the flag cell FCL23A of the memory unit MU23A.

On the other hand, in the data transfer circuit DTC222, in the case where the correlation result data of the logic "1" is stored in the memory cell M222, the data "0" has been latched in the second memory node ND2h, and the memory unit MU23A of the not illustrated next column is designated as the particular memory unit of the region growing, the flag data "1" of the power source voltage VDD level is set in the flag node ND23, therefore the inverted node ND23A becomes the 0V of the ground level. As a result, the PMOS transistors PT227b and PT228b become the conductive state and supply charges to the flag node ND22 of the flag cell FCL22A of their own memory unit MU22A. Namely, the flag data "1" of the flag node ND23 of the flag cell FCL23A of the memory unit MU23A is transferred to the flag node ND22.

In this way, the data transfer circuit DTC222 has the function of transferring the data to both directions in the up-bottom direction of FIG. 10.

As described above, the memory array 51A of the region growing circuit of FIG. 10 receives the latch data of the second memory node of the memory cell at its gate in place of the transfer gate serving as the data transferring means of each memory unit, transfers the signal of the power source voltage VDD level to the memory unit of the next row or the next column, or transfers the signal of the power source voltage VDD level in the memory unit of the next row or next column to the flag node of its own flag cell, therefore becomes resistant to effects of the capacitance of the signal line in comparison with the case where a transfer gate is used and therefore has the advantage that further high speed region growing can be realized.

Figure 11:
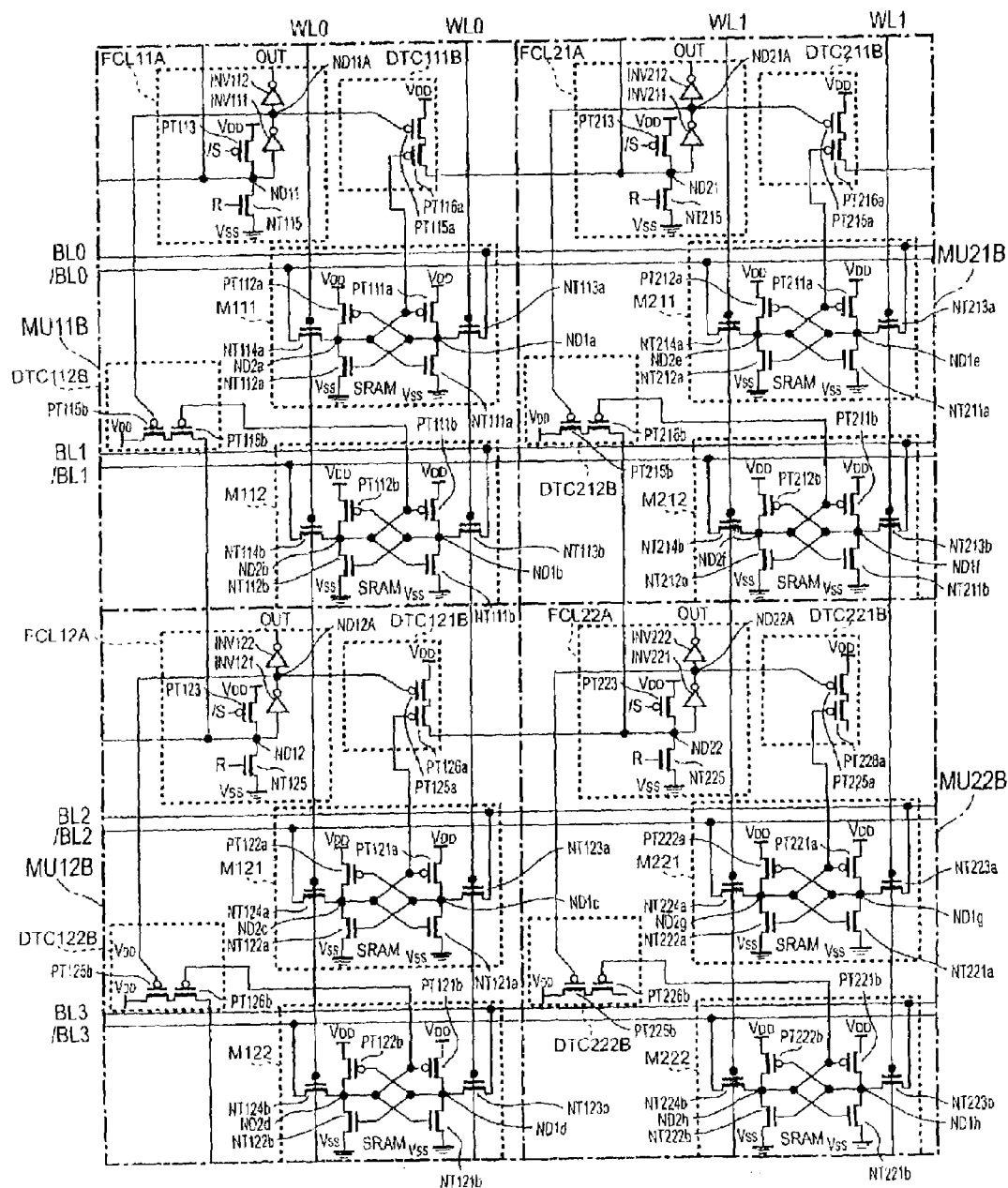
FIG. 11 is a circuit diagram of a third example of the configuration of a memory unit of a memory array in a region growing circuit able to grow a region in the left-right and up-bottom directions according to the present invention.

FIG. 11 is a circuit diagram of a third example of the configuration of the memory unit of the memory array in a region growing circuit able to grow a region in the left-right and up-bottom directions according to the present invention.

The difference of the circuit 51B of FIG. 11 from the circuit 51A of FIG. 10 resides in that the data transfer direction of the data transfer circuit is made not a two-way direction, but a one-way direction, i.e., transfer is possible in only from the left to right direction and from the up to down direction in FIG. 11 in the circuit 51B of FIG. 11 and in that a one-way direction region growing algorithm is enabled.

Note that in FIG. 11, the same components as those of FIG. 10 are assigned the same reference notations.

Concretely, the data transfer circuit DTC111B of the memory unit MU11B has only PMOS transistors PT115a and PT116a connected in series between the supply line of the power source voltage VDD and the flag node ND21 of the flag cell FCL21A of the memory unit MU21B of the next row and does not have the PMOS transistors PT117a and PT118a connected in series between the supply line of the power source voltage VDD and the flag node ND11 of the flag cell FCL11A of the memory unit MU11B as in the circuit of FIG. 10.

Namely, the data transfer circuit DTC111B of the memory unit MU11B has only a function of supplying a charge to the flag node ND21 of the flag cell FCL21A of the memory unit MU21B of the next row and transferring the data "1".

The data transfer circuit DTC112B of the memory unit MU11B has only PMOS transistors PT115*b* and PT116*b* connected in series between the supply line of the power source voltage VDD and the flag node ND12 of the flag cell FCL12A of the memory unit MU12B of the next column and does not have the PMOS transistors PT117*b* and PT118*b* connected in series between the supply line of the power source voltage VDD and the flag node ND11 of the flag cell FCL11A of the memory unit MU11B as in the circuit of FIG. 10.

Namely, the data transfer circuit DTC112B of the memory unit MU11B has only a function of supplying a charge to the flag node ND12 of the flag cell FCL12A of the memory unit MU12B of the next column and transferring the data "1".

Similarly, the data transfer circuit DTC121B of the memory unit MU12B has only PMOS transistors PT125*a* and PT126*a* connected in series between the supply line of the power source voltage VDD and the flag node ND22 of the flag cell FCL22A of the memory unit MU22B of the next row and does not have the PMOS transistors PT127*a* and PT128*a* connected in series between the supply line of the power source voltage VDD and the flag node ND12 of the flag cell FCL12A of the memory unit MU12B as in the circuit of FIG. 10.

Namely, the data transfer circuit DTC121B of the memory unit MU12B has only the function of supplying a charge to the flag node ND22 of the flag cell FCL22A of the memory unit MU22B of the next row and transferring the data "1".

The data transfer circuit DTC122B of the memory unit MU12B has only PMOS transistors PT125*b* and PT126*b* connected in series between the supply line of the power source voltage VDD and the flag node ND13 of the flag cell FCL13A of the memory unit MU13B of the not illustrated next column and does not have the PMOS transistors PT127*b* and PT128*b* connected in series between the supply line of the power source voltage VDD and the flag node ND12 of the flag cell FCL12A of the memory unit MU12B as in the circuit of FIG. 10.

Namely, the data transfer circuit DTC122B of the memory unit MU12B has only the function of supplying a charge to the flag node ND13 of the flag cell FCL13A of the memory unit MU13B of the not illustrated next column and transferring the data "1".

The data transfer circuit DTC211B of the memory unit MU21B has only PMOS transistors PT215*a* and PT216*a* connected in series between the supply line of the power source voltage VDD and the flag node ND31 of the flag cell FCL31A of the memory unit MU31B of the not illustrated next row and does not have the PMOS transistors PT217*a* and PT218*a* connected in series between the supply line of the power source voltage VDD and the flag node ND21 of the flag cell FCL21A of the memory unit MU21B as in the circuit of FIG. 10.

Namely, the data transfer circuit DTC211B of the memory unit MU21B has only a function of supplying a charge to the flag node ND31 of the flag cell FCL31A of the memory unit MU31B of the not illustrated next row and transferring the data "1".

The data transfer circuit DTC212B of the memory unit MU21B has only PMOS transistors PT215*b* and PT216*b* connected in series between the supply line of the power source voltage VDD and the flag node ND22 of the flag cell FCL22A of the memory unit MU22B of the next column and does not have the PMOS transistors PT217*b* and PT218*b* connected in series between the supply line of the power source voltage VDD and the flag node ND21 of the flag cell FCL21A of the memory unit MU21B as in the circuit of FIG. 10.

Namely, the data transfer circuit DTC212B of the memory unit MU21B has only the function of supplying a charge to the flag node ND22 of the flag cell FCL22A of the memory unit MU22B of the next column and transferring the data "1".

The data transfer circuit DTC221B of the memory unit MU22B has only PMOS transistors PT225*a* and PT226*a* connected in series between the supply line of the power source voltage VDD and the flag node ND32 of the flag cell FCL32A of the memory unit MU32B of the not illustrated next row and does not have the PMOS transistors PT227*a* and PT228*a* connected in series between the supply line of the power source voltage VDD and the flag node ND22 of the flag cell FCL22A of the memory unit MU22B as in the circuit of FIG. 10.

Namely, the data transfer circuit DTC221B of the memory unit MU22B has only the function of supplying a charge to the flag node ND32 of the flag cell FCL32A of the memory unit MU32B of the not illustrated next row and transferring the data "1".

The data transfer circuit DTC222B of the memory unit MU22B has only PMOS transistors PT225*b* and PT226*b* connected in series between the supply line of the power source voltage VDD and the flag node ND23 of the flag cell FCL23A of the memory unit MU23B of the not illustrated next column and does not have the PMOS transistors PT227*b* and PT228*b* connected in series between the supply line of the power source voltage VDD and the flag node ND22 of the flag cell FCL22A of the memory unit MU22B as in the circuit of FIG. 10.

Namely, the data transfer circuit DTC222B of the memory unit MU22B has only the function of supplying a charge to the flag node ND23 of the flag cell FCL23A of the memory unit MU23B of the not illustrated next column and transferring the data "1".

As described above, the circuit 51B of FIG. 11 is configured so that the data transfer direction of the data transfer circuit is made not a two-way direction, but a one-way direction, i.e., the transfer is possible only from the left to right direction and from the up to down direction in FIG. 11. Therefore, a one-way direction region growing algorithm is made possible in accordance with the application. In this case, a reduction of the number of the components can be achieved.

Figure 12:
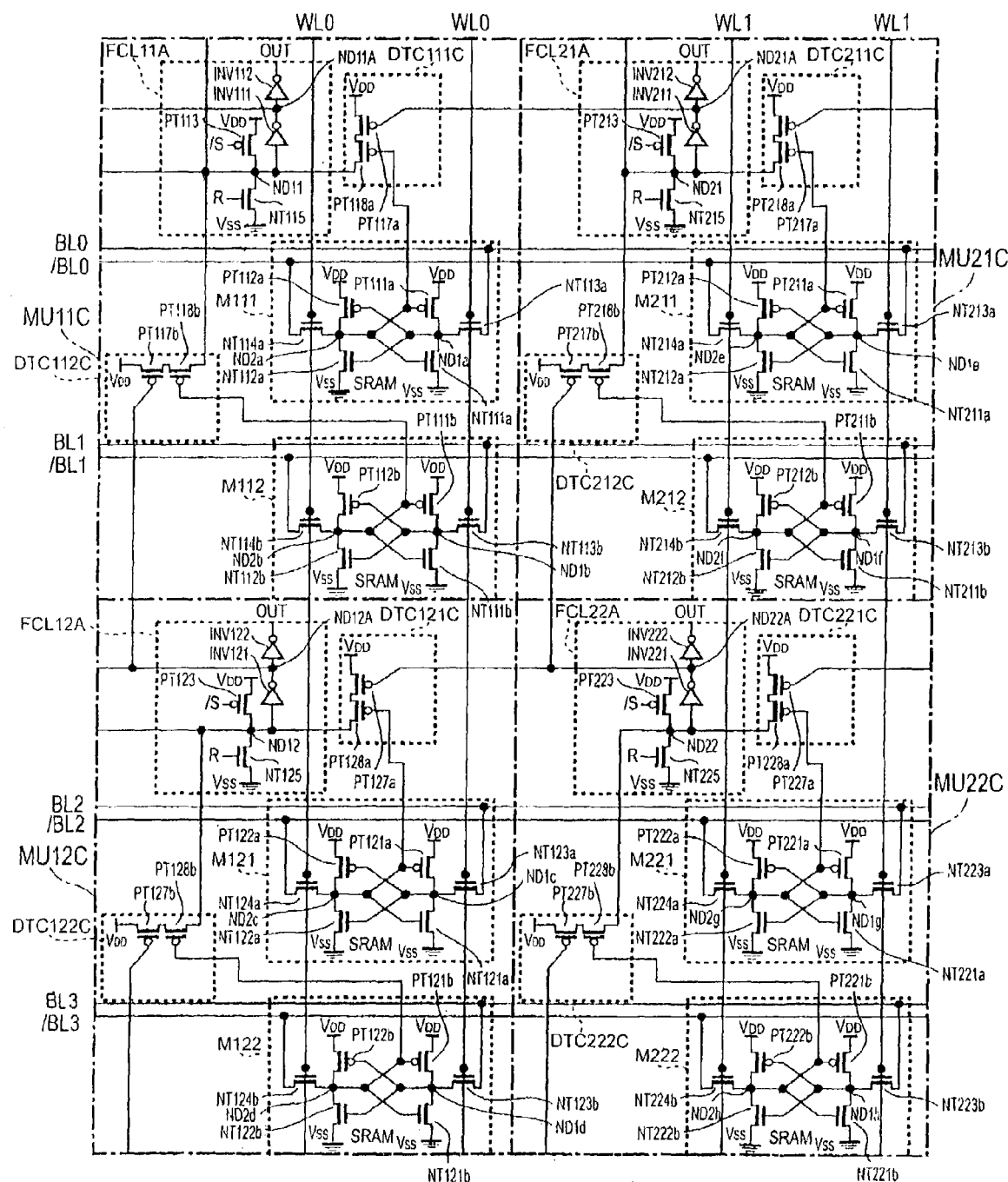
FIG. 12 is a circuit diagram of a fourth example of the configuration of a memory unit of a memory array in a region growing circuit able to grow a region in the left-right and up-bottom directions according to the present invention.

FIG. 12 is a circuit diagram of the third example of the configuration of the memory unit of the memory array in a region growing circuit able to grow a region in the left-right and up-bottom directions according to the present invention.

The difference of the circuit 51C of FIG. 12 from the circuit 51A of FIG. 10 resides in that the data transfer direction of the data transfer circuit is made not a two-way direction, but a one-way direction, i.e., transfer is possible only from the right to left direction and from the down to up direction in FIG. 12 in the circuit 51C of FIG. 12, and a one-way direction region growing algorithm is enabled.

Note that in FIG. 12, the same components as those of FIG. 10 are assigned the same reference notations.

Concretely, the data transfer circuit DTC111C of the memory unit MU11C has only PMOS transistors PT117*a* and PT118*a* connected in series between the supply line of the power source voltage VDD and the flag node ND11 of the flag cell FCL11A of the memory unit MU11C and does not have the PMOS transistors PT115*a* and PT116*a* connected in series between the supply line of the power source voltage VDD and the flag node ND21 of the flag cell FCL21A of the memory unit MU21C of the next row as in the circuit of FIG. 10.

Namely, the data transfer circuit DTC111C of the memory unit MU1C has only a function of transferring the data "1" of the flag node ND21 of the flag cell FCL21A of the memory unit MU21C of the next row to the flag node ND11 of the flag cell FCL11A of its own memory unit MU11C.

The data transfer circuit DTC112C of the memory unit MU11C has the PMOS transistors PT117b and PT118b connected in series between the supply line of the power source voltage VDD and the flag node ND11 of the flag cell FCL11A of the memory unit MU11C and does not have the PMOS transistors PT115b and PT116b connected in series between the supply line of the power source voltage VDD and the flag node ND12 of the flag cell FCL12A of the memory unit MU12B as in the circuit of FIG. 10.

Namely, the data transfer circuit DTC112C of the memory unit MU11C has only the function of transferring the data "1" of the flag node ND12 of the flag cell FCL12A of the memory unit MU12C of the next column to the flag node ND11 of the flag cell FCL11A of its own memory unit MU1C.

Similarly, the data transfer circuit DTC121C of the memory unit MU12C has only PMOS transistors PT127a and PT128a connected in series between the supply line of the power source voltage VDD and the flag node ND12 of the flag cell FCL12A of the memory unit MU12C and does not have the PMOS transistors PT125a and PT126a connected in series between the supply line of the power source voltage VDD and the flag node ND22 of the flag cell FCL22A of the memory unit MU22C of the next row as in the circuit of FIG. 10.

Namely, the data transfer circuit DTC121C of the memory unit MU12C has only the function of transferring the data "1" of the flag node ND22 of the flag cell FCL22A of the memory unit MU22C of the next row to the flag node ND12 of the flag cell FCL12A of its own memory unit MU12C.

The data transfer circuit DTC112C of the memory unit MU12C has the PMOS transistors PT117b and PT118b connected in series between the supply line of the power source voltage VDD and the flag node ND12 of the flag cell FCL12A of the memory unit MU12C and does not have the PMOS transistors PT125b and PT126b connected in series between the supply line of the power source voltage VDD and the flag node ND13 of the flag cell FCL13A of the memory unit MU13C of the not illustrated next column as in the circuit of FIG. 10.

Namely, the data transfer circuit DTC122C of the memory unit MU12C has only the function of transferring the data "1" of the flag node ND13 of the flag cell FCL13A of the memory unit MU13C of the next column to the flag node ND12 of the flag cell FCL12A of its own memory unit MU12C.

The data transfer circuit DTC211C of the memory unit MU21C has only PMOS transistors PT217a and PT218a connected in series between the supply line of the power source voltage VDD and the flag node ND21 of the flag cell FCL21A of the memory unit MU21C and does not have the PMOS transistors PT215a and PT216a connected in series between the supply line of the power source voltage VDD and the flag node ND31 of the flag cell FCL31A of the memory unit MU31C of the not illustrated next row as in the circuit of FIG. 10.

Namely, the data transfer circuit DTC211C of the memory unit MU21C has only a function of transferring the data "1" of the flag node ND31 of the flag cell FCL31A of the memory unit MU31C of the next row to the flag node ND21 of the flag cell FCL21A of its own memory unit MU21C.

The data transfer circuit DTC212C of the memory unit MU21C has the PMOS transistors PT217b and PT218b connected in series between the supply line of the power source voltage VDD and the flag node ND21 of the flag cell FCL21A of the memory unit MU21C and does not have the PMOS transistors PT215b and PT216b connected in series between the supply line of the power source voltage VDD and the flag node ND22 of the flag cell FCL22A of the memory unit MU22C as in the circuit of FIG. 10.

Namely, the data transfer circuit DTC212C of the memory unit MU21C has only the function of transferring the data "1" of the flag node ND22 of the flag cell FCL22A of the memory unit MU22C of the next column to the flag node ND21 of the flag cell FCL21A of its own memory unit MU21C.

The data transfer circuit DTC221C of the memory unit MU22C has only PMOS transistors PT227a and PT228a connected in series between the supply line of the power source voltage VDD and the flag node ND22 of the flag cell FCL22A of the memory unit MU22C and does not have the PMOS transistors PT225a and PT226a connected in series between the supply line of the power source voltage VDD and the flag node ND32 of the flag cell FCL32A of the memory unit MU32C of the not illustrated next row as in the circuit of FIG. 10.

Namely, the data transfer circuit DTC221C of the memory unit MU22C has only the function of transferring the data "1" of the flag node ND32 of the flag cell FCL32A of the memory unit MU32C of the next row to the flag node ND22 of the flag cell FCL22A of its own memory unit MU22C.

The data transfer circuit DTC222C of the memory unit MU22C has the PMOS transistors PT227b and PT228b connected in series between the supply line of the power source voltage VDD and the flag node ND22 of the flag cell FCL22A of the memory unit MU22C and does not have the PMOS transistors PT225b and PT226b connected in series between the supply line of the power source voltage VDD and the flag node ND23 of the flag cell FCL23A of the memory unit MU23C of the not illustrated next column as in the circuit of FIG. 10.

Namely, the data transfer circuit DTC222C of the memory unit MU22C has only the function of transferring the data "1" of the flag node ND23 of the flag cell FCL23A of the memory unit MU23C of the next column to the flag node ND22 of the flag cell FCL22A of its own memory unit MU22C.

As described above, the circuit 51C of FIG. 12 is configured so that the data transfer direction of the data transfer circuit is made not a two-way directions, but a one-way direction, i.e., transfer is possible only from the right to left direction and from the down to up direction in FIG. 12. Therefore, a one-way direction region growing algorithm is enabled in accordance with the application, and, in this case, a reduction of the number of the components can be achieved.

Figure 13:
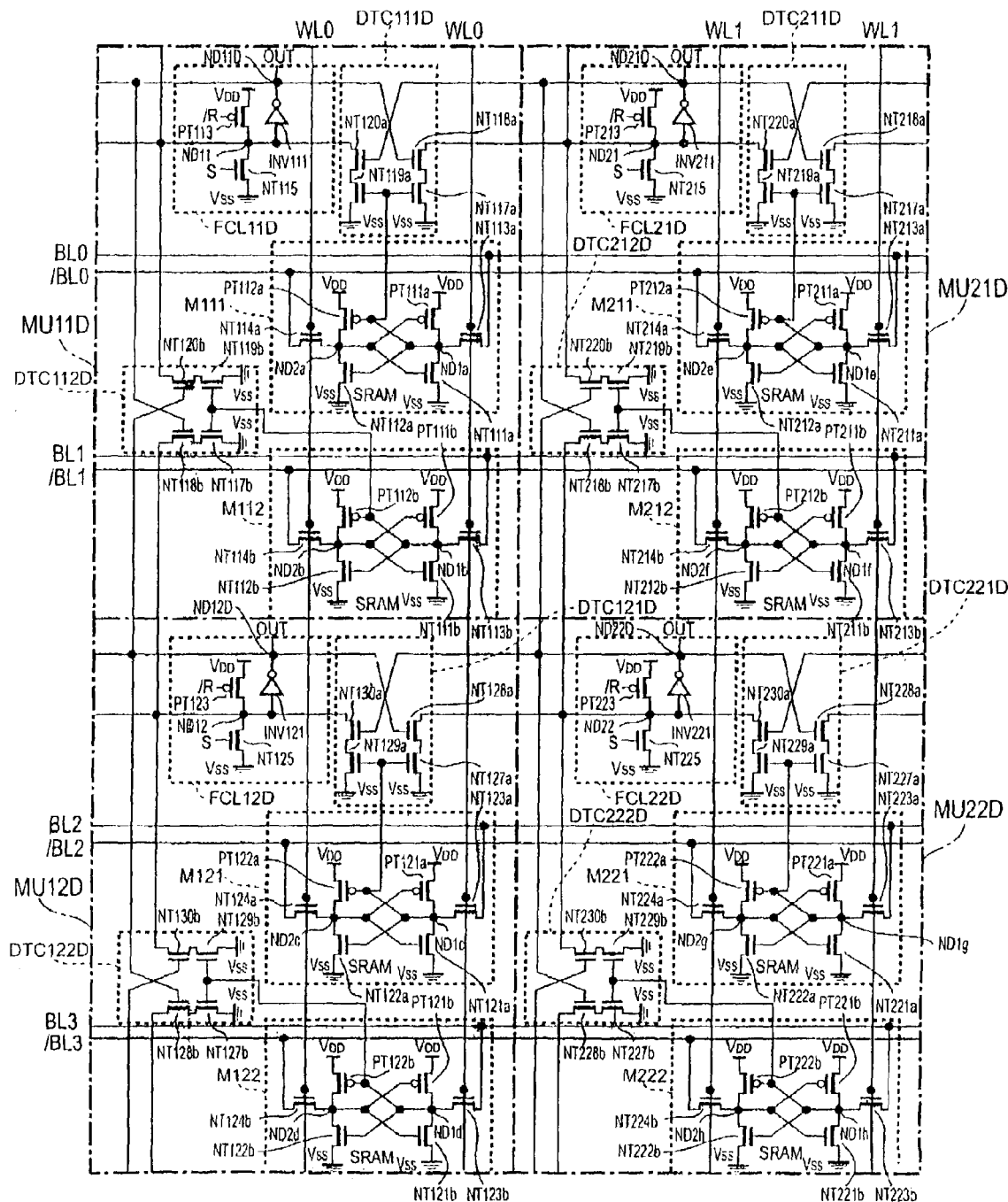
FIG. 13 is a circuit diagram of a fifth example of the configuration of a memory unit of a memory array in a region growing circuit able to grow a region in the left-right and up-bottom directions according to the present invention.

FIG. 13 is a circuit diagram of the fifth example of the configuration of the memory unit of the memory array in a region growing circuit able to grow a region in the left-right and up-bottom directions according to the present invention.

The difference of the circuit 51D of FIG. 13 from the circuit 51A of FIG. 10 resides in that the data set at the flag node of the flag cell of the memory unit designated by the pointing device 6 and transferred to the adjacented memory unit for region growing is made the negative logic negative power source voltage level VSS, for example the data "0" of the ground level 0V, in place of the positive logic power source voltage VDD level data "1".

As a result, the configurations of the flag cells and the data transfer circuits of the memory units MU11D, MU12D, MU21D, and MU22D are different from those of FIG. 10.

Note that in FIG. 13, the same components as those of FIG. 10 are assigned the same reference notations.

The memory unit MU11D is configured by memory cells M111, M112, data transfer circuits DTC111D and DTC112D, and the flag cell FCL11D.

Among these components, the configurations of the memory cells M111 and M112 are similar to those of the circuits of FIG. 6 and FIG. 10, so the explanation will be omitted here.

The flag cell FCL11D of the memory unit MU11D is configured by PMOS transistor PT113, NMOS transistor NT115, and the inverter INV111.

The PMOS transistor PT113 and the NMOS transistor NT115 are connected in series between the supply line of the power source voltage VDD and the supply line of the reference voltage (0V) VSS. The gate of the PMOS transistor PT113 is connected to the supply line of a reset signal /R, and the gate of the NMOS transistor NT115 is connected to the supply line of a set signal S.

The flag node ND11 is configured by the connection point of drains of the PMOS transistor PT113 and the NMOS transistor NT115. The flag node ND11 is connected to the input terminal of the inverter INV111 and the data transfer circuits DTC111D and DTC112D. Also, the inverted node ND11D is configured by the output terminal of the inverter INV111. This inverted node ND11D is connected to the data transfer circuits DTC111D and DTC112D.

The signal set in the node ND11 is output via the inverter INV111 to the image combining unit 7 as the output OUT of the power source voltage VDD level corresponding to the data "1".

The data transfer circuit DTC111D is configured by NMOS transistors NT117a to NT120a.

The NMOS transistors NT117a and NT118a are connected in series between the supply line of the power source voltage (reference voltage) VSS and the flag node ND21 of the flag cell FCL21D of the memory unit MU21D of the next row.

Also, the NMOS transistors NT119a and NT120a are connected in series between the supply line of the power source voltage VSS and the flag node ND11 of the flag cell FCL11D of the memory unit MU11D.

Gates of the NMOS transistors NT117a and NT119a are connected to the first memory node ND1a of the memory cell M111, a gate of the NMOS transistor NT118a is connected to the inverted node ND11D of the flag cell FCL11D, and a gate of the NMOS transistor NT120a is connected to the inverted node ND21D of the flag cell FCL21D of the memory unit MU21D of the next row.

In the data transfer circuit DTC111D having such a configuration, in the case where the correlation result data of the logic "1" is stored in the memory cell M111, the data "1" has been latched in the first memory node ND1a, and the memory unit MU11D is designated as the particular memory unit of the region growing, the flag data "0" of the power source voltage VSS level is set in the flag node ND11, therefore the inverted node ND11D becomes the power source voltage VDD level. As a result, the NMOS transistors NT117a and NT118a become the conductive state, and the charge of the flag node ND21 of the flag cell FCL21D of the memory unit MU21D of the next row is discharged. Namely, the flag data "0" is transferred to the flag node ND21 of the flag cell FCL21D of the memory unit MU21D.

On the other hand, in the data transfer circuit DTC111D, in the case where the correlation result data of the logic "1" is stored in the memory cell M111, the data "1" has been latched in the first memory node ND1a, and the memory unit MU21D of the next row is designated as the particular memory unit of the region growing, the flag data "0" of the power source voltage VSS level is set in the flag node ND21, therefore the inverted node ND21D becomes the power source voltage VDD level. As a result, the NMOS transistors NT119a and NT120a become the conductive state, and the charge of the flag node ND11 of the flag cell FCL11D of their own memory unit MU11D is discharged. Namely, the flag data "0" of the flag node ND21 of the flag cell FCL21D of the memory unit MU21D is transferred to the flag node ND11.

In this way, the data transfer circuit DTC111D has the function of transferring the data to both directions in the left-right direction of FIG. 13.

The data transfer circuit DTC112D is configured by NMOS transistors NT117b to NT120b.

The NMOS transistors NT117b and NT118b are connected in series between the supply line of the power source voltage VSS and the flag node ND12 of the flag cell FCL12D of the memory unit MU12D of the next column.

Also, the NMOS transistors NT119b and NT120b are connected in series between the supply line of the power source voltage VSS and the flag node ND11 of the flag cell FCL11D of the memory unit MU1D.

Gates of the NMOS transistors NT117b and NT119b are connected to the first memory node ND1b of the memory cell M112, a gate of the NMOS transistor NT118b is connected to the inverted node ND11D of the flag cell FCL11D, and a gate of the NMOS transistor NT120b is connected to the inverted node ND12D of the flag cell FCL12D of the memory unit MU12D of the next column.

In the data transfer circuit DTC112D having such a configuration, in the case where the correlation result data of the logic "1" is stored in the memory cell M112, the data "1" has been latched in the first memory node ND1b, and the memory unit MU11D is designated as the particular memory unit of the region growing, the flag data "0" of the power source voltage VSS level is set in the flag node ND11, therefore the inverted node ND11D becomes the power source voltage VDD level. As a result, the NMOS transistors NT117b and NT118b become the conductive state, and the charge of the flag node ND12 of the flag cell FCL12D of the memory unit MU12D of the next column is discharged. Namely, the flag data "0" is transferred to the flag node ND12 of the flag cell FCL12D of the memory unit MU12D.

On the other hand, in the data transfer circuit DTC112D, in the case where the correlation result data of the logic "1" is stored in the memory cell M112, the data "1" has been latched in the first memory node ND1b, and the memory unit MU12D of the next column is designated as the particular memory unit of the region growing, the flag data "0" of the power source voltage VSS level is set in the flag node ND12, therefore the inverted node ND12D becomes the power source voltage VDD level. As a result, the NMOS transistors NT119b and NT120b become the conductive state, and the charge of the flag node ND11 of the flag cell FCL11D of their own memory unit MU11D is discharged. Namely, the flag data "0" of the flag node ND12 of the flag cell FCL12D of the memory unit MU12D is transferred to the flag node ND11.

In this way, the data transfer circuit DTC112D has the function of transferring the data to both directions in the up-bottom direction of FIG. 13.

The memory unit MU12D is configured by memory cells M121, M122, data transfer circuits DTC121D and DTC122D, and the flag cell FCL12D.

Among these components, the configurations of the memory cells M121 and M122 are similar to those of the circuits of FIG. 6 and FIG. 10, so the explanation will be omitted here.

The flag cell FCL12D of the memory unit MU12D is configured by PMOS transistor PT123, NMOS transistor NT125, and the inverter INV121.

The PMOS transistor PT123 and the NMOS transistor NT125 are connected in series between the supply line of the power source voltage VDD and the supply line of the reference voltage (0V) VSS. The gate of the PMOS transistor PT123 is connected to the supply line of the reset signal /R, and the gate of the NMOS transistor NT125 is connected to the supply line of the set signal S.

The flag node ND12 is configured by the connection point of drains of the PMOS transistor PT123 and the NMOS transistor NT125. The flag node ND12 is connected to the input terminal of the inverter INV121 and the data transfer circuits DTC121D and DTC122D. Also, the inverted node ND12D is configured by the output terminal of the inverter INV121. This inverted node ND12D is connected to the data transfer circuits DTC121D and DTC122D.

The signal set in the node ND12 is output via the inverter INV121 to the image combining unit 7 as the output OUT of the power source voltage VDD level corresponding to the data "1".

The data transfer circuit DTC121D is configured by NMOS transistors NT127a to NT130a.

The NMOS transistors NT127a and NT128a are connected in series between the supply line of the power source voltage (reference voltage) VSS and the flag node ND22 of the flag cell FCL22D of the memory unit MU22D of the next row.

Also, the NMOS transistors NT129a and NT130a are connected in series between the supply line of the power source voltage VSS and the flag node ND12 of the flag cell FCL12D of the memory unit MU12D.

Gates of the NMOS transistors NT127a and NT129a are connected to the first memory node ND1c of the memory cell M121, a gate of the NMOS transistor NT128a is connected to the inverted node ND12D of the flag cell FCL12D, and a gate of the NMOS transistor NT130a is connected to the inverted node ND22D of the flag cell FCL22D of the memory unit MU22D of the next row.

In the data transfer circuit DTC121D having such a configuration, in the case where the correlation result data of the logic "1" is stored in the memory cell M121, the data "1" has been latched in the first memory node ND1a, and the memory unit MU12D is designated as the particular memory unit of the region growing, the flag data "0" of the power source voltage VSS level is set in the flag node ND12, therefore the inverted node ND12D becomes the power source voltage VDD level. As a result, the NMOS transistors NT127a and NT128a become the conductive state, and the charge of the flag node ND22 of the flag cell FCL22D of the memory unit MU22D of the next row is discharged. Namely, the flag data "0" is transferred to the flag node ND22 of the flag cell FCL22D of the memory unit MU22D.

On the other hand, in the data transfer circuit DTC121D, in the case where the correlation result data of the logic "1" is stored in the memory cell M121, the data "1" has been latched in the first memory node ND1a, and the memory unit MU22D of the next row is designated as the particular memory unit of the region growing, the flag data "0" of the power source voltage VSS level is set in the flag node ND22, therefore the inverted node ND22D becomes the power source voltage VDD level. As a result, the NMOS transistors NT129a and NT130a become the conductive state, and the charge of the flag node ND12 of the flag cell FCL12D of their own memory unit MU12D is discharged. Namely, the flag data "0" of the flag node ND22 of the flag cell FCL22D of the memory unit MU22D is transferred to the flag node ND12.

In this way, the data transfer circuit DTC121D has the function of transferring the data to both directions in the left-right direction of FIG. 13.

The data transfer circuit DTC122D is configured by NMOS transistors NT127b to NT130b.

The NMOS transistors NT127b and NT128b are connected in series between the supply line of the power source voltage VSS and the flag node ND13 of the flag cell FCL13D of the memory unit MU13D of the not illustrated next column.

Also, the NMOS transistors NT129b and NT130b are connected in series between the supply line of the power source voltage VSS and the flag node ND12 of the flag cell FCL12D of the memory unit MU12D.

Gates of the NMOS transistors NT127b and NT129b are connected to the first memory node ND1d of the memory cell M122, a gate of the NMOS transistor NT128b is connected to the inverted node ND12D of the flag cell FCL12D, and a gate of the NMOS transistor NT130b is connected to the inverted node ND13D of the flag cell FCL13D of the memory unit MU13D of the not illustrated next column.

In the data transfer circuit DTC122D having such a configuration, in the case where the correlation result data of the logic "1" is stored in the memory cell M122, the data "1" has been latched in the first memory node ND1d, and the memory unit MU12D is designated as the particular memory unit of the region growing, the flag data "0" of the power source voltage VSS level is set in the flag node ND12, therefore the inverted node ND12D becomes the power source voltage VDD level. As a result, the NMOS transistors NT127b and NT128b become the conductive state, and the charge of the flag node ND13 of the flag cell FCL13D of the memory unit MU13D of the not illustrated next column is discharged. Namely, the flag data "0" is transferred to the flag node ND13 of the flag cell FCL13D of the memory unit MU13D.

On the other hand, in the data transfer circuit DTC122D, in the case where the correlation result data of the logic "1" is stored in the memory cell M122, the data "1" has been latched in the first memory node ND1d, and the memory unit MU13D of the not illustrated next column is designated as the particular memory unit of the region growing, the flag data "0" of the power source voltage VSS level is set in the flag node ND13, therefore the inverted node 13D becomes the power source voltage VDD level. As a result, the NMOS transistors NT129b and NT130b become the conductive state, and the charge of the flag node ND12 of the flag cell FCL12D of their own memory unit MU12D is discharged. Namely, the flag data "0" of the flag node ND13 of the flag cell FCL13D of the memory unit MU13D is transferred to the flag node ND12.

In this way, the data transfer circuit DTC122D has the function of transferring the data to both directions in the up-bottom direction of FIG. 13.

The memory unit MU21D is configured by memory cells M211, M212, data transfer circuits DTC211D and DTC212D, and the flag cell FCL21D.

Among these components, the configurations of the memory cells M211 and M212 are similar to those of the circuits of FIG. 6 and FIG. 10, so the explanation will be omitted here.

The flag cell FCL21D of the memory unit MU21D is configured by PMOS transistor PT213, NMOS transistor NT215, and the inverter INV211.

The PMOS transistor PT213 and the NMOS transistor NT215 are connected in series between the supply line of the power source voltage VDD and the supply line of the reference voltage (0V) VSS. The gate of the PMOS transistor PT213 is connected to the supply line of the reset signal /R, and the gate of the NMOS transistor NT215 is connected to the supply line of the set signal S.

The flag node ND21 is configured by the connection point of drains of the PMOS transistor PT213 and the NMOS transistor NT215. The flag node ND21 is connected to the input terminal of the inverter INV211 and the data transfer circuits DTC211D and DTC212D. Also, the inverted node ND21D is configured by the output terminal of the inverter INV211. This inverted node ND21D is connected to the data transfer circuits DTC211D and DTC212D.

The signal set in the node ND21 is output via the inverter INV211 to the image combining unit 7 as the output OUT of the power source voltage VDD level corresponding to the data "1".

The data transfer circuit DTC211D is configured by NMOS transistors NT217a to NT220a.

The NMOS transistors NT217a and NT218a are connected in series between the supply line of the power source voltage (reference voltage) VSS and the flag node ND31 of the flag cell FCL31D of the memory unit MU31D of the not illustrated next row.

Also, the NMOS transistors NT219a and NT220a are connected in series between the supply line of the power source voltage VSS and the flag node ND21 of the flag cell FCL21D of the memory unit MU21D.

Gates of the NMOS transistors NT217a and NT219a are connected to the first memory node ND1e of the memory cell M211, a gate of the NMOS transistor NT218a is connected to the inverted node ND21D of the flag cell FCL21D, and a gate of the NMOS transistor NT220a is connected to the inverted node ND31D of the flag cell FCL31D of the memory unit MU31D of the not illustrated next row.

In the data transfer circuit DTC211D having such a configuration, in the case where the correlation result data of the logic "1" is stored in the memory cell M211, the data "1" has been latched in the first memory node ND1e, and the memory unit MU21D is designated as the particular memory unit of the region growing, the flag data "0" of the power source voltage VSS level is set in the flag node ND21, therefore the inverted node ND21D becomes the power source voltage VDD level. As a result, the NMOS transistors NT217a and NT218a become the conductive state, and the charge of the flag node ND31 of the flag cell FCL31D of the memory unit MU31D of the not illustrated next row is discharged. Namely, the flag data "0" is transferred to the flag node ND31 of the flag cell FCL31D of the memory unit MU31D.

On the other hand, in the data transfer circuit DTC211D, in the case where the correlation result data of the logic "1" is stored in the memory cell M211, the data "1" has been latched in the first memory node ND1e, and the memory unit MU31D of the not illustrated next row is designated as the particular memory unit of the region growing, the flag data "0" of the power source voltage VSS level is set in the flag node ND31, therefore the inverted node 31D becomes the power source voltage VDD level. As a result, the NMOS transistors NT219a and NT220a become the conductive state, and the charge of the flag node ND21 of the flag cell FCL21D of their own memory unit MU21D is discharged. Namely, the flag data "0" of the flag node ND31 of the flag cell FCL31D of the memory unit MU31D is transferred to the flag node ND21.

In this way, the data transfer circuit DTC211D has the function of transferring the data to both directions in the left-right direction of FIG. 13.

The data transfer circuit DTC212D is configured by NMOS transistors NT217b to NT220b.

The NMOS transistors NT217b and NT218b are connected in series between the supply line of the power source voltage VSS and the flag node ND22 of the flag cell FCL22D of the memory unit MU22D of the next column.

Also, the NMOS transistors NT219b and NT220b are connected in series between the supply line of the power source voltage VSS and the flag node ND21 of the flag cell FCL21D of the memory unit MU21D.

Gates of the NMOS transistors NT217b and NT219b are connected to the first memory node ND1f of the memory cell M212, a gate of the NMOS transistor NT218b is connected to the inverted node ND21D of the flag cell FCL21D, and a gate of the NMOS transistor NT220b is connected to the inverted node ND22D of the flag cell FCL22D of the memory unit MU22D of the next column.

In the data transfer circuit DTC212D having such a configuration, in the case where the correlation result data of the logic "1" is stored in the memory cell M212, the data "1" has been latched in the first memory node ND1f, and the memory unit MU21D is designated as the particular memory unit of the region growing, the flag data "0" of the power source voltage VSS level is set in the flag node ND21, therefore the inverted node ND21D becomes the power source voltage VDD level. As a result, the NMOS transistors NT217b and NT218b become the conductive state, and the charge of the flag node ND22 of the flag cell FCL22D of the memory unit MU22D of the next column is discharged. Namely, the flag data "0" is transferred to the flag node ND22 of the flag cell FCL22D of the memory unit MU22D.

On the other hand, in the data transfer circuit DTC212D, in the case where the correlation result data of the logic "1" is stored in the memory cell M212, the data "1" has been latched in the first memory node ND1f, and the memory unit MU22D of the next column is designated as the particular memory unit of the region growing, the flag data "0" of the power source voltage VSS level is set in the flag node ND22, therefore the inverted node 22D becomes the power source voltage VDD level. As a result, the NMOS transistors NT219b and NT220b become the conductive state, and the charge of the flag node ND21 of the flag cell FCL21D of their own memory unit MU21D is discharged. Namely, the flag data "0" of the flag node ND22 of the flag cell FCL22D of the memory unit MU22D is transferred to the flag node ND21.

In this way, the data transfer circuit DTC212D has the function of transferring the data to both directions in the up-bottom direction of FIG. 13.

The memory unit MU22D is configured by memory cells M221, M222, data transfer circuits DTC221D and DTC222D, and the flag cell FCL22D.

Among these components, the configurations of the memory cells M221 and M222 are similar to those of the circuits of FIG. 6 and FIG. 10, so the explanation will be omitted here.

The flag cell FCL22D of the memory unit MU22D is configured by PMOS transistor PT223, NMOS transistor NT225, and the inverter INV221.

The PMOS transistor PT223 and the NMOS transistor NT225 are connected in series between the supply line of the power source voltage VDD and the supply line of the reference voltage (0V) VSS. The gate of the PMOS transistor PT223 is connected to the supply line of the reset signal /R, and the gate of the NMOS transistor NT225 is connected to the supply line of the set signal S.

The flag node ND22 is configured by the connection point of drains of the PMOS transistor PT223 and the NMOS transistor NT225. The flag node ND22 is connected to the input terminal of the inverter INV221 and the data transfer circuits DTC221D and DTC222D. Also, the inverted node ND22D is configured by the output terminal of the inverter INV221. This inverted node ND22D is connected to the data transfer circuits DTC221D and DTC222D.

The signal set in the node ND22 is output via the inverter INV221 to the image combining unit 7 as the output OUT of the power source voltage VDD level corresponding to the data "1".

The data transfer circuit DTC221D is configured by NMOS transistors NT227a to NT230a.

The NMOS transistors NT227a and NT228a are connected in series between the supply line of the power source voltage (reference voltage) VSS and the flag node ND32 of the flag cell FCL32D of the memory unit MU32D of the not illustrated next row.

Also, the NMOS transistors NT229a and NT230a are connected in series between the supply line of the power source voltage VSS and the flag node ND22 of the flag cell FCL22D of the memory unit MU22D.

Gates of the NMOS transistors NT227a and NT229a are connected to the first memory node ND1g of the memory cell M221, a gate of the NMOS transistor NT228a is connected to the inverted node ND22D of the flag cell FCL22D, and a gate of the NMOS transistor NT230a is connected to the inverted node ND32D of the flag cell is FCL32D of the not illustrated memory unit MU32D.

In the data transfer circuit DTC221D having such a configuration, in the case where the correlation result data of the logic "1" is stored in the memory cell M221, the data "1" has been latched in the first memory node ND1g, and the memory unit MU22D is designated as the particular memory unit of the region growing, the flag data "0" of the power source voltage VSS level is set in the flag node ND22, therefore the inverted node ND22D becomes the power source voltage VDD level. As a result, the NMOS transistors NT227a and NT228a become the conductive state, and the charge of the flag node ND32 of the flag cell FCL32D of the memory unit MU32D of the not illustrated next row is discharged. Namely, the flag data "0" is transferred to the flag node ND32 of the flag cell FCL32D of the memory unit MU32D.

On the other hand, in the data transfer circuit DTC221D, in the case where the correlation result data of the logic "1" is stored in the memory cell M221, the data "1" has been latched in the first memory node ND1g, and the memory unit MU32D of the not illustrated next row is designated as the particular memory unit of the region growing, the flag data "0" of the power source voltage VSS level is set in the flag node ND32, therefore the inverted node ND32D becomes the power source voltage VDD level. As a result, the NMOS transistors NT229a and NT230a become the conductive state, and the charge of the flag node ND22 of the flag cell FCL22D of their own memory unit MU22D is discharged. Namely, the flag data "0" of the flag node ND32 of the flag cell FCL32D of the memory unit MU32D is transferred to the flag node ND22.

In this way, the data transfer circuit DTC221D has the function of transferring the data to both directions in the left-right direction of FIG. 13.

The data transfer circuit DTC222D is configured by NMOS transistors NT227b to NT230b.

The NMOS transistors NT227b and NT228b are connected in series between the supply line of the power source voltage VSS and the flag node ND23 of the flag cell FCL23D of the memory unit MU23D of the not illustrated next column.

Also, the NMOS transistors NT229b and NT230b are connected in series between the supply line of the power source voltage VSS and the flag node ND22 of the flag cell FCL22D of the memory unit MU22D.

Gates of the NMOS transistors NT227b and NT229b are connected to the first memory node ND1h of the memory cell M222, a gate of the NMOS transistor NT228b is connected to the inverted node ND22D of the flag cell FCL22D, and a gate of the NMOS transistor NT230b is connected to the inverted node ND23D of the flag cell FCL23D of the memory unit MU23D of the not illustrated next column.

In the data transfer circuit DTC222D having such a configuration, in the case where the correlation result data of the logic "1" is stored in the memory cell M222, the data "1" has been latched in the first memory node ND1h, and the memory unit MU22D is designated as the particular memory unit of the region growing, the flag data "0" of the power source voltage VSS level is set in the flag node ND22, therefore the inverted node ND22D becomes the power source voltage VDD level. As a result, the NMOS transistors NT227b and NT228b become the conductive state, and the charge of the flag node ND23 of the flag cell FCL23D of the memory unit MU23D of the not illustrated next column is discharged. Namely, the flag data "0" is transferred to the flag node ND23 of the flag cell FCL23D of the memory unit MU23D.

On the other hand, in the data transfer circuit DTC222D, in the case where the correlation result data of the logic "1" is stored in the memory cell M222, the data "1" has been latched in the first memory node ND1h, and the memory unit MU23D of the not illustrated next column is designated as the particular memory unit of the region growing, the flag data "0" of the power source voltage VSS level is set in the flag node ND23, therefore the inverted node 23D becomes the power source voltage VDD level. As a result, the NMOS transistors NT229b and NT230b become the conductive state, and the charge of the flag node ND22 of the flag cell FCL22D of their own memory unit MU22D is discharged. Namely, the flag data "0" of the flag node ND23 of the flag cell FCL23D of the memory unit MU23D is transferred to the flag node ND22.

In this way, the data transfer circuit DTC222D has the function of transferring the data to both directions in the up-bottom direction of FIG. 13.

Figure 14:
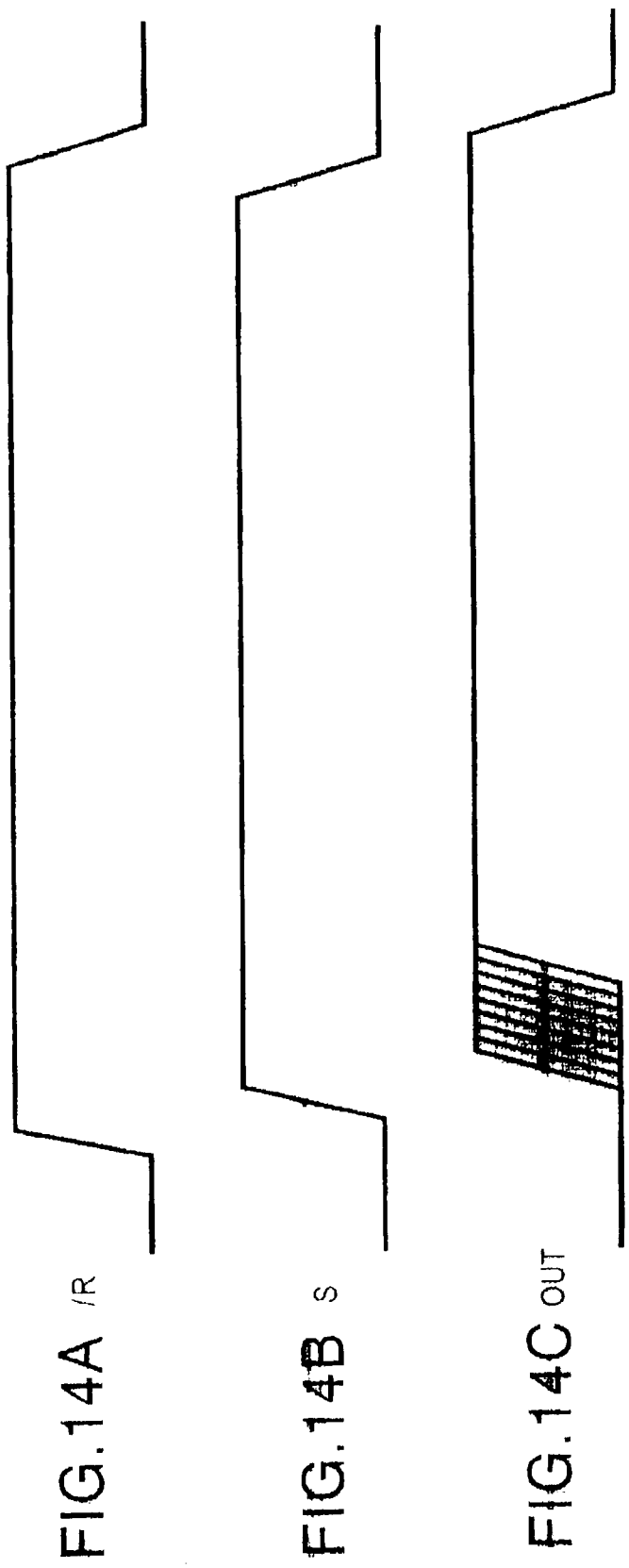
FIGS. 14A to 14C are timing charts for explaining the operation of the circuit of FIG. 13.

When the data of all pixels worth of the correlation values are written into the memory cells of the memory array 51D having such a configuration, as shown in FIG. 14A, the low level active reset signal /R is supplied to the gates of the PMOS transistors configuring the flag cells FCL11D to FCL22D of all memory units MU11D to MU22D (in actuality, as in FIG. 5, a large number of memory units are arrayed).

Due to this, the data of the flag nodes ND11 to ND22 of the flag cells FCL11 to FCL22 of all memory units MU11D to MU22D are reset to "0". Along with this, as shown in FIG. 14C, all flag outputs OUT are reset to "0".

By this reset operation, the preparations for the region growing operation are completed.

Thereafter, the gate of the NMOS transistor NT configuring the flag cell FCL of the particular memory unit MU at a position (address) designated by the pointing device 6, as shown in FIG. 14B, is supplied with a high level active set signal S.

Due to this, only the potential of the flag node of the flag cell of that particular memory unit cell falls to the power source voltage (reference voltage) VSS level, and thus it becomes possible to output the data "0".

Then, the "0" level of that particular memory unit is transferred successively via the data transfer circuits connected to the memory cells around that particular memory unit. The data "1" is output as the flag output OUT from the flag cell of each memory unit to which the "0" level was transferred to the image combining unit 7 via the inverter.

Here, when the NMOS transistor transfer gate of the data transfer circuit connected to the first memory node of a memory cell is in the off state, the region growing processing stops there and the processing is ended.

As described above, the memory array 51D of the region growing circuit of FIG. 13 receives the latch data of the first memory node of the memory cell at its gate in place of the transfer gate serving as the data transferring means of each memory unit and transfers the signal of the power source voltage VSS level to the memory unit of the next row or the next column or transfers the signal of the power source voltage VSS level in the memory unit of the next row or next column to the flag node of its own flag cell, therefore is resistant to the effects of the capacitance of the signal line in comparison with the case where a transfer gate is used, so has the advantage that further high speed region growing can be realized.

Further, the region growing circuit is configured so as to perform a negative logic operation as the circuit operation, so the size of the circuit can be reduced, for example, the inverters of the flag cell can be decreased by one in comparison with the circuit of FIG. 10. Further, the data transfer circuit DTC is configured by NMOS transistors in place of PMOS transistor, so there is the advantage that an increase of speed of the circuit can be achieved.

Figure 15:
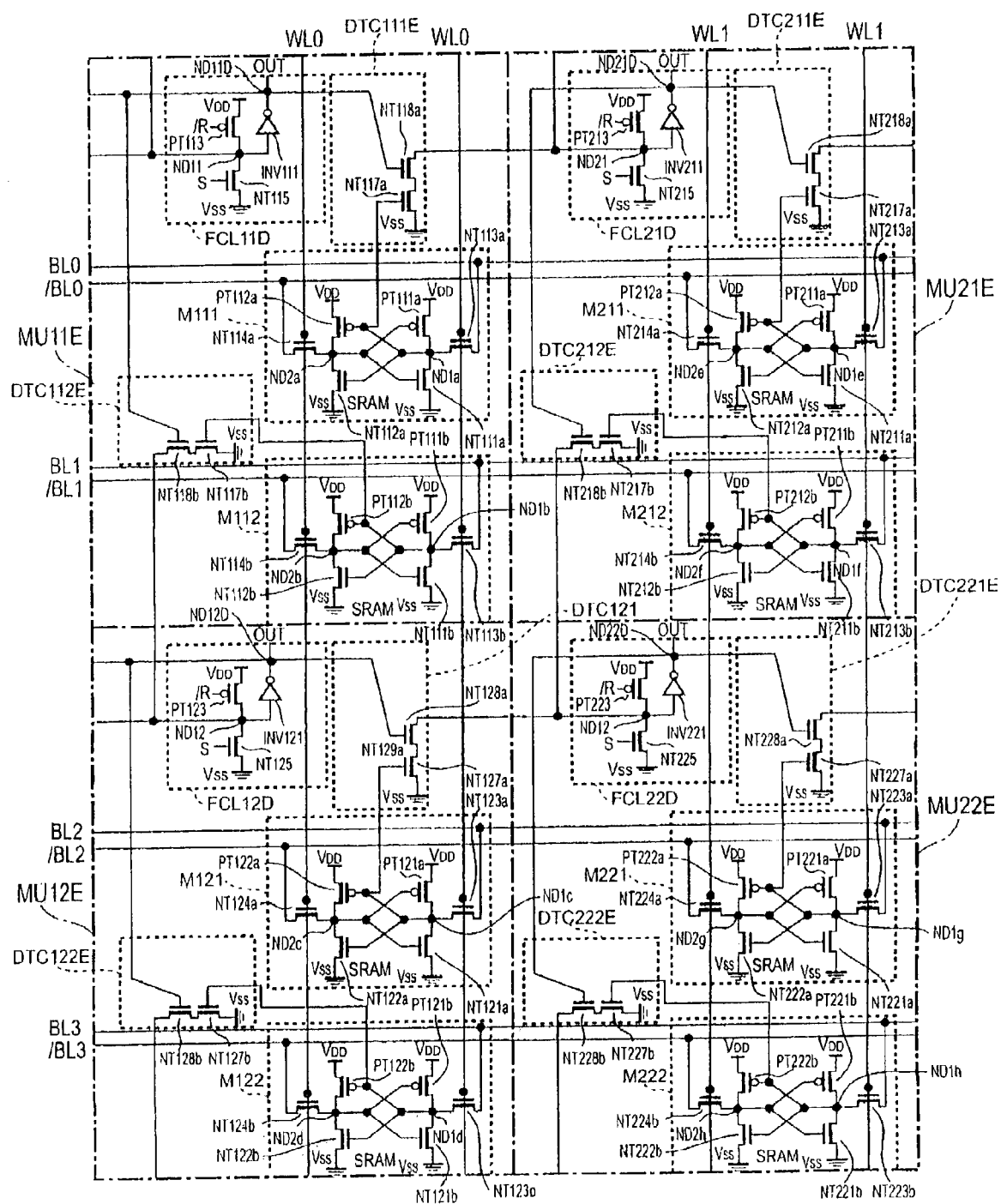
FIG. 15 is a circuit diagram of a sixth example of the configuration of a memory unit of a memory array in a region growing circuit able to grow a region in the left-right and up-bottom directions according to the present invention.

FIG. 15 is a circuit diagram of a sixth example of the configuration of the memory unit of the memory array in a region growing circuit able to grow a region in the left-right and up-bottom directions according to the present invention.

The difference of the circuit 51E of FIG. 15 from the circuit 51D of FIG. 13 resides in that the data transfer direction of the data transfer circuit is not a two-way direction, but a one-way direction, i.e., transfer is possible in only from the left to right direction and from the up to down direction in FIG. 15 in the circuit 51E of FIG. 15 and a one-way direction region growing algorithm is enabled.

Note that in FIG. 15, the same components as those of FIG. 13 are assigned the same reference notations.

Concretely, the data transfer circuit DTC111E of the memory unit MU11E has only NMOS transistors NT117a and NT118a connected in series between the supply line of the power source voltage (reference voltage) VSS and the flag node ND21 of the flag cell FCL21E of the memory unit MU21E of the next row and does not have the NMOS transistors NT119a and NT120a connected in series between the supply line of the power source voltage VSS and the flag node ND11 of the flag cell FCL11E of the memory unit MU11E as in the circuit of FIG. 13.

Namely, the data transfer circuit DTC111E of the memory unit MU11E has only the function of discharging the charge of the flag node ND21 of the flag cell FCL21E of the memory unit MU21E of the next row and transferring the data "0".

The data transfer circuit DTC112E of the memory unit MU11E has only NMOS transistors NT117b and NT118b connected in series between the supply line of the power source voltage VSS and the flag node ND12 of the flag cell FCL12E of the memory unit MU12E of the next column and does not have the NMOS transistors NT119b and NT120b connected in series between the supply line of the power source voltage VSS and the flag node ND11 of the flag cell FCL11E of the memory unit MU11E as in the circuit of FIG. 13.

Namely, the data transfer circuit DTC112E of the memory unit MU11E has only the function of discharging the charge of the flag node ND12 of the flag cell FCL12E of the memory unit MU12E of the next column and transferring the data "0".

Similarly, the data transfer circuit DTC121E of the memory unit MU12E has only NMOS transistors NT127a and NT128a connected in series between the supply line of the power source voltage VSS and the flag node ND22 of the flag cell FCL22E of the memory unit MU22E of the next row and does not have the NMOS transistors NT129a and NT130a connected in series between the supply line of the power source voltage VSS and the flag node ND12 of the flag cell FCL12E of the memory unit MU12E as in the circuit of FIG. 13.

Namely, the data transfer circuit DTC121E of the memory unit MU12E has only the function of discharging the charge of the flag node ND22 of the flag cell FCL22E of the memory unit MU22E of the next row and transferring the data "0".

The data transfer circuit DTC122E of the memory unit MU12E has only NMOS transistors NT127b and NT128b connected in series between the supply line of the power source voltage VSS and the flag node ND13 of the flag cell FCL13E of the memory unit MU13E of the not illustrated next column and does not have the NMOS transistors NT129b and NT130b connected in series between the supply line of the power source voltage VSS and the flag node ND12 of the flag cell FCL12E of the memory unit MU12E as in the circuit of FIG. 13.

Namely, the data transfer circuit DTC122E of the memory unit MU12E has only the function of discharging the charge of the flag node ND13 of the flag cell FCL13E of the memory unit MU13E of the not illustrated next column and transferring the data "0".

The data transfer circuit DTC211E of the memory unit MU21E has only NMOS transistors NT217a and NT218a connected in series between the supply line of the power source voltage VSS and the flag node ND31 of the flag cell FCL31E of the memory unit MU31E of the not illustrated next row and does not have the NMOS transistors NT219a and NT220a connected in series between the supply line of the power source voltage VSS and the flag node ND21 of the flag cell FCL21E of the memory unit MU21E as in the circuit of FIG. 13.

Namely, the data transfer circuit DTC211E of the memory unit MU21E has only a function of discharging the charge of the flag node ND31 of the flag cell FCL31E of the memory unit MU31E of the not illustrated next row and transferring the data "0".

The data transfer circuit DTC212E of the memory unit MU21E has only NMOS transistors NT217b and NT218b connected in series between the supply line of the power source voltage VSS and the flag node ND22 of the flag cell FCL22E of the memory unit MU22E of the next column and does not have the NMOS transistors NT219b and NT220b connected in series between the supply line of the power source voltage VSS and the flag node ND21 of the flag cell FCL21E of the memory unit MU21E as in the circuit of FIG. 13.

Namely, the data transfer circuit DTC212E of the memory unit MU21E has only the function of discharging the charge of the flag node ND22 of the flag cell FCL22E of the memory unit MU22E of the next column and transferring the data "0".

The data transfer circuit DTC221E of the memory unit MU22E has only NMOS transistors NT227a and NT228a connected in series between the supply line of the power source voltage VSS and the flag node ND32 of the flag cell FCL32E of the memory unit MU32E of the not illustrated next row and does not have the NMOS transistors NT229a and NT230a connected in series between the supply line of the power source voltage VSS and the flag node ND22 of the flag cell FCL22E of the memory unit MU22E as in the circuit of FIG. 13.

Namely, the data transfer circuit DTC221E of the memory unit MU22E has only the function of discharging the charge of the flag node ND32 of the flag cell FCL32E of the memory unit MU32E of the not illustrated next row and transferring the data "0".

The data transfer circuit DTC222E of the memory unit MU22E has only NMOS transistors NT227b and NT228b connected in series between the supply line of the power source voltage VSS and the flag node ND23 of the flag cell FCL23E of the memory unit MU23E of the not illustrated next column and does not have the NMOS transistors NT229b and NT230b connected in series between the supply line of the power source voltage VSS and the flag node ND22 of the flag cell FCL22E of the memory unit MU22E as in the circuit of FIG. 13.

Namely, the data transfer circuit DTC222E of the memory unit MU22E has only the function of discharging the charge of the flag node ND23 of the flag cell FCL23E of the memory unit MU23E of the not illustrated next column and transferring the data "0".

As described above, the circuit 51E of FIG. 15 is configured so that the data transfer direction of the data transfer circuit is made not a two-way direction, but a one-way direction, i.e., transfer is possible only from the left to right direction and from the up to down direction in FIG. 15. Therefore, a one-way direction region growing algorithm is enabled in accordance with the application, and, in this case, a reduction of the number of the components can be achieved.

Further, the region growing circuit is configured so as to perform negative logic operation as the circuit operation, so the size of the circuit can be reduced, for example, the inverters of the flag cell can be decreased by one in comparison with the circuit of FIG. 11. Further, the data transfer circuit DTC is configured by the NMOS transistors in place of PMOS transistor, so there is the advantage that an increase of speed of the circuit can be achieved.

Figure 16:
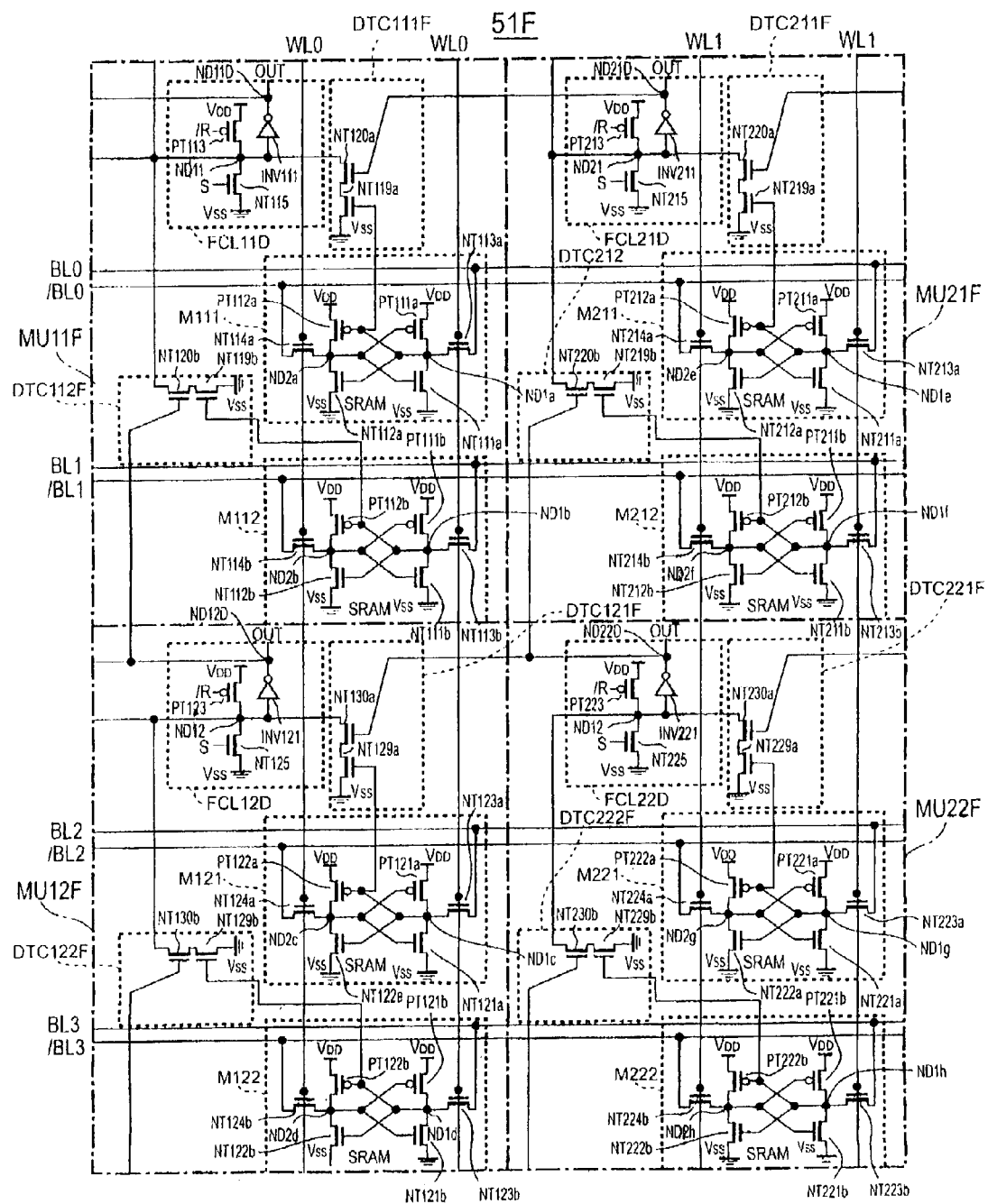
FIG. 16 is a circuit diagram of a seventh example of the configuration of a memory unit of a memory array in a region growing circuit able to grow a region in the left-right and up-bottom directions according to the present invention.

FIG. 16 is a circuit diagram of a seventh example of the configuration of the memory unit of the memory array in a region growing circuit able to grow a region in the left-right and up-bottom directions according to the present invention.

The difference of the circuit 51F of FIG. 16 from the circuit 51D of FIG. 13 resides in that the data transfer direction of the data transfer circuit is made not a two-way direction, but a one-way direction, i.e., transfer is possible in only from the right to left direction and from the down to up direction in FIG. 16 in the circuit 51F of FIG. 16 and therefore a one-way direction region growing algorithm is enabled.

Note that in FIG. 16, the same components as those of FIG. 13 are assigned the same reference notations.

Concretely, the data transfer circuit DTC111F of the memory unit MU11F has only NMOS transistors NT119a and NT120a connected in series between the supply line of the power source voltage (reference voltage) VSS and the flag node ND11 of the flag cell FCL11F of the memory unit MU11F and does not have the NMOS transistors NT117a and NT118a connected in series between the supply line of the power source voltage VSS and the flag node ND21 of the flag cell FCL21F of the memory unit MU21F of the next row as in the circuit of FIG. 13.

Namely, the data transfer circuit DTC111F of the memory unit MU11F has only the function of transferring the data "0" of the flag node ND21 of the flag cell FCL21F of the memory unit MU21F of the next row to the flag node ND11 of the flag cell FCL11F of its own memory unit MU11F.

The data transfer circuit DTC112F of the memory unit MU11F has the NMOS transistors NT119b and NT120b connected in series between the supply line of the power source voltage VSS and the flag node ND11 of the flag cell FCL11F of the memory unit MU11F and does not have the NMOS transistors NT117b and NT118b connected in series between the supply line of the power source voltage VSS and the flag node ND12 of the flag cell FCL12F of the memory unit MU12F of the next column as in the circuit of FIG. 13.

Namely, the data transfer circuit DTC112F of the memory unit MU11F has only the function of transferring the data "0" of the flag node ND12 of the flag cell FCL12F of the memory unit MU12F of the next column to the flag node ND11 of flag cell FCL11F of its own memory unit MU11F.

Similarly, the data transfer circuit DTC121F of the memory unit MU12F has only NMOS transistors NT129a and NT130a connected in series between the supply line of the power source voltage VSS and the flag node ND12 of the flag cell FCL12F of the memory unit MU12F and does not have the NMOS transistors NT127a and NT128a connected in series between the supply line of the power source voltage VSS and the flag node ND22 of the flag cell FCL22F of the memory unit MU22F of the next row as in the circuit of FIG. 13.

Namely, the data transfer circuit DTC121F of the memory unit MU12F has only the function of transferring the data "0" of the flag node ND22 of the flag cell FCL22F of the memory unit MU22F of the next row to the flag node ND12 of the flag cell FCL12F of its own memory unit MU12F.

The data transfer circuit DTC122F of the memory unit MU12F has the NMOS transistors NT129b and NT130b connected in series between the supply line of the power source voltage VSS and the flag node ND12 of the flag cell FCL12F of the memory unit MU12F and does not have the NMOS transistors NT127b and NT128b connected in series between the supply line of the power source voltage VSS and the flag node ND13 of the flag cell FCL13F of the memory unit MU13F of the not illustrated next column as in the circuit of FIG. 13.

Namely, the data transfer circuit DTC122F of the memory unit MU12F has only the function of transferring the data "0" of the flag node ND13 of the flag cell FCL13F of the memory unit MU13F of the next column to the flag node ND12 of its own flag cell FCL12F of the memory unit MU12F.

The data transfer circuit DTC211F of the memory unit MU21F has only NMOS transistors NT219a and NT220a connected in series between the supply line of the power source voltage VSS and the flag node ND21 of the flag cell FCL21F of the memory unit MU21F and does not have the NMOS transistors NT217a and NT218a connected in series between the supply line of the power source voltage VSS and the flag node ND31 of the flag cell FCL31F of the memory unit MU31F of the not illustrated next row as in the circuit of FIG. 13.

Namely, the data transfer circuit DTC211F of the memory unit MU21F has only the function of transferring the data "0" of the flag node ND31 of the flag cell FCL31F of the memory unit MU31F of the next row to the flag node ND21 of the flag cell FCL21F of its own memory unit MU21F.

The data transfer circuit DTC212F of the memory unit MU21F has the NMOS transistors NT219b and NT220b connected in series between the supply line of the power source voltage VSS and the flag node ND21 of the flag cell FCL21F of the memory unit MU21F and does not have the NMOS transistors NT217b and NT218b connected in series between the supply line of the power source voltage VSS and the flag node ND22 of the flag cell FCL22F of the memory unit MU22F of the next column as in the circuit of FIG. 13.

Namely, the data transfer circuit DTC212F of the memory unit MU21F has only the function of transferring the data "0" of the flag node ND22 of the flag cell FCL22F of the memory unit MU22F of the next column to the flag node ND21 of the flag cell FCL21F of its own memory unit MU21F.

The data transfer circuit DTC221F of the memory unit MU22F has only NMOS transistors NT229a and NT230a connected in series between the supply line of the power source voltage VSS and the flag node ND22 of the flag cell FCL22F of the memory unit MU22F and does not have the NMOS transistors NT227a and NT228a connected in series between the supply line of the power source voltage VSS and the flag node ND32 of the flag cell FCL32F of the memory unit MU32F of the not illustrated next row as in the circuit of FIG. 13.

Namely, the data transfer circuit DTC221F of the memory unit MU22F has only the function of transferring the data "0" of the flag node ND32 of the flag cell FCL32F of the memory unit MU32F of the next row to the flag node ND22 of the flag cell FCL22F of its own memory unit MU22F.

The data transfer circuit DTC222F of the memory unit MU22F has the NMOS transistors NT229b and NT230b connected in series between the supply line of the power source voltage VSS and the flag node ND22 of the flag cell FCL22F of the memory unit MU22F and does not have the NMOS transistors NT227b and NT228b connected in series between the supply line of the power source voltage VSS and the flag node ND23 of the flag cell FCL23F of the memory unit MU23F of the not illustrated next column as in the circuit of FIG. 13.

Namely, the data transfer circuit DTC222F of the memory unit MU22F has only the function of transferring the data "0" of the flag node ND23 of the flag cell FCL23F of the memory unit MU23F of the next column to the flag node ND22 of its own flag cell FCL22F of the memory unit MU22F.

As described above, the circuit 51F of FIG. 16 is configured so that the data transfer direction of the data transfer circuit is made not a two-way direction, but a one-way direction, i.e., transfer is possible only from the right to left direction and from the down to up direction in FIG. 16. Therefore, a one-way direction region growing algorithm is enabled in accordance with the application, and, in this case, a reduction of the number of the components can be achieved.

Further, the region growing circuit is configured so as to perform a negative logic operation as the circuit operation, so the size of the circuit can be reduced, for example, the inverters of the flag cell can be decreased by one in comparison with the circuit of FIG. 11. Further, the data transfer circuit DTC is configured by NMOS transistors in place of PMOS transistor, so there is the advantage that an increase of the speed of the circuit can be achieved.

Figure 17:
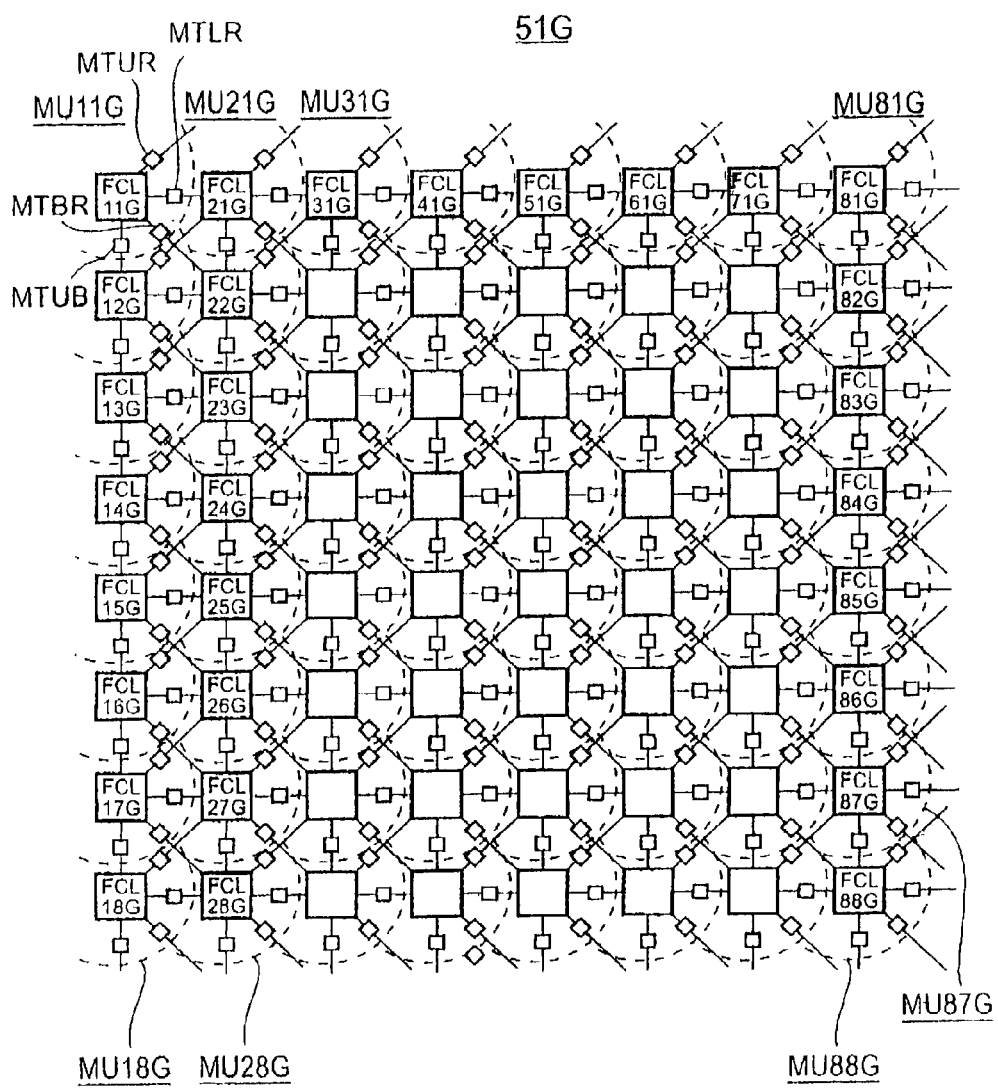
FIG. 17 is a block diagram of an example of the configuration of a memory array having a circuit configuration able to grow a region also in an oblique direction according to the present invention.

The memory array in the region growing circuit explained up to now was explained as a circuit able to grow a region in the left-right and up-bottom directions, but it is also possible to employ a circuit configuration able to grow a region in also the oblique direction as shown in for example FIG. 17.

Due to this, it becomes possible to extract also an oblique line or the like by the region growing algorithm.

Note that in the memory array 51G of FIG. 17, a combined circuit of FIG. 6 having a memory cell and transfer gate as a unit is shown as the transfer control circuit by using the symbol MT.

In this case, basically, each memory unit MU has, in the same way as FIG. 6, in addition to the transfer control circuit MTLR for data transfer control in the left-right direction and the transfer control circuit MTUB for data transfer control in the up-bottom direction, a transfer control circuit MTUR for data transfer control with the adjacent memory unit in the upper right direction, and a transfer control circuit MTBR for data transfer control with the adjacent memory unit in a bottom right direction.

Accordingly, each memory unit basically has four memory cells, four transfer gates (or data transfer circuits) arranged corresponding to them, and one flag cell.

Also, in actuality, the transfer control circuit MTUR for the data transfer control with the adjacent memory unit in the upper right direction of the first column (the uppermost column in FIG. 17) is not arranged in FIG. 17.

Figure 18:
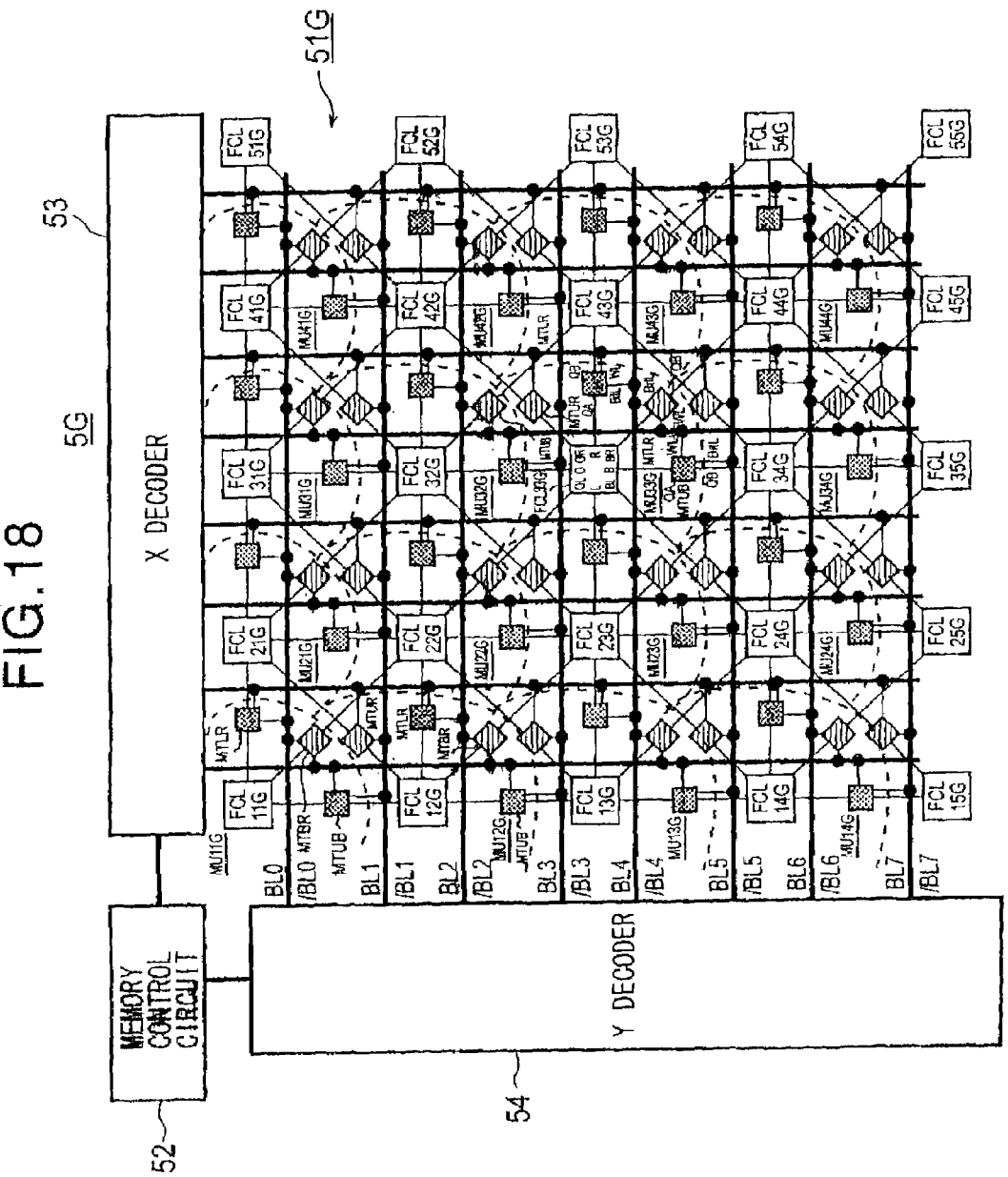
FIG. 18 is a block diagram of an example of the configuration of a region growing circuit having a memory array having a circuit configuration able to grow a region also in an oblique direction shown in FIG. 17 according to the present invention.

FIG. 18 is a block diagram of an example of the configuration of a region growing circuit having a memory array of a circuit configuration able to grow a region also in an oblique direction.

As shown in FIG. 18, in a memory array 51G having a circuit configuration able to grow a region also in an oblique direction, unlike a memory array of a circuit configuration able to grow a region in the up-bottom and left-right directions shown in FIG. 5 and FIG. 6, not two, but three bit line pairs are used except at the uppermost column in one memory unit, and, for the word lines, not one, but two adjacent word lines are used in all memory units.

Concretely, when looking at the memory unit MU12G, for the bit lines, the transfer control circuit MTUR for the data transfer control with the adjacent memory unit in the upper right direction is connected to the bit line BL1 and the inverted bit line /BL1, the transfer control circuit MTLR for the data transfer control in the left-right direction and the transfer control circuit MTBR for the data transfer control with the adjacent memory unit in the bottom right direction are connected to the bit line BL2 and the inverted bit line /BL2, and the transfer control circuit MTUR for the data transfer control in the up-bottom direction is connected to the bit line BL3 and the inverted bit line /BL3.

For the word lines, the transfer control circuit MTUR for the data transfer control with the adjacent memory unit in the upper right direction and the transfer control circuit MTLR for the data transfer control in the left-right direction are connected to the word line WL1, and the transfer control circuit MTBR for the data transfer control with the adjacent memory unit in the bottom right direction and the transfer control circuit MTUB for the data transfer control in the up-bottom direction are connected to the word line WL0.

Similarly, when looking at the memory unit MU33G, for the bit lines, the transfer control circuit MTUR for the data transfer control with the adjacent memory unit in the upper right direction is connected to the bit line BL3 and the inverted bit line /BL3, the transfer control circuit MTLR for the data transfer control in the left-right direction and the transfer control circuit MTBR for the data transfer control with the adjacent memory unit in the bottom right direction are connected to the bit line BL4 and the inverted bit line /BL4, and the transfer control circuit MTUB for the data transfer control in the up-bottom direction is connected to the bit line BL5 and the inverted bit line /BL5.

For the word lines, the transfer control circuit MTUR for the data transfer control with the adjacent memory unit in the upper right direction and the transfer control circuit MTLR for the data transfer control in the left-right direction are connected to the word line WL5, and the transfer control circuit MTBR for the data transfer control with the adjacent memory unit in the bottom right direction and the transfer control circuit MTUB for the data transfer control in the up-bottom direction are connected to the word line WL4.

Also, when looking at the memory unit MU11G of the uppermost column, for the bit lines, the transfer control circuit MTLR for the data transfer control in the left-right direction and the transfer control circuit MTBR for the data transfer control with the adjacent memory unit in the bottom right direction are connected to the bit line BL0 and the inverted bit line /BL0, and the transfer control circuit MTUB for the data transfer control in the up-bottom direction is connected to the bit line BL1 and the inverted bit line /BL1.

For the word lines, the transfer control circuit MTLR for the data transfer control in the left-right direction is connected to the word line WL1, and the transfer control circuit MTBR for the data transfer control with the adjacent memory unit in the bottom right direction and the transfer control circuit MTUB for the data transfer control in the up-bottom direction are connected to the word line WL0.

Similarly, when looking at the memory unit MU31G of the uppermost column, for the bit lines, the transfer control circuit MTLR for the data transfer control in the left-right direction and the transfer control circuit MTBR for the data transfer control with the adjacent memory unit in the bottom right direction are connected to the bit line BL0 and the inverted bit line /BL0, and the transfer control circuit MTUB for the data transfer control in the up-bottom direction is connected to the bit line BL1 and the inverted bit line /BL1.

For the word lines, the transfer control circuit MTLR for the data transfer control in the left-right direction is connected to the word line WL5, and the transfer control circuit MTBR for the data transfer control with the adjacent memory unit in the bottom right direction and the transfer control circuit MTUB for the data transfer control in the up-bottom direction are connected to the word line WL4.

Also, the flag cell FCL employed in the memory array 51G having a circuit configuration able to grow a region also in an oblique direction has eight input/output terminals connected to the flag node.

Figure 19:
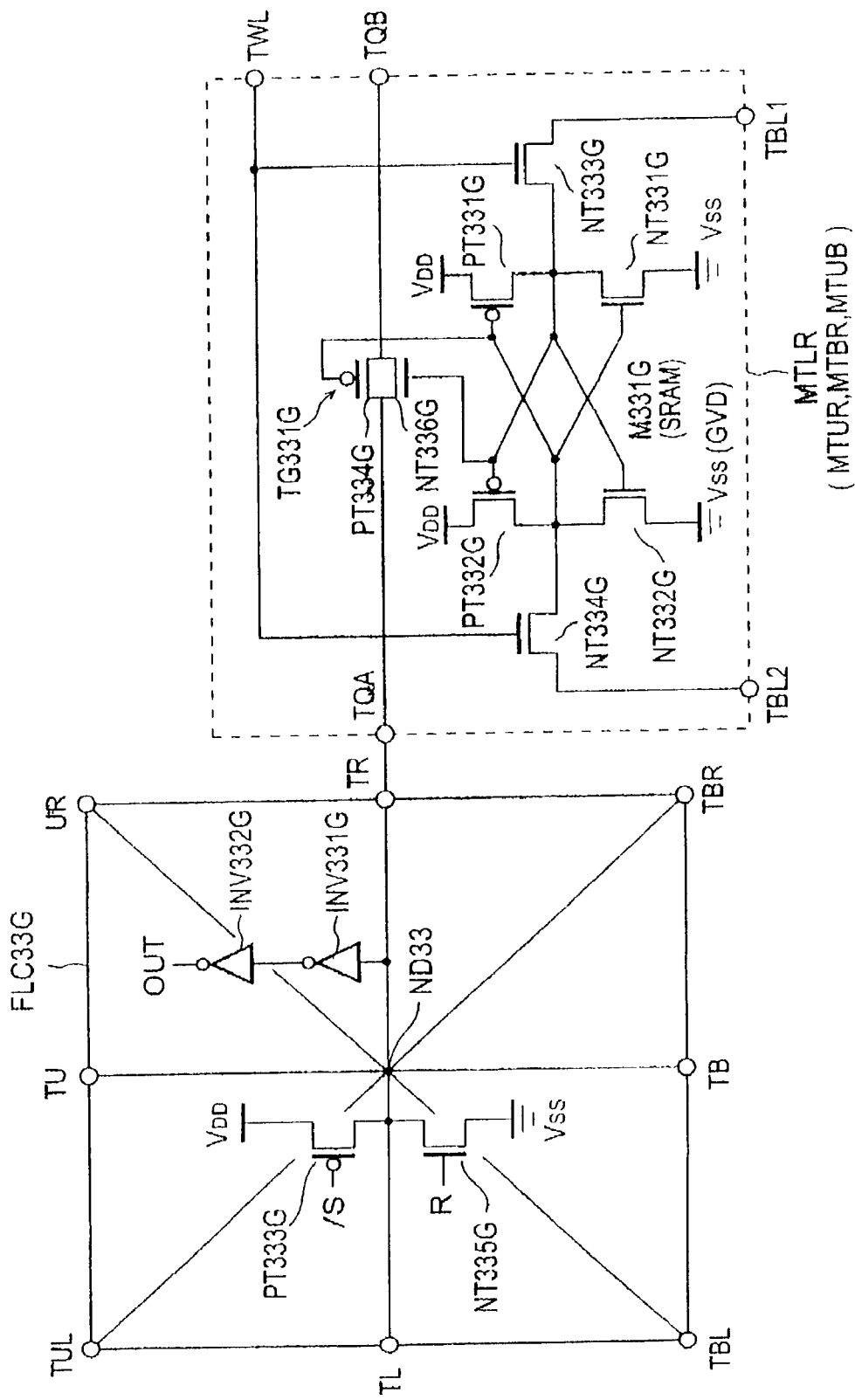
FIG. 19 is a circuit diagram of a concrete example of the configuration of a flag cell and a transfer control circuit employed in a memory array having a circuit configuration able to grow a region also in an oblique direction.

FIG. 19 is a circuit diagram of a concrete example of the configuration of the flag cells FCL and the transfer control circuits MTUR, MTLR, MTBR, and MTUB employed in the memory array 51G of a circuit configuration able to grow a region also in an oblique direction.

Note that in the case of FIG. 19, the flag cell FCL33G and the transfer control circuit MTLR of the memory unit MU33G are shown as examples, but the flag cells FCL and the transfer control circuits MTUR, MTLR, MTBR, and MTUB of the other memory unit have similar configurations. Their explanations will be omitted here.

The flag cell FCL33G is configured by a PMOS transistor PT333G, NMOS transistor NT335G, and two inverters INV331G and INV332G connected in series.

The PMOS transistor PT333G and the NMOS transistor NT335G are connected in series between the supply line of the power source voltage VDD and the supply line of the reference voltage (0V) VSS. A gate of the PMOS transistor PT333G is connected to the supply line of the set signal /S, and a gate of the NMOS transistor NT335G is connected to the supply line of the reset signal R.

A flag node ND33 is configured by the connection point of the drains of the PMOS transistor PT333G and the NMOS transistor NT335G.

The flag node ND33 has eight input/output terminals, that is, an input/output terminal TR for connection with the transfer control circuit MTLR for the transfer control in the left-right direction, an input/output terminal TUR for connection with the transfer control circuit MTUR for the transfer control in the upper right direction, an input/output terminal TBR for connection with the transfer control circuit MTBR for the transfer control in the bottom right direction, and input/output terminal TB for connection with the transfer control circuit MTUB for the transfer control in the up-bottom direction, an input/output terminal TU for connection with the transfer control circuit MTUB for the transfer control in the up-bottom direction of the memory unit MU32G of one upper column, an input/output terminal TUL for connection with the transfer control circuit MTBR for the transfer control in the bottom right direction of the memory unit MU22G in the upper left direction, an input/output terminal TL for connection with the transfer control circuit MTLR for the transfer control in the left-right direction of the left adjacent memory unit MU23G, and an input/output terminal TBL for connection with the transfer control circuit MTUR for the transfer control in the upper right direction of the memory unit MU24G in the bottom left direction.

The signal set in the node ND33 is output via the inverters INV331G and INV332G to the image combining unit 7 as the output OUT.

Also, the transfer control circuit MTLR (MTUR, MTBR, MTUB) is a circuit obtained by combining the memory cell and the transfer gate of FIG. 6 and is configured by the memory cell M331G (SRAM) comprised of the PMOS transistors PT331G and PT332G and NMOS transistors NT331G to NT334G and by the transfer gate TG331G obtained by connecting the sources and the drains of the PMOS transistor PT334G and the NMOS transistor NT336G.

The transfer control circuit MTLR (MTUR, MTBR, MTUB) has five terminals, that is, a terminal TQA for connection with the input/output terminal of its own flag cell FCL33G, a terminal TQB for connection with the input/output terminal of the flag cell of the adjacent memory unit, a terminal TWL for connection with the word line WL5 (WL4), and terminals TBL1 and TBL2 for connection with the bit line pairs BL4 and /BL4 (BL3 and /BL3, BL5 and /BL5).

The specific region growing operation is basically the same as that of the circuits of FIG. 5 and FIG. 6, so the explanation will be omitted here.

As the data transferring means, use is made of transfer gates, but it goes without saying that data transfer circuits having gates having configurations of FIG. 10 to FIG. 13, FIG. 15, and FIG. 16 and receiving the latch data of the memory nodes of the memory cells at their gates can be applied. In this case, the region growing circuit becomes resistant to the effects of the capacitance of the signal line in comparison with the case where a transfer gate is used, so there is an advantage that a further increase of the speed of the region growing can be realized.

As described above, according to the region growing circuit of FIG. 18, it becomes possible to extract also an oblique line or the like by the region growing algorithm.

Up to here, the explanation was given of an example of region growing processing using a memory array in a region growing circuit able to grow a region in the left-right and up-bottom directions and able to grow a region also in the oblique direction, that is, using it for correlation data in the spatial direction of the image.

Figure 20:
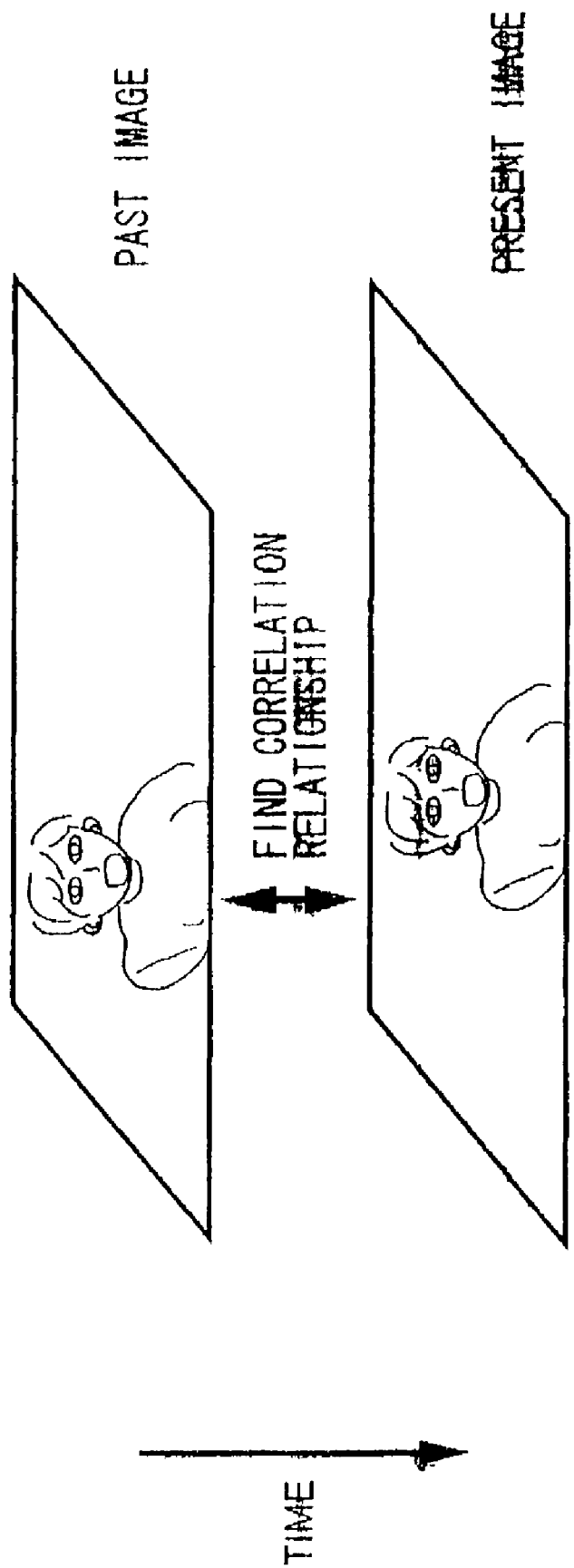
FIG. 20 is an explanatory view of a region growing circuit able to find a correlation value also for a time direction of the image and to find an image having high correlation in the time direction by the region growing.

As shown in FIG. 20, however, it is also possible to configure the region growing circuit to be able to find the correlation relationship between a present image and a past image, that is, find the correlation value also with respect to the time direction of the image, and thus able to find an image having high correlation in the time direction by the region growing.

Figure 21:
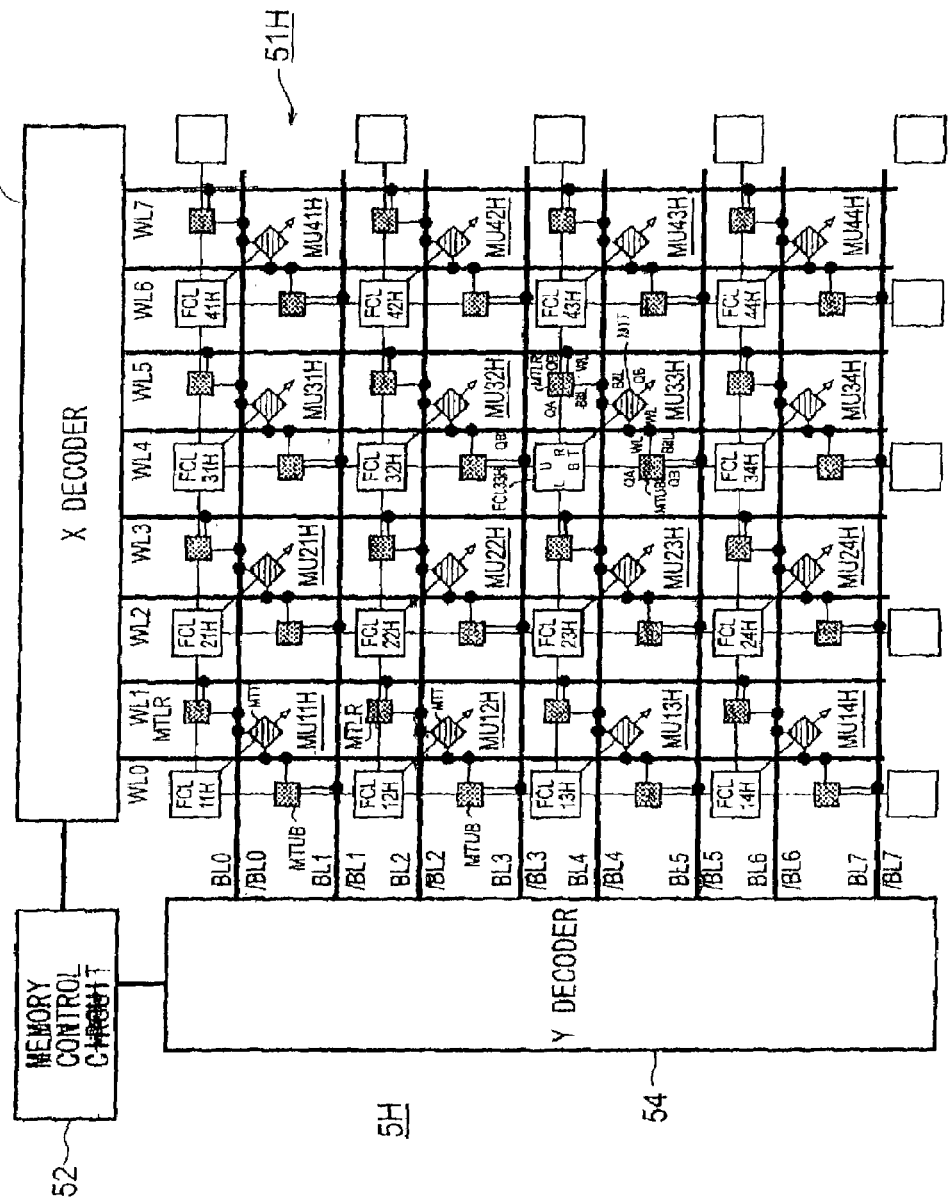
FIG. 21 is a view of an example of the configuration of a region growing circuit able to find a correlation value also for a time direction of the image and to find an image having high correlation in the time direction by the region growing, that is, a block diagram of an example of the configuration of a present image use region growing circuit.
Figure 22:
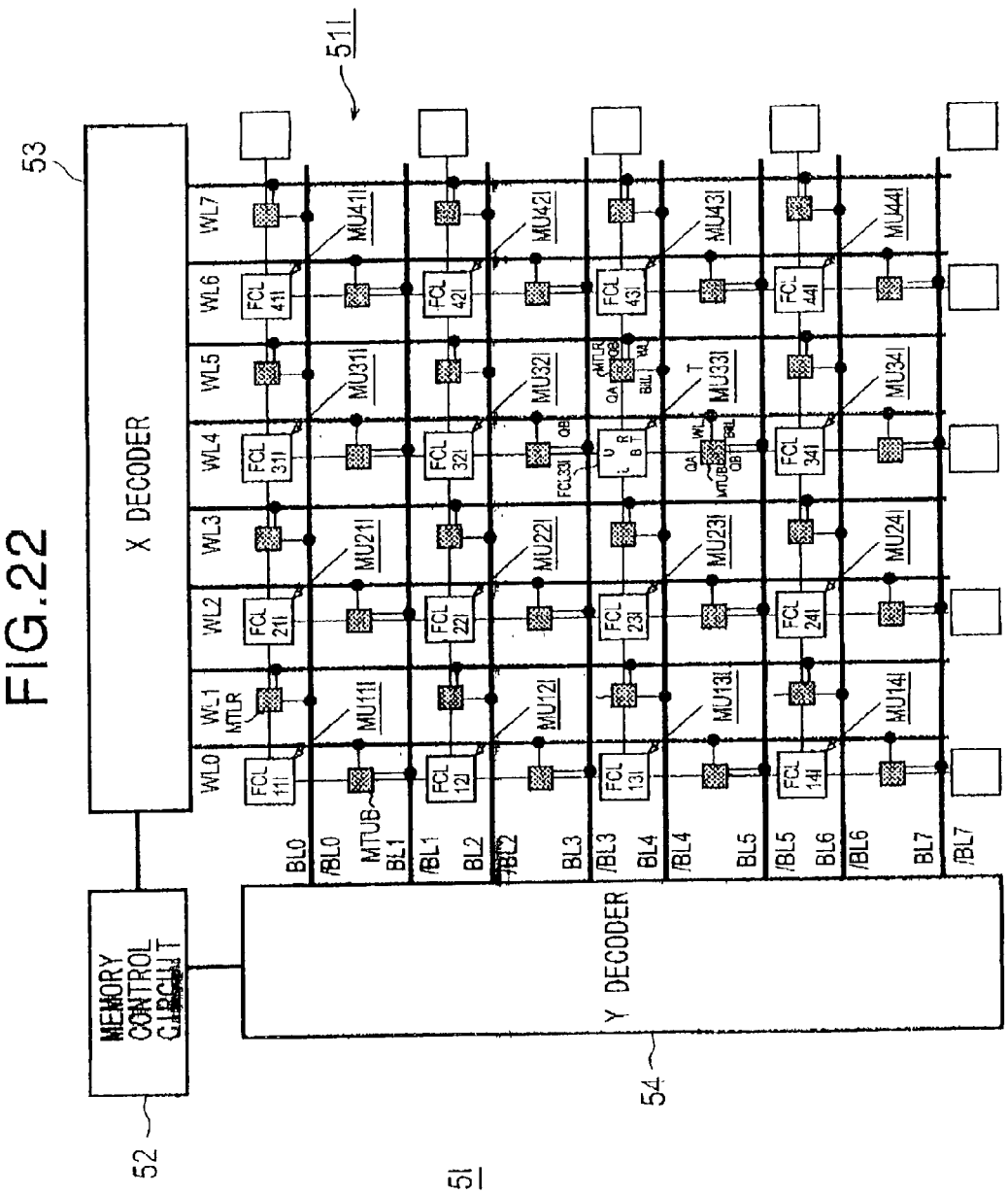
FIG. 22 is a view of an example of the configuration of a region growing circuit able to find a correlation value also for a time direction of the image and to find an image having high correlation in the time direction by the region growing, that is, a block diagram of an example of the configuration of a past image use region growing circuit.

FIG. 21 and FIG. 22 are block diagrams of an example of the configuration of a region growing circuit able to find the correlation value also with respect to the time direction of an image and to find an image having high correlation in the time direction by region growing. FIG. 21 shows a present image use region growing circuit 5H, and FIG. 22 shows a past image use region growing circuit 5I.

Note that these views are separated by the past and the present for making the explanation easier to understand, but do not express the actual layouts. Also, the decoder and memory control circuit can be shared.

Note that in the memory arrays 51H and 51I of FIG. 21 and FIG. 22, in the same way as the cases of FIG. 17 and FIG. 18, a combined circuit having the memory cell and transfer gate of FIG. 6 as a unit is shown as the transfer control circuit using the symbol MT.

In this case, basically, each memory unit MU has, in the same way as FIG. 6, in addition to the transfer control circuit MTLR for the data transfer control in the left-right direction and the transfer control circuit MTUB for the data transfer control in the up-bottom direction, a transfer control circuit MTT for the data transfer control in the time direction.

Accordingly, each memory unit basically has three memory cells, three transfer gates (or data transfer circuits) arranged corresponding to them, and one flag cell.

As shown in FIG. 21, in a memory array 51H having a circuit configuration able to grow a region also in the time direction, in the same way as a memory array having a circuit configuration able to grow a region in the up-bottom and left-right directions shown in FIG. 5, FIG. 6, etc., in one memory unit, two bit line pairs are used, and, for the word lines, in all memory units, two word lines are used.

Concretely, when looking at the memory unit MU12H, for the bit lines, the transfer control circuit MTLR for the data transfer control in the left-right direction and the transfer control circuit MTT for the data transfer control in the time direction are connected to the bit line BL2 and the inverted bit line /BL2, and the transfer control circuit MTUB for the data transfer control in the up-bottom direction is connected to the bit line BL3 and the inverted bit line /BL3.

For the word lines, the transfer control circuit MTLR for the data transfer control in the left-right direction is connected to the word line WL1, and the transfer control circuit MTT for the data transfer control in the time direction and the transfer control circuit MTUB for the data transfer control in the up-bottom direction are connected to the common word line WL0.

Similarly, when looking at the memory unit MU33H, for the bit lines, the transfer control circuit MTLR for the data transfer control in the left-right direction and the transfer control circuit MTT for the data transfer control in the time direction are connected to the bit line BL4 and the inverted bit line /BL4, and the transfer control circuit MTUB for the data transfer control in the up-bottom direction is connected to the bit line BL5 and the inverted bit line /BL5.

For the word lines, the transfer control circuit MTLR for the data transfer control in the left-right direction is connected to the word line WL5, and the transfer control circuit MTT for the data transfer control in the time direction and the transfer control circuit MTUB for the data transfer control in the up-bottom direction are connected to the common word line WL4.

The flag cells FCL employed in the memory arrays 51H and 51I having a circuit configuration able to grow a region also in the time direction have five input/output terminals connected to flag nodes.

Figure 23:
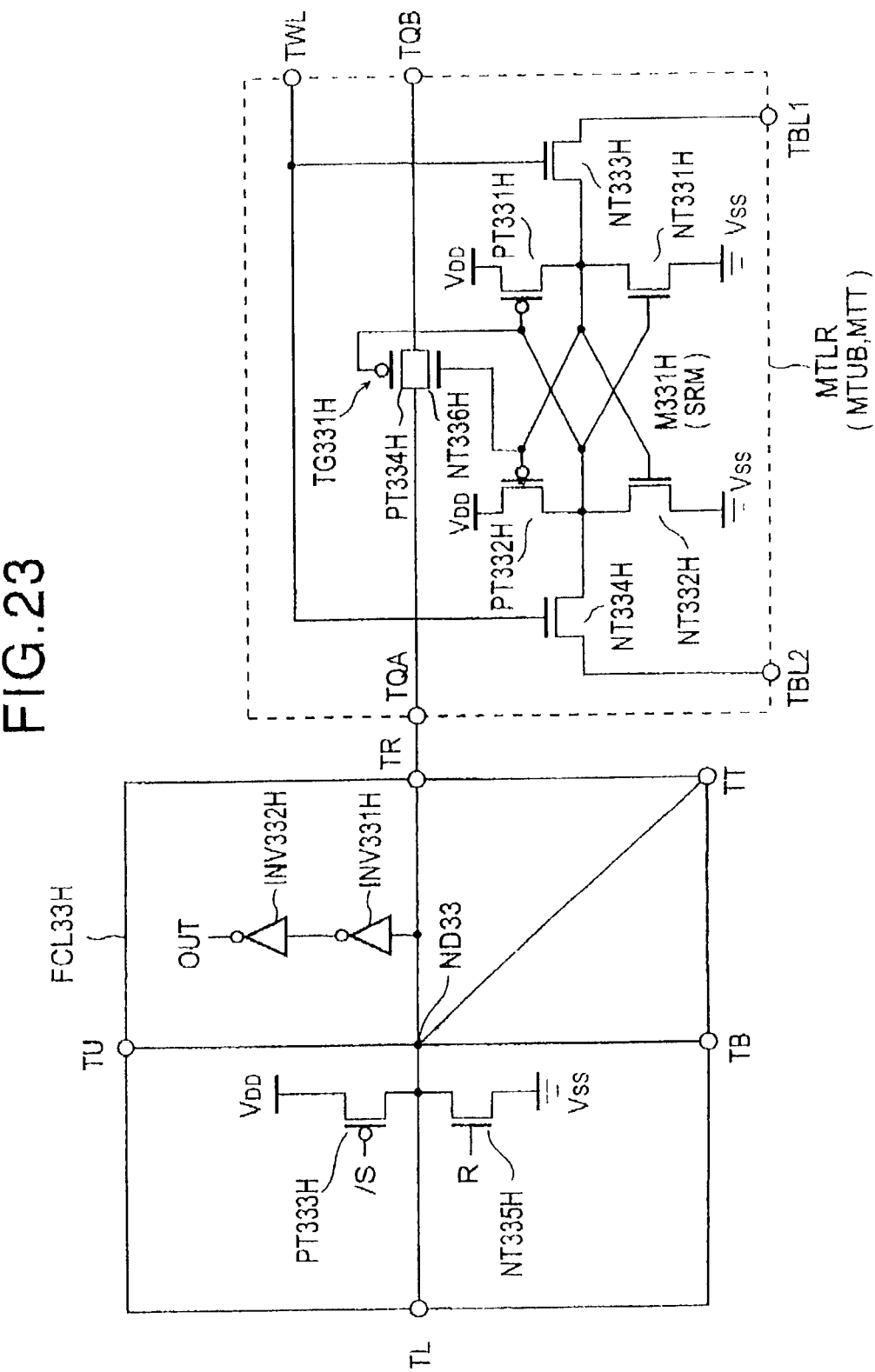
FIG. 23 is a circuit diagram of a concrete example of the configuration of a flag cell and transfer control circuit employed in a memory array of a circuit configuration able to grow a region also in the time direction.

FIG. 23 is a circuit diagram of a concrete example of the configuration of the flag cells FCL and transfer control circuit MTLR, MTUB, and MTT employed in the memory arrays 51H and 51I having the circuit configuration able to grow a region also in the time direction.

Note that in the case of FIG. 23, the flag cell FCL33H and the transfer control circuit MTLR of the memory unit MU33H are shown as examples, but the flag cells FCL and the transfer control circuit MTUB and MTT of the other memory units have similar configuration. Explanation of them is omitted here.

The flag cell FCL33H is configured by a PMOS transistor PT333H, NMOS transistor NT335H, and two serially connected inverters INV331H and INV332H.

The PMOS transistor PT333H and the NMOS transistor NT335H are connected in series between the supply line of the power source voltage VDD and the supply line of the reference voltage (0V) VSS. A gate of the PMOS transistor PT333H is connected to the supply line of the set signal /S, and a gate of the NMOS transistor NT335H is connected to the supply line of the reset signal R.

A flag node ND33 is configured by the connection point of the drains of the PMOS transistor PT333H and the NMOS transistor NT335H.

The flag node ND33 has five input/output terminals, that is, an input/output terminal TR for connection with the transfer control circuit MTLR for the transfer control in the left-right direction, an input/output terminal TT for connection with the transfer control circuit MTT for the transfer control in the time direction, an input/output terminal TB for connection with the transfer control circuit MTUB for the transfer control in the up-bottom direction, an input/output terminal TU for connection with the transfer control circuit MTUB for the transfer control in the up-bottom direction of the memory unit MU32H of one upper column, and an input/output terminal TL for connection with the transfer control circuit MTLR for the transfer control in the left-right direction of the memory unit MU23H adjacent at the left.

The signal set in the node ND33 is output via the inverters INV331H and INV332H to the image combining unit 7 as the output OUT.

The transfer control circuit MTLR (MTUB, MTT) is a circuit obtained by combining the memory cell and transfer gate of FIG. 6 and is configured by a memory cell M331H (SRAM) comprised by PMOS transistors PT331H, PT332H and NMOS transistors NT NT331H to NT334H and by a transfer gate TG331H obtained by the connection of the sources and the drains of the PMOS transistor PT334H and the NMOS transistor NT336H to each other.

The transfer control circuit MTLR (MTUB, MTT) has five terminals, that is, a terminal TQA for connection with the input/output terminal of its own flag cell FCL33H, a terminal TQB for connection with the input/output terminal of the flag cell of the adjacent memory unit, a terminal TWL for connection with the word line WL4 (WL5), and terminals TBL1 and TBL2 for connection with the bit line pairs BL4 and /BL4 (BL5 and /BL5).

The specific region growing operation is basically the same as that of the circuits of FIG. 5 and FIG. 6, so the explanation will be omitted here.

As the data transferring means, use is made of the transfer gates, but it goes without saying that data transfer circuits having gates having configurations of FIG. 10 to FIG. 13, FIG. 15, and FIG. 16 and receiving the latch data of the memory nodes of the memory cells at their gates can be applied. In this case, the region growing circuit becomes resistant to the effects of the capacitance of the signal line in comparison with the case where transfer gates are used, so there is an advantage that a further increase of speed of the region growing can be realized.

As described above, according to the region growing circuits of FIG. 21 and FIG. 22, there are the advantages that it is possible to find the correlation relationship between a present image and a past image, that is, find a correlation value also with respect to the time direction of the image, and to find an image having a high correlation in the time direction by the region growing.

Further, up to here, the explanation was given of a memory array in a region growing circuit able to grow a region in the left-right and up-bottom directions, able to grow a region also in the oblique direction, and able to grow a region in the time direction.

Figure 24:
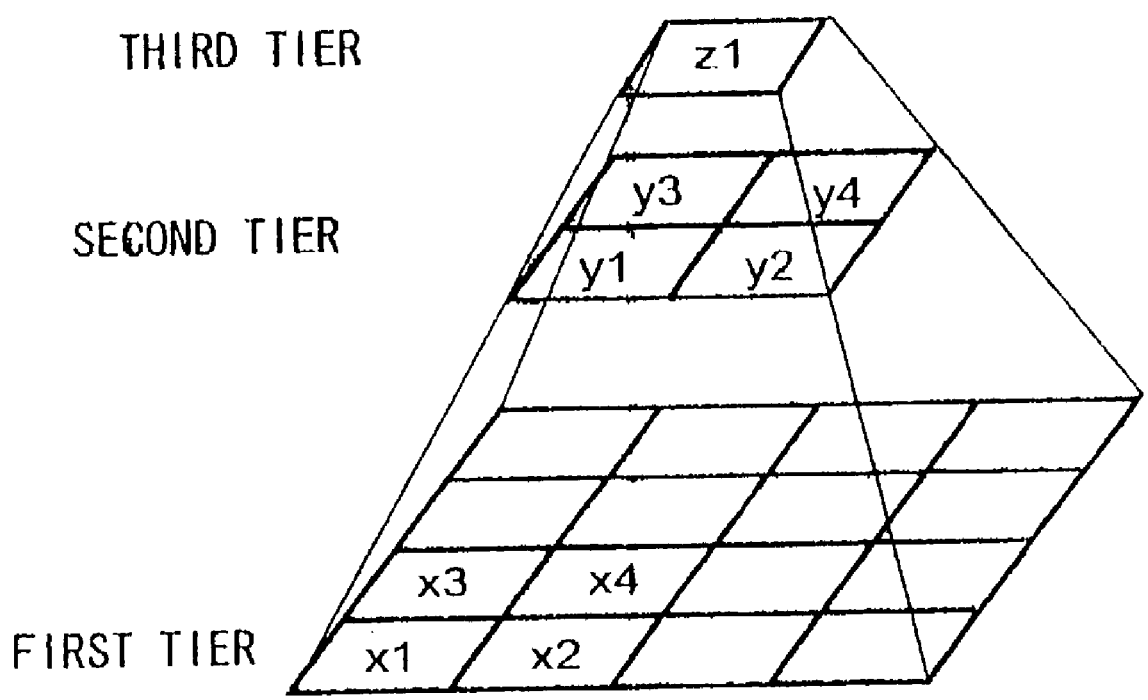
FIG. 24 is an explanatory view of the hierarchical structure of image data.

As shown in FIG. 24, however, it is also possible to configure a region growing circuit able to grow a region also in a hierarchical direction.

As one characteristic of an image, there is the parameter of the resolution in the spatial direction. The structure of image data of providing a plurality of images having different resolutions is called a hierarchical structure or pyramid structure.

Here, a description will be given of an example combined this hierarchical structure and region growing.

A hierarchical structure is a structure providing a plurality of images having different resolutions as shown in FIG. 24. From the data of the first tier, as shown in the following equation, 4 pixels×1 to 4 are averaged to produce second tier data y1.

$$y1=(x1+x2+x3+x4)/4$$

Processing for averaging the 4 pixels y1 to y4 of the second tier is repeated to produce third tier data z1. This is used for processing such as the production of a reduced image and a moving vector detection (ME).

$$z1=(y1+y2+y3+y4)/4$$

Figure 25:
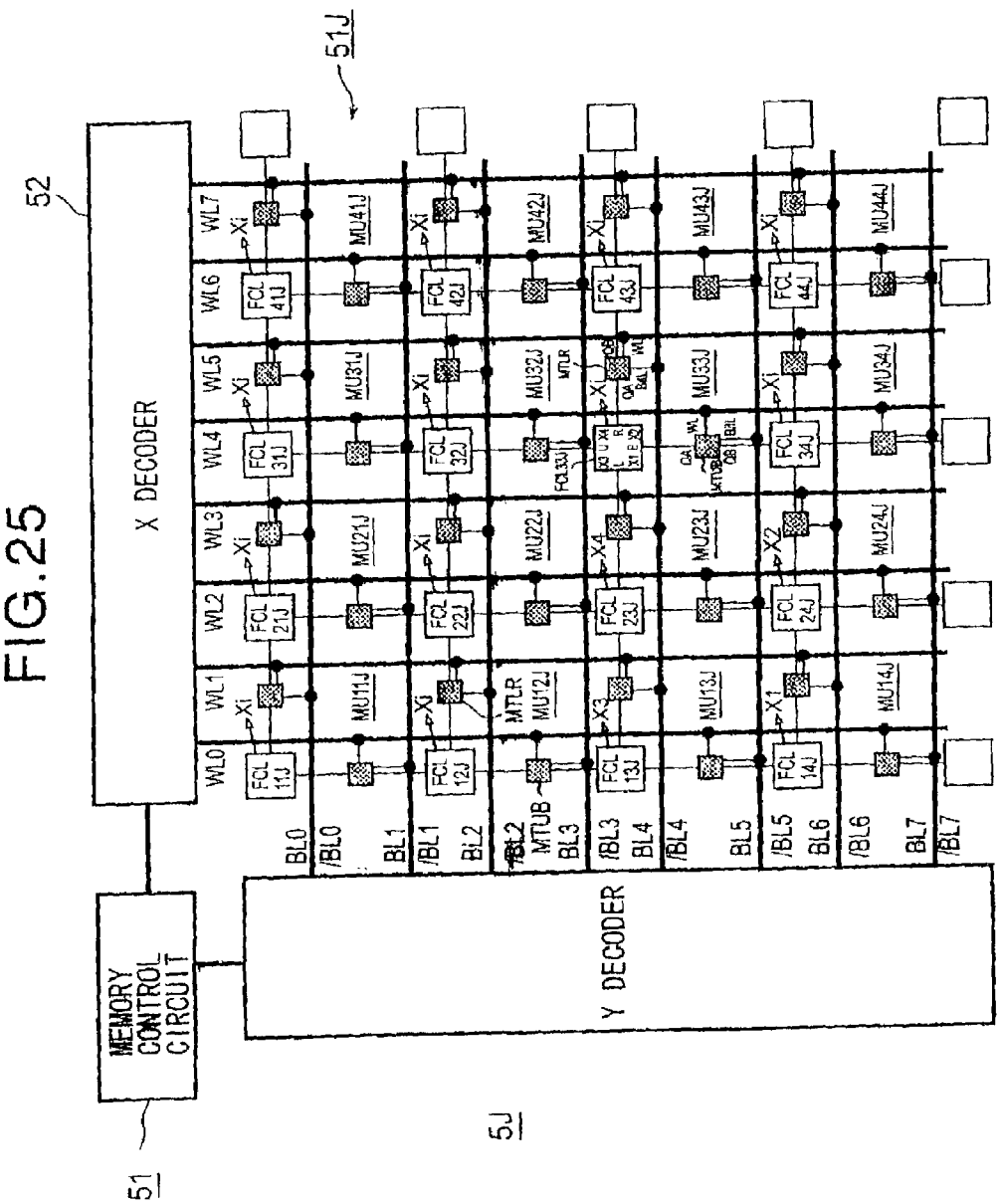
FIG. 25 is a view of an example of the configuration of a region growing circuit able to grow a region in the hierarchical direction, that is, a block diagram of an example of the configuration of a first tier use region growing circuit.
Figure 26:
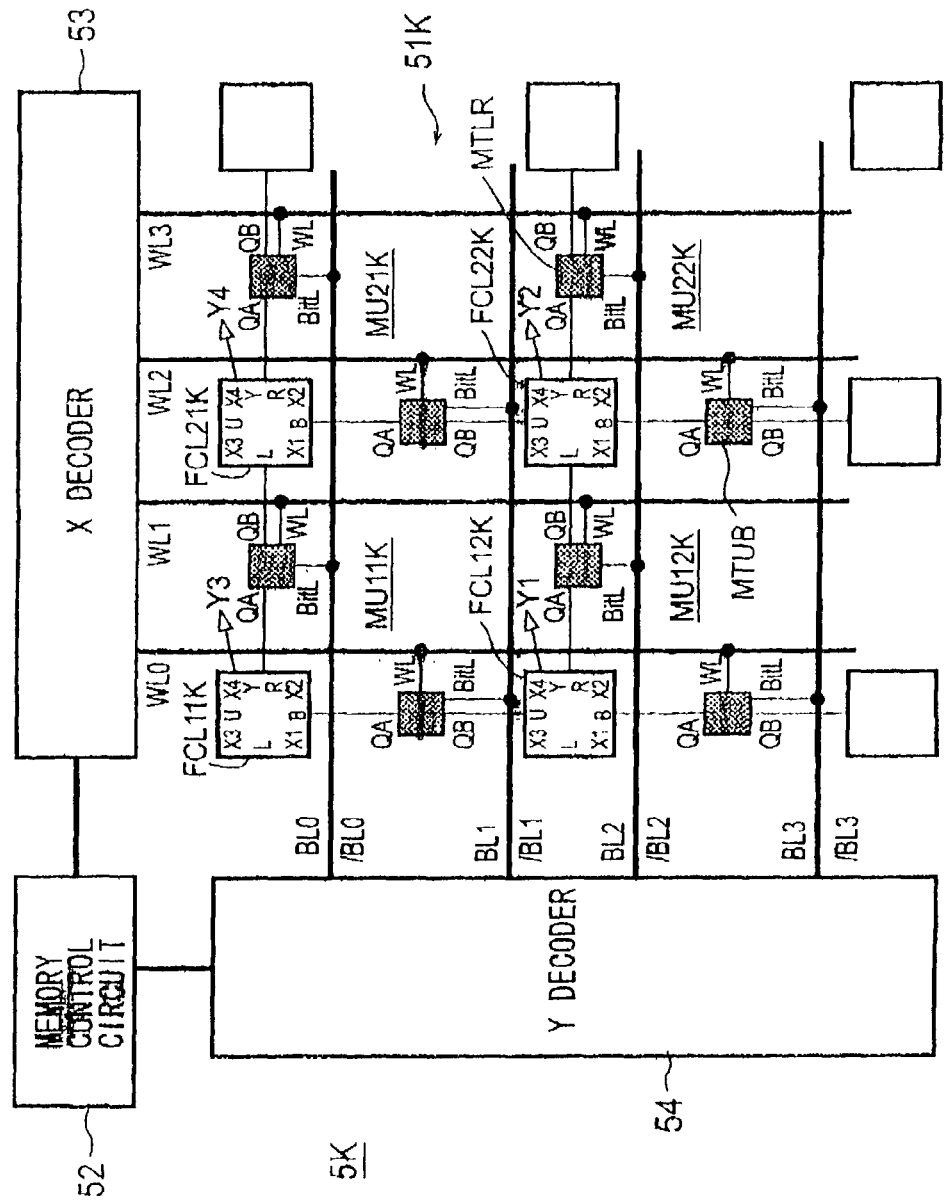
FIG. 26 is a view of an example of the configuration of a region growing circuit able to grow a region in the hierarchical direction, that is, a block diagram of an example of the configuration of a second tier use region growing circuit.

FIG. 25 and FIG. 26 are block diagrams of an example of the configuration of a region growing circuit able to grow a region in a hierarchical direction, wherein FIG. 25 shows a first tier use region growing circuit 5j, and FIG. 26 shows a second tier use region growing circuit 5K.

Note that these views are separated by the first tier and the second tier in order to make the explanation easier to understand, but do not express the actual layouts. Also, the decoder and the memory control circuit can be shared.

Also, of course, the number of the tiers is not limited to two or three.

Note that in the memory arrays 51J and 51K of FIG. 25 and FIG. 26, in the same way as the cases of FIG. 17 and FIG. 18, a combined circuit using the memory cell and the transfer gate of FIG. 6 as a unit is shown as the transfer control circuit by using the symbol MT.

In this case, basically, each memory unit MU has, in the same way as FIG. 6, the transfer control circuit MTLR for the data transfer control in the left-right direction and the transfer control circuit MTUB for the data transfer control in the up-bottom direction.

Accordingly, each memory unit basically has two memory cells, two transfer gates (or data transfer circuits) arranged corresponding to them, and one flag cell.

As shown in FIG. 25 and FIG. 26, in the memory arrays 51J and 51K having a circuit configuration able to grow a region also in the hierarchical direction, in the same way as the memory array of a circuit configuration able to grow a region in the up-bottom and left-right directions, in one memory unit, two bit line pairs are used, and, for the word lines, two word lines are used in all memory units.

Concretely, when looking at the memory unit MU12J, for the bit lines, the transfer control circuit MTLR for the data transfer control in the left-right direction is connected to the bit line BL2 and the inverted bit line /BL2, and the transfer control circuit MTUB for the data transfer control in the up-bottom direction is connected to the bit line BL3 and the inverted bit line /BL3.

For the word lines, the transfer control circuit MTLR for the data transfer control in the left-right direction is connected to the word line WL1, and the transfer control circuit MTUB for the data transfer control in the up-bottom direction is connected to the common word line WL0.

Similarly, when looking at the memory unit MU33J, for the bit lines, the transfer control circuit MTLR for the data transfer control in the left-right direction is connected to the bit line BL4 and the inverted bit line /BL4, and the transfer control circuit MTUB for the data transfer control in the up-bottom direction is connected to the bit line BL5 and the inverted bit line /BL5.

For the word lines, the transfer control circuit MTLR for the data transfer control in the left-right direction is connected to the word line WL5, and the transfer control circuit MTUB for the data transfer control in the up-bottom direction is connected to the common word line WL4.

The flag cells FCL employed in the memory arrays 51J and 51K having circuit configurations able to grow a region also in the hierarchical direction has eight or nine input/output terminals connected to the flag nodes.

Figure 27:
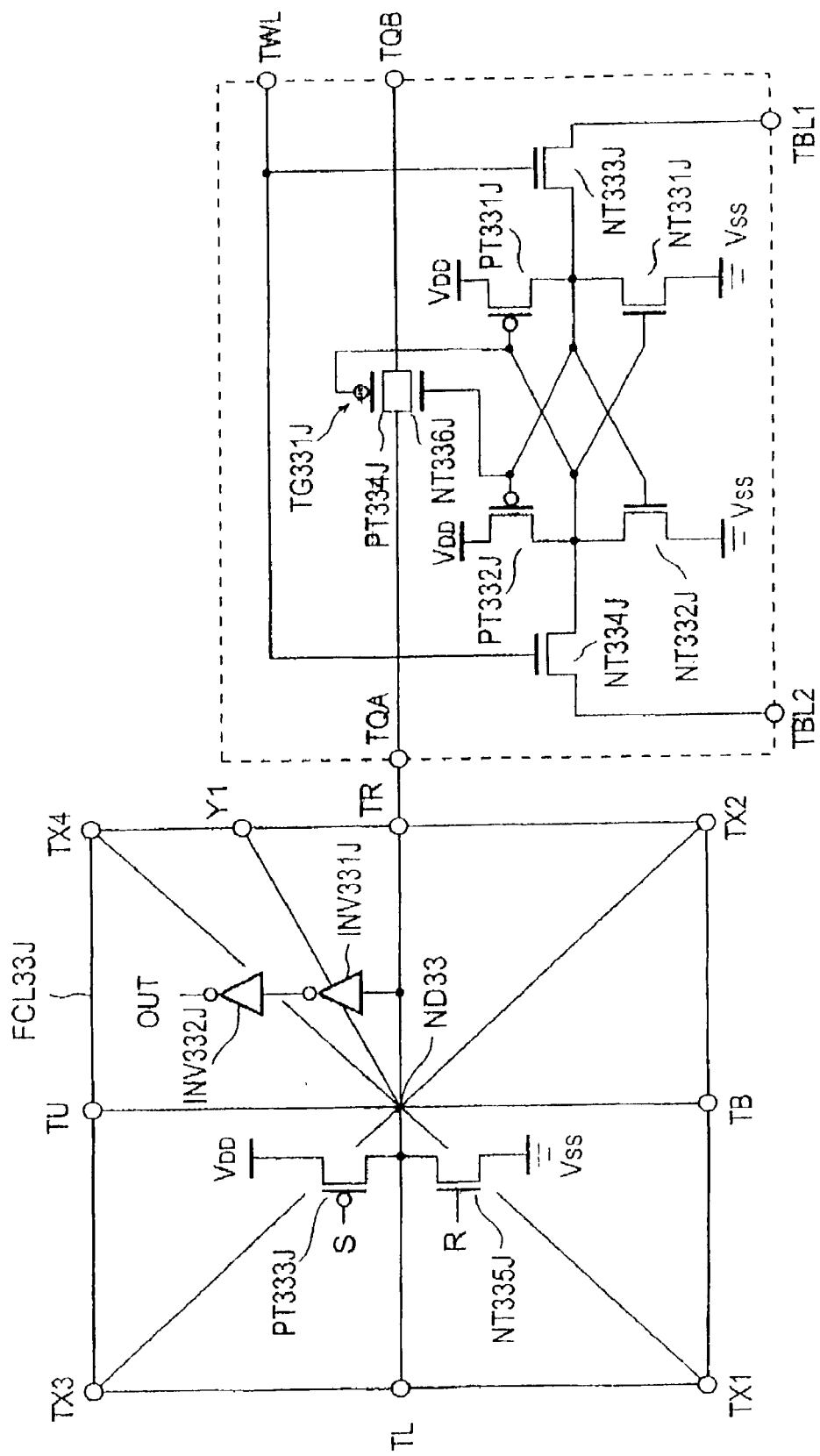
FIG. 27 is a circuit diagram of a concrete example of the configuration of a flag cell and transfer control circuit employed in a memory array of a circuit configuration able to grow a region also in the hierarchical direction.

FIG. 27 is a circuit diagram of a concrete example of the configuration of the flag cells FCL and the transfer control circuits MTLR and MTUB employed in the memory arrays 51J and 51K having circuit configurations able to grow a region also in the hierarchical direction.

Note that in the case of FIG. 27, the flag cell FCL33J and the transfer control circuit MTLR of the memory unit MU33J are shown as examples, but the flag cell FCL and transfer control circuit MTUB of the other memory unit have similar configurations. Explanation of them is omitted here.

The flag cell FCL33J is configured by a PMOS transistor PT333J, NMOS transistor NT335J, and two serially connected inverters INV331J and INV332J.

The PMOS transistor PT333J and the NMOS transistor NT335J are connected in series between the supply line of the power source voltage VDD and the supply line of the reference voltage (0V) VSS. A gate of the PMOS transistor PT333J is connected to the supply line of the set signal /S, and a gate of the NMOS transistor NT335J is connected to the supply line of the reset signal R.

A flag node ND33 is configured by the connection point of the drains of the PMOS transistor PT333J and the NMOS transistor NT335J.

The flag node ND33 has eight input/output terminals, that is, an input/output terminal TR for connection with the transfer control circuit MTLR for the transfer control in the left-right direction, an input/output terminal TB for connection with the transfer control circuit MTUB for the transfer control in the up-bottom direction, an input/output terminal TU for connection with the transfer control circuit MTUB for the transfer control in the up-bottom direction of the memory unit MU32J of one upper column, an input/output terminal TL for connection with the transfer control circuit MTLR for the transfer control in the left-right direction of the memory unit MU23J adjacent at the left, and input/output terminals TX1 to tX4 for first tier data x1 to x4.

For example, the second tier use flag cell further has input/output terminal TY1 for the second tier data y1 and has nine input/output terminals in total.

The signal set in the node ND33 is output via the inverters INV331J and IVN332J to the image combining unit 7 as the output OUT.

The transfer control circuit MTLR (MTUB) is a circuit obtained by combining the memory cell and transfer gate of FIG. 6 and is configured by the memory cell M331J (SRAM) comprised by PMOS transistors PT331J, PT332J and NMOS transistors NT NT331J to NT334J and by a transfer gate TG331J obtained by the connection of the sources and the drains of the PMOS transistor PT334J and the NMOS transistor NT336J to each other.

The transfer control circuit MTLR (MTUB) has five terminals, that is, a terminal TQA for connection with the input/output terminal of its own flag cell FCL33J, a terminal TQB for connection with the input/output terminal of the flag cell of the adjacent memory unit, a terminal TWL for connection with the word line WL4 (WL5), and terminals TBL1 and TBL2 for connection with the bit line pairs BL4 and /BL4 (BL5 and /BL5).

The specific region growing operation is basically the same as that of the circuits of FIG. 5 and FIG. 6, so the explanation will be omitted here.

As the data transferring means, use is made of transfer gates, but it goes without saying that data transfer circuits having the gates having configurations of FIG. 10 to FIG. 13, FIG. 15, and FIG. 16 and receiving the latch data of the memory nodes of the memory cells at their gates can be applied. In this case, the region growing circuit becomes resistant to the effects of the capacitance of the signal line in comparison with the case where transfer gates are used, so there is an advantage that a further increase of the speed of the region growing can be realized.

As described above, according to the region growing circuits of FIG. 25 and FIG. 26, there are the advantages that the apparatus is suitable for hierarchical structures and that processing such as the production of reduced images and moving vector detection (ME) can be realized.

Summarizing the effects of the invention, as explained above, according to the present invention, there are the advantages that a striking increase in the speed of the region growing algorithm, which used to be the to take a long time, can be achieved and that real time operation is made possible.

Further, since the present circuit configuration is made of asynchronous circuits, there are the advantages that no clock is needed and the power consumption is low.

While the invention has been described with reference to specific embodiments chosen for purpose of illustration, it should be apparent that numerous modifications could be made thereto by those skilled in the art without departing from the basic concept and scope of the invention.

What is claimed is:

1. A memory device for storing image data comprising a plurality of memory units arranged in a matrix,
   each memory unit comprising:
   at least one memory cell in which correlation data of adjacent data are written;
   a flag cell having a flag node, receiving a set signal or transferred flag data indicating that there is a correlation, able to hold the flag data in the flag node, and able to output the flag data to an external processing circuit; and
   at least one data transferring means for forming a transfer path of the flag data for the flag node of the flag cell when correlation data indicating that there is a predetermined correlation relationship between the adjacent pixels is stored in the memory cell;
   the data transferring means of one memory unit being arranged between the flag node in the flag cell of that one memory unit and the flag node in the flag cell of an adjacent memory cell unit.

2. A memory device as set forth in claim 1, further comprising a controlling means for resetting the flag node of the flag cell at a predetermined timing.

3. A memory device as set forth in claim 2, wherein the controlling means writes correlation data into memory cells of the memory units, resets the flag nodes in the flag cells of the memory units, and then supplies a set signal to the flag cell of a particular memory unit.

4. A memory device as set forth in claim 1, wherein each the memory unit includes:
   a first data transferring means arranged between the flag node in the flag cell of that memory unit and the flag node in the flag cell of a memory unit adjacent in a row direction of the matrix and
   a second data transferring means arranged between the flag node in the flag cell of that memory unit and the flag node in the flag cell of a memory unit adjacent in a column direction of the matrix.

5. A memory device as set forth in claim 1, wherein
   the correlation data includes correlation data in a time direction of the image, and
   the memory device includes:
   a memory cell for storing the correlation data in the time direction of the image and a data transferring means for processing for forming a transfer path of the flag data in accordance with stored data of the memory cell.

6. A memory device as set forth in claim 1, wherein the correlation data includes correlation data corresponding to a hierarchical structure of the image data.

7. A memory device as set forth in claim 1, wherein each the data transferring means holds the transfer path of the flag data for the flag node of the flag cell in a cut off state when correlation data indicating that there is no predetermined correlation relationship between the adjacent data is stored in the memory cell.

8. A memory device as set forth in claim 1, wherein each the data transferring means includes a transfer gate receiving stored data of the memory cell at its control terminal and controlled in conductive state in accordance with the stored data level.

9. A memory device as set forth in claim 1, wherein each the data transferring means includes a transistor having a first terminal connected to a power source potential side corresponding to the flag data level, having a second terminal connected to the flag node side in the flag cell of an adjacent memory unit, receiving stored data of the memory cell at its control terminal, and controlled in conductive state between the first terminal and second terminal in accordance with the. stored data level.

10. A memory device as set forth in claim 1, wherein:
the flag cell of each memory unit includes an inverter for inverting the data level of the flag node,
each the data transferring means includes first and second transistors each controlled in conductive state between a first terminal and a second terminal in accordance with the input data level to its control terminal,
the first and second transistors are connected in series between a power source potential corresponding to the flag data level and the flag node in the flag cell of an adjacent memory unit,
the first transistor receives stored data of the memory cell at its control terminal and is controlled in conductive state between the first terminal and second terminal in accordance with the stored data level, and
the second transistor receives output data of the inverter and is controlled in conductive state between the first terminal and second terminal in accordance with the level of the data.

11. A memory device as set forth in claim 1, wherein each the data transferring means includes a transistor having a first terminal connected to a power source potential corresponding to the flag data level, having a second terminal connected to the flag node of the flag cell, receiving stored data of the memory cell at its control terminal, and controlled in conductive state between the first terminal and second terminal in accordance with the stored data level.

12. A memory device as set forth in claim 1, wherein:
each the data transferring means includes first and second transistors each controlled in conductive state between a first terminal and a second terminal in accordance with the input data level to its control terminal,
the first and second transistors are connected in series between a power source potential corresponding to the flag data level and the flag node of the flag cell,
the first transistor receives stored data of a memory cell at its control terminal and is controlled in conductive state between the first terminal and second terminal in accordance with the stored data level, and the second transistor is controlled in the conductive state between the first terminal and second terminal when it receives a data of an inverted level of the transferred flag data.

13. A memory device as set forth in claim 1, wherein:
the flag cell of each memory unit includes an inverter for inverting the data level of the flag node,
each the data transferring means includes first, second, third, and fourth transistors each controlled in conductive state between a first terminal and a second terminal in accordance with the input data level to its control terminal,
the first and second transistors are connected in series between a power source potential corresponding to the flag data level and the flag node in the flag cell of an adjacent memory unit,
the first transistor receives stored data of the memory cell at its control terminal and is controlled in conductive state between the first terminal and second terminal in accordance with the stored data level,
the second transistor receives the output data of the inverter of the flag cell of the own stage and is controlled in the conductive state between the first terminal and second terminal in accordance with the level of the data,
the third and fourth transistors are connected in series between a power source potential corresponding to the flag data level and the flag node of the flag cell,
the third transistor receives stored data of the memory cell at its control terminal and is controlled in conductive state between the first terminal and second terminal in accordance with the stored data level, and
the fourth transistor receives the output data of the inverter of the flag cell of the adjacent memory unit and is controlled in conductive state between the first terminal and second terminal in accordance with the level of the data.

14. An image processing apparatus, for sequentially performing processing for combining into a single region a small region in question and a small region adjacent to that when they have the same characteristics as each other so as to gradually grow a region having equal characteristics and finally divide an overall image into regions, comprising a plurality of memory units arranged in a matrix, wherein
each the memory unit comprises:
a correlation operational means for performing operation of correlation between adjacent pixels and outputting correlation data indicating whether or not there is a correlation relationship between the adjacent pixels;
at least one memory cell in which correlation data of adjacent pixels output from the correlation operational means are written;
a flag cell having a flag node, receiving a set signal or transferred flag data indicating that there is a correlation, able to hold the flag data in the flag node, and able to output the flag data to an external processing circuit; and
at least one data transferring means for forming a transfer path of the flag data for the flag node of the flag cell when correlation data indicating that there is a predetermined correlation relationship between the adjacent pixels is stored in the memory cell;
each the data transferring means of one memory unit being arranged between the flag node in the flag cell of that one memory unit and the flag node in the flag cell of an adjacent memory cell unit.

15. An image processing apparatus as set forth in claim 14, further comprising a controlling means for resetting the flag node of the flag cell at a predetermined timing.

16. An image processing apparatus as set forth in claim 14, wherein the controlling means writes correlation data into memory cells of the memory units, resets the flag nodes in the flag cells of the memory units, and then supplies a set signal to the flag cell of a particular memory unit.

17. An image processing apparatus as set forth in claim 14, wherein each the memory unit includes:
 a first data transferring means arranged between the flag node in the flag cell of that memory unit and the flag node in the flag cell of a memory unit adjacent in a row direction of the matrix and
 a second data transferring means arranged between the flag node in the flag cell of that memory unit and the flag node in the flag cell of a memory unit adjacent in a column direction of the matrix.

18. An image processing apparatus as set forth in claim 14, wherein
 the correlation data includes correlation data in a time direction of the image, and
 the image processing apparatus includes:
 a memory cell for storing the correlation data in the time direction of the image and
 a data transferring means for processing for forming a transfer path of the flag data in accordance with stored data of the memory cell.

19. An image processing apparatus as set forth in claim 14, wherein the correlation data includes correlation data corresponding to a hierarchical structure of the image data.

20. An image processing apparatus as set forth in claim 14, wherein each the data transferring means holds the transfer path of the flag data for the flag node of the flag cell in a cut off state when correlation data indicating that there is no predetermined correlation relationship between the adjacent data is stored in the memory cell.

21. An image processing apparatus as set forth in claim 14, wherein each the data transferring means includes a transfer gate receiving stored data of the memory cell at its control terminal and controlled in conductive state in accordance with the stored data level.

22. An image processing apparatus as set forth in claim 14, wherein each the data transferring means includes a transistor having a first terminal connected to a power source potential side corresponding to the flag data level, having a second terminal connected to the flag node side in the flag cell of an adjacent memory unit, receiving stored data of the memory cell at its control terminal, and controlled in conductive state between the first terminal and second terminal in accordance with the stored data level.

23. An image processing apparatus as set forth in claim 14, wherein:
 the flag cell of each memory unit includes an inverter for inverting the data level of the flag node,
 each the data transferring means includes first and second transistors each controlled in conductive state between a first terminal and a second terminal in accordance with the input data level to its control terminal,
 the first and second transistors are connected in series between a power source potential corresponding to the flag data level and the flag node in the flag cell of an adjacent memory unit,
 the first transistor receives stored data of the memory cell at its control terminal and is controlled in conductive state between the first terminal and second terminal in accordance with the stored data level, and
 the second transistor receives output data of the inverter and is controlled in conductive state between the first terminal and second terminal in accordance with the level of the data.

24. An image processing apparatus as set forth in claim 14, wherein each the data transferring means includes a transistor having a first terminal connected to a power source potential corresponding to the flag data level, having a second terminal connected to the flag node of the flag cell, receiving stored data of the memory cell at its control terminal, and controlled in conductive state between the first terminal and second terminal in accordance with the stored data level.

25. An image processing apparatus as set forth in claim 14, wherein:
 each the data transferring means includes first and second transistors each controlled in conductive state between a first terminal and a second terminal in accordance with the input data level to its control terminal,
 the first and second transistors are connected in series between a power source potential corresponding to the flag data level and the flag node of the flag cell,
 the first transistor receives stored data of the memory cell at its control terminal and is controlled in conductive state between the first terminal and second terminal in accordance with the stored data level, and
 the second transistor is controlled in the conductive state between the first terminal and second terminal when it receives a data of an inverted level of the transferred flag data.

26. An image processing apparatus as set forth in claim 14, wherein:
 the flag cell of each memory unit includes an inverter for inverting the data level of the flag node,
 each the data transferring means includes first, second, third, and fourth transistors each controlled in conductive state between a first terminal and a second terminal in accordance with the input data level to its control terminal,
 the first and second transistors are connected in series between a power source potential corresponding to the flag data level and the flag node in the flag cell of an adjacent memory unit,
 the first transistor receives stored data of the memory cell at its control terminal and is controlled in conductive state between the first terminal and second terminal in accordance with the stored data level,
 the second transistor receives the output data of the inverter of the flag cell of the own stage and is controlled in the conductive state between the first terminal and second terminal in accordance with the level of the data,
 the third and fourth transistors are connected in series between a power source potential corresponding to the flag data level and the flag node of the flag cell,
 the third transistor receives stored data of the memory cell at its control terminal and is controlled in conductive state between the first terminal and second terminal in accordance with the stored data level, and
 the fourth transistor receives the output data of the inverter of the flag cell of the adjacent memory unit and is controlled in conductive state between the first terminal and second terminal in accordance with the level of the data.

* * * * *